(12) United States Patent
Gurajala et al.

(10) Patent No.: US 8,743,776 B2
(45) Date of Patent: Jun. 3, 2014

(54) POINT OF SALES AND CUSTOMER SUPPORT FOR FEMTOCELL SERVICE AND EQUIPMENT

(75) Inventors: Ravindra Babu Gurajala, Bothell, WA (US); Robert Wayne Lott, Cumming, GA (US); Kurt Donald Huber, Kenessaw, GA (US); Judson John Flynn, Decatur, GA (US); William Gordon Mansfield, Sugar Hill, GA (US); Jefferey Thomas Seymour, Douglasville, GA (US); Arthur Richard Brisebois, Cumming, GA (US); John Potts Davis, Marietta, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 315 days.

(21) Appl. No.: 12/484,135

(22) Filed: Jun. 12, 2009

(65) Prior Publication Data

US 2010/0027469 A1 Feb. 4, 2010

Related U.S. Application Data

(60) Provisional application No. 61/061,082, filed on Jun. 12, 2008.

(51) Int. Cl.
*H04W 4/00* (2009.01)

(52) U.S. Cl.
USPC .......................................................... 370/328

(58) Field of Classification Search
USPC ........................................ 370/328, 338, 350
See application file for complete search history.

(56) References Cited

U.S. PATENT DOCUMENTS

| | | | |
|---|---|---|---|
| 5,745,559 | A | 4/1998 | Weir |
| 5,864,764 | A | 1/1999 | Thro et al. |
| 6,052,594 | A | 4/2000 | Chuang et al. |
| 6,151,505 | A | 11/2000 | Larkins |
| 6,208,659 | B1 | 3/2001 | Govindarajan et al. |
| 6,219,786 | B1 | 4/2001 | Cunningham et al. |

(Continued)

FOREIGN PATENT DOCUMENTS

| | | |
|---|---|---|
| CN | 101017554 A | 8/2007 |
| CN | 101175333 A | 5/2008 |

(Continued)

OTHER PUBLICATIONS

OA dated Mar. 29, 2011 for U.S. Appl. No. 12/276,002, 37 pages.

(Continued)

*Primary Examiner* — Mark Rinehart
*Assistant Examiner* — Mohammad Anwar
(74) *Attorney, Agent, or Firm* — Amin, Turocy & Watson, LLP

(57) ABSTRACT

System(s) and method(s) are provided for a femto cell service framework for purchase of femtocell equipment and service and customer support thereof. A point of sale (POS) platform enables purchase of femtocell equipment based on a set of eligibility criteria. POS also allows purchase of add-on services. Direct fulfillment and post-sale transactions such as returns and equipment replacement are also provided. An account management service enables femtocell equipment and service self-care or through customer representatives. Configuration of service account and monitoring of account status is provided. Customer care architecture also enables remote troubleshooting of purchased equipment. Remote troubleshooting includes diagnosis and related manipulation of purchased equipment.

20 Claims, 52 Drawing Sheets

(56) References Cited

U.S. PATENT DOCUMENTS

| | | |
|---|---|---|
| 6,256,504 B1 | 7/2001 | Tell et al. |
| 6,266,537 B1 | 7/2001 | Kashitani et al. |
| 6,295,454 B1 | 9/2001 | Havinis et al. |
| 6,363,261 B1 | 3/2002 | Raghavan |
| 6,483,852 B1 | 11/2002 | Jacquet et al. |
| 6,484,096 B2 | 11/2002 | Wong |
| 6,512,478 B1 | 1/2003 | Chien |
| 6,710,651 B2 | 3/2004 | Forrester |
| 6,718,023 B1 | 4/2004 | Zolotov |
| 6,768,722 B1 | 7/2004 | Katseff et al. |
| 7,080,139 B1 | 7/2006 | Briggs et al. |
| 7,142,861 B2 | 11/2006 | Murai |
| 7,146,153 B2 | 12/2006 | Russell |
| 7,209,739 B1 | 4/2007 | Narayanabhatla |
| 7,277,410 B2 * | 10/2007 | Horneman .................... 370/329 |
| 7,317,931 B2 | 1/2008 | Guo |
| 7,370,356 B1 | 5/2008 | Guo |
| 7,437,755 B2 | 10/2008 | Farino et al. |
| 7,493,390 B2 | 2/2009 | Bobde et al. |
| 7,496,383 B2 | 2/2009 | Kurata |
| 7,509,124 B2 | 3/2009 | O'Neil |
| 7,516,219 B2 | 4/2009 | Moghaddam et al. |
| 7,558,251 B1 | 7/2009 | Huang et al. |
| 7,574,731 B2 | 8/2009 | Fascenda et al. |
| 7,613,444 B2 | 11/2009 | Lindqvist et al. |
| 7,614,078 B1 | 11/2009 | Stieglitz et al. |
| 7,623,857 B1 | 11/2009 | O'Neil |
| 7,633,910 B2 | 12/2009 | Zhun et al. |
| 7,751,826 B2 * | 7/2010 | Gardner et al. ............ 455/456.1 |
| 7,761,526 B2 * | 7/2010 | Pounds et al. ................ 709/206 |
| 7,768,983 B2 | 8/2010 | Nylander et al. |
| 7,853,265 B1 | 12/2010 | Ahmad et al. |
| 7,885,644 B2 | 2/2011 | Gallagher et al. |
| 7,929,537 B2 | 4/2011 | Vasudevan et al. |
| 7,929,970 B1 | 4/2011 | Gunasekara |
| 7,941,144 B2 | 5/2011 | Nylander et al. |
| 7,995,994 B2 | 8/2011 | Khetawat et al. |
| 8,064,909 B2 | 11/2011 | Spinelli et al. |
| 8,103,285 B2 | 1/2012 | Kalhan et al. |
| 8,108,923 B1 | 1/2012 | Satish et al. |
| 8,437,745 B2 | 5/2013 | Theppasaandra et al. |
| 2002/0044639 A1 | 4/2002 | Shioda et al. |
| 2002/0077115 A1 | 6/2002 | Ruutu et al. |
| 2002/0098837 A1 | 7/2002 | Ferrario et al. |
| 2002/0123365 A1 * | 9/2002 | Thorson et al. ................ 455/524 |
| 2002/0107018 A1 | 10/2002 | Nakamura et al. |
| 2002/0142791 A1 | 10/2002 | Chen et al. |
| 2003/0028621 A1 | 2/2003 | Furlong et al. |
| 2003/0109271 A1 | 6/2003 | Lewis et al. |
| 2003/0125044 A1 | 7/2003 | Deloach |
| 2003/0133558 A1 | 7/2003 | Kung et al. |
| 2003/0139180 A1 | 7/2003 | McIntosh et al. |
| 2003/0142637 A1 | 7/2003 | Khawer et al. |
| 2003/0144793 A1 | 7/2003 | Melaku et al. |
| 2003/0153302 A1 | 8/2003 | Lewis et al. |
| 2004/0111382 A1 | 6/2004 | Haji-Ioannou |
| 2004/0125781 A1 | 7/2004 | Walter et al. |
| 2004/0203846 A1 | 10/2004 | Caronni et al. |
| 2004/0235455 A1 | 11/2004 | Jiang |
| 2004/0236702 A1 | 11/2004 | Fink et al. |
| 2004/0258003 A1 | 12/2004 | Kotot et al. |
| 2004/0264428 A1 | 12/2004 | Choi et al. |
| 2005/0003797 A1 | 1/2005 | Baldwin |
| 2005/0009499 A1 | 1/2005 | Koster |
| 2005/0024201 A1 | 2/2005 | Culpepper et al. |
| 2005/0026650 A1 | 2/2005 | Russell |
| 2005/0075114 A1 | 4/2005 | Dennison et al. |
| 2005/0108529 A1 | 5/2005 | Juneau |
| 2005/0144279 A1 | 6/2005 | Wexelblat |
| 2005/0160276 A1 | 7/2005 | Braun et al. |
| 2005/0172148 A1 | 8/2005 | Ying |
| 2005/0177645 A1 | 8/2005 | Dowling et al. |
| 2005/0223389 A1 | 10/2005 | Klein et al. |
| 2005/0239448 A1 | 10/2005 | Bayne |
| 2005/0250527 A1 | 11/2005 | Jugl |
| 2005/0254451 A1 | 11/2005 | Grosbach |
| 2005/0255893 A1 | 11/2005 | Jin et al. |
| 2005/0259654 A1 | 11/2005 | Faulk, Jr. |
| 2005/0269402 A1 * | 12/2005 | Spitzer et al. ................ 235/380 |
| 2005/0283518 A1 | 12/2005 | Sargent |
| 2006/0031387 A1 | 2/2006 | Hamzeh et al. |
| 2006/0031493 A1 | 2/2006 | Cugi |
| 2006/0046647 A1 | 3/2006 | Parikh et al. |
| 2006/0074814 A1 | 4/2006 | Lovell et al. |
| 2006/0075098 A1 | 4/2006 | Becker et al. |
| 2006/0182074 A1 * | 8/2006 | Kubler et al. ................ 370/338 |
| 2006/0223498 A1 | 10/2006 | Gallagher et al. |
| 2006/0244589 A1 | 11/2006 | Schranz |
| 2006/0281457 A1 | 12/2006 | Huotari et al. |
| 2007/0002844 A1 | 1/2007 | Ali |
| 2007/0008894 A1 | 1/2007 | Lynch et al. |
| 2007/0025245 A1 | 2/2007 | Porras et al. |
| 2007/0032225 A1 | 2/2007 | Konicek et al. |
| 2007/0032269 A1 | 2/2007 | Shostak |
| 2007/0066318 A1 | 3/2007 | Danzeisen et al. |
| 2007/0074272 A1 | 3/2007 | Watanabe |
| 2007/0094601 A1 | 4/2007 | Greenberg et al. |
| 2007/0097093 A1 | 5/2007 | Oshita et al. |
| 2007/0097938 A1 | 5/2007 | Nylander et al. |
| 2007/0097939 A1 | 5/2007 | Nylander et al. |
| 2007/0097983 A1 | 5/2007 | Nylander et al. |
| 2007/0099561 A1 | 5/2007 | Voss |
| 2007/0104166 A1 | 5/2007 | Rahman et al. |
| 2007/0111706 A1 | 5/2007 | Kumar et al. |
| 2007/0123253 A1 | 5/2007 | Simongini et al. |
| 2007/0124802 A1 | 5/2007 | Anton et al. |
| 2007/0133563 A1 | 6/2007 | Hundscheidt et al. |
| 2007/0150732 A1 | 6/2007 | Suzuki et al. |
| 2007/0155421 A1 | 7/2007 | Alberth et al. |
| 2007/0167175 A1 | 7/2007 | Wong |
| 2007/0183427 A1 | 8/2007 | Nylander et al. |
| 2007/0184815 A1 | 8/2007 | Aebi |
| 2007/0199076 A1 | 8/2007 | Rensin et al. |
| 2007/0220252 A1 | 9/2007 | Sinko et al. |
| 2007/0232332 A1 | 10/2007 | Holur et al. |
| 2007/0258418 A1 | 11/2007 | Wurtenberger et al. |
| 2007/0270152 A1 | 11/2007 | Nylander et al. |
| 2007/0275739 A1 | 11/2007 | Blackburn |
| 2007/0287501 A1 * | 12/2007 | Hoshina et al. ............ 455/562.1 |
| 2008/0043972 A1 | 2/2008 | Ruetschi et al. |
| 2008/0049702 A1 | 2/2008 | Meylan et al. |
| 2008/0065752 A1 | 3/2008 | Ch'ng et al. |
| 2008/0076392 A1 | 3/2008 | Khetawat et al. |
| 2008/0076393 A1 | 3/2008 | Khetawat et al. |
| 2008/0076398 A1 | 3/2008 | Mate et al. |
| 2008/0076412 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0081636 A1 | 4/2008 | Nylander et al. |
| 2008/0082538 A1 | 4/2008 | Meijer et al. |
| 2008/0119160 A1 | 5/2008 | Andriantsiferana et al. |
| 2008/0126531 A1 | 5/2008 | Setia et al. |
| 2008/0132239 A1 | 6/2008 | Khetawat et al. |
| 2008/0133742 A1 | 6/2008 | Southiere et al. |
| 2008/0141348 A1 | 6/2008 | Hovnanian et al. |
| 2008/0151807 A1 | 6/2008 | Meier et al. |
| 2008/0168099 A1 | 7/2008 | Skaf |
| 2008/0181184 A1 | 7/2008 | Kezys |
| 2008/0201076 A1 | 8/2008 | Huang et al. |
| 2008/0207170 A1 | 8/2008 | Khetawat et al. |
| 2008/0242280 A1 | 10/2008 | Shapiro et al. |
| 2008/0244148 A1 | 10/2008 | Nix et al. |
| 2008/0254792 A1 | 10/2008 | Ch'ng |
| 2008/0261602 A1 | 10/2008 | Livneh et al. |
| 2008/0274753 A1 | 11/2008 | Attar et al. |
| 2008/0281687 A1 | 11/2008 | Hurwitz et al. |
| 2008/0282327 A1 | 11/2008 | Winget et al. |
| 2008/0299984 A1 | 12/2008 | Shimomura |
| 2008/0299992 A1 | 12/2008 | Eitan et al. |
| 2008/0305792 A1 * | 12/2008 | Khetawat et al. .......... 455/435.1 |
| 2008/0305801 A1 | 12/2008 | Burgess et al. |
| 2008/0305834 A1 | 12/2008 | Janiszewski et al. |
| 2008/0318551 A1 | 12/2008 | Palamara et al. |

(56) References Cited

U.S. PATENT DOCUMENTS

| | | | |
|---|---|---|---|
| 2009/0012898 A1* | 1/2009 | Sharma et al. | 705/44 |
| 2009/0031006 A1 | 1/2009 | Johnson et al. | |
| 2009/0037973 A1 | 2/2009 | Gustave et al. | |
| 2009/0042593 A1 | 2/2009 | Yavuz et al. | |
| 2009/0046665 A1 | 2/2009 | Robson et al. | |
| 2009/0047945 A1* | 2/2009 | Zhang et al. | 455/424 |
| 2009/0059822 A1 | 3/2009 | Morrill et al. | |
| 2009/0061821 A1 | 3/2009 | Chen et al. | |
| 2009/0061873 A1 | 3/2009 | Bao et al. | |
| 2009/0077620 A1 | 3/2009 | Ravi et al. | |
| 2009/0082010 A1* | 3/2009 | Lee et al. | 455/424 |
| 2009/0082020 A1 | 3/2009 | Ch'ng et al. | |
| 2009/0092080 A1 | 4/2009 | Balasubramanian et al. | |
| 2009/0092081 A1 | 4/2009 | Balasubramanian et al. | |
| 2009/0092096 A1* | 4/2009 | Czaja et al. | 370/331 |
| 2009/0092097 A1 | 4/2009 | Nylander et al. | |
| 2009/0093232 A1 | 4/2009 | Gupta et al. | |
| 2009/0094351 A1 | 4/2009 | Gupta et al. | |
| 2009/0094680 A1 | 4/2009 | Gupta et al. | |
| 2009/0097436 A1 | 4/2009 | Vasudevan et al. | |
| 2009/0098871 A1 | 4/2009 | Gogic | |
| 2009/0111499 A1 | 4/2009 | Bosch | |
| 2009/0122773 A1 | 5/2009 | Gogic | |
| 2009/0124262 A1 | 5/2009 | Vela et al. | |
| 2009/0129336 A1 | 5/2009 | Osborn et al. | |
| 2009/0129350 A1 | 5/2009 | Khandekar et al. | |
| 2009/0131050 A1 | 5/2009 | Osborn | |
| 2009/0131098 A1 | 5/2009 | Khandekar et al. | |
| 2009/0135749 A1 | 5/2009 | Yang | |
| 2009/0135794 A1 | 5/2009 | Su et al. | |
| 2009/0156213 A1 | 6/2009 | Spinelli et al. | |
| 2009/0161682 A1 | 6/2009 | Johnson et al. | |
| 2009/0163216 A1 | 6/2009 | Hoang et al. | |
| 2009/0163224 A1 | 6/2009 | Dean | |
| 2009/0164547 A1 | 6/2009 | Ch'ng et al. | |
| 2009/0170440 A1 | 7/2009 | Eyuboglu et al. | |
| 2009/0170528 A1 | 7/2009 | Bull et al. | |
| 2009/0180428 A1 | 7/2009 | Viswanath | |
| 2009/0191844 A1 | 7/2009 | Morgan et al. | |
| 2009/0191845 A1 | 7/2009 | Morgan et al. | |
| 2009/0210324 A1 | 8/2009 | Bhogal | |
| 2009/0213825 A1 | 8/2009 | Gupta et al. | |
| 2009/0215429 A1 | 8/2009 | Caldwell et al. | |
| 2009/0215452 A1 | 8/2009 | Balasubramanian et al. | |
| 2009/0221303 A1 | 9/2009 | Soliman | |
| 2009/0233574 A1 | 9/2009 | Shinozaki | |
| 2009/0245176 A1 | 10/2009 | Balasubramanian et al. | |
| 2009/0253421 A1 | 10/2009 | Camp et al. | |
| 2009/0253432 A1 | 10/2009 | Willey et al. | |
| 2009/0257434 A1 | 10/2009 | Song et al. | |
| 2009/0279701 A1 | 11/2009 | Moisand et al. | |
| 2009/0291667 A1 | 11/2009 | Vakil et al. | |
| 2009/0325634 A1 | 12/2009 | Bienas et al. | |
| 2010/0022266 A1 | 1/2010 | Villier | |
| 2010/0040026 A1 | 2/2010 | Melkesetian | |
| 2010/0048165 A1 | 2/2010 | Caldwell et al. | |
| 2010/0113067 A1 | 5/2010 | Fullam et al. | |
| 2010/0167777 A1 | 7/2010 | Raghothaman et al. | |
| 2010/0260068 A1 | 10/2010 | Bhatt et al. | |
| 2011/0177794 A1 | 7/2011 | Nylander et al. | |
| 2011/0200022 A1 | 8/2011 | Annamalai | |
| 2011/0280154 A1 | 11/2011 | Silverstrim et al. | |

FOREIGN PATENT DOCUMENTS

| | | |
|---|---|---|
| GB | 2425291 A | 10/2006 |
| GB | 2425921 A | 11/2006 |
| JP | 20010264096 | 9/2001 |
| JP | 2003022303 | 1/2003 |
| JP | 2003288521 | 10/2003 |
| JP | 2004112324 | 4/2004 |
| JP | 2005073147 | 3/2005 |
| JP | 2005215849 | 8/2005 |
| JP | 2006067143 | 3/2006 |
| JP | 2008048055 | 2/2008 |
| WO | 0214987 | 2/2002 |
| WO | 2005076964 A2 | 8/2005 |
| WO | 2007015067 A2 | 2/2007 |
| WO | 2007040449 A1 | 4/2007 |
| WO | 2008047039 A1 | 4/2008 |

OTHER PUBLICATIONS

OA dated Apr. 13, 2011 for U.S. Appl. No. 12/276,058, 40 pages.
OA dated Apr. 19, 2011 for U.S. Appl. No. 12/276,238, 22 pages.
OA dated May 5, 2011 for U.S. Appl. No. 12/275,015, 32 pages.
Kaul. "Verizon's $250 femto box—A deliberate ploy behind the aggressive pricing?" Posted Tue, Jan. 20, 2009 13:19:46 EST S:\HAM\ATTW\P192USA\Analyst Blogs ABI Research.mht last viewed Sep. 11, 2009, 1 page.
International Search Report and Written Opinion dated Oct. 27, 2009 for PCT Application Serial No. PCT/US2009/043861, 14 Pages.
International Search Report and Written Opinion mailed Feb. 23, 2010, for PCT Application No. PCT/US2009/043846, 13 pages.
OA dated Dec. 31, 2009 for U.S. Appl. No. 11/457,129, 16 pages.
OA dated Apr. 17, 2009 for U.S. Appl. No. 11/276,269, 15 pages.
OA dated Nov. 4, 2008 for U.S. Appl. No. 11/276,269, 15 pages.
OA dated Jun. 17, 2010 for U.S. Appl. No. 11/457,129, 15 pages.
OA dated Jun. 14, 2011 for U.S. Appl. No. 12/275,878, 35 pages.
OA dated Jun. 22, 2011 for U.S. Appl. No. 12/484,072, 38 pages.
OA dated Jul. 7, 2011 for U.S. Appl. No. 12/276,257, 24 pages.
OA dated Jun. 28, 2011 for U.S. Appl. No. 12/275,925, 18 pages.
OA dated Jun. 8, 2011 for U.S. Appl. No. 12/484,026, 30 pages.
OA dated Oct. 24, 2011 for U.S. Appl. No. 12/275,925, 14 pages.
OA dated Nov. 30, 2011 for U.S. Appl. No. 12/275,878, 38 pages.
OA dated Dec. 1, 2011 for U.S. Appl. No. 12/275,996, 44 pages.
OA dated Oct. 25, 2011 for U.S. Appl. No. 12/465,580, 39 pages.
OA dated Nov. 8, 2011 for U.S. Appl. No. 12/465,468, 50 pages.
OA dated Jan. 5, 2012 for U.S. Appl. No. 12/465,585, 43 pages.
OA dated Dec. 28, 2011 for U.S. Appl. No. 12/175,293, 38 pages.
OA dated Nov. 21, 2011 for U.S. Appl. No. 12/484,026, 37 pages.
OA dated Dec. 14, 2011 for U.S. Appl. No. 12/484,072, 44 pages.
OA dated Nov. 1, 2011 for U.S. Appl. No. 12/816,087, 33 pages.
OA dated Aug. 18, 2011 for U.S. Appl. No. 12/275,416, 39 pages.
OA dated Sep. 14, 2011 for U.S. Appl. No. 12/276,002, 35 pages.
OA dated Oct. 5, 2011 for U.S. Appl. No. 12/276,058, 37 pages.
OA dated Oct. 6, 2011 for U.S. Appl. No. 12/465,483, 50 pages.
OA dated Jul. 21, 2011 for U.S. Appl. No. 12/175,293, 30 pages.
Office Action dated Apr. 23, 2013 for U.S. Appl. No. 12/175,293, 41 pages.
Canadian Office Action mailed Mar. 26, 2013 for Canadian Patent Application No. 2,722,324, 4 pages.
Office Action dated Jul. 15, 2013 for U.S. Appl. No. 13/554,710, 37 pages.
OA dated Jul. 16, 2012 for U.S. Appl. No. 12/275,878, 37 pages.
OA dated Jul. 10, 2012 for U.S. Appl. No. 12/465,585, 32 pages.
OA dated Sep. 5, 2012 for U.S. Appl. No. 12/276,120, 49 pages.
OA dated Aug. 16, 2012 for U.S. Appl. No. 12/465,598, 31 pages.
OA dated Sep. 6, 2012 for U.S. Appl. No. 12/579,957, 51 pages.
OA dated Sep. 10, 2012 for U.S. Appl. No. 12/276,002, 54 pages.
Office Action dated Aug. 13, 2013 for U.S. Appl. No. 12/276,120, 66 pages.
Office Action dated Aug. 12, 2013 for U.S. Appl. No. 12/275,416, 36 pages.
Office Action dated Sep. 9, 2013 for U.S. Appl. No. 12/465,585, 45 pages.
Office Action dated Oct. 2, 2013 for U.S. Appl. No. 12/275,878, 38 pages.
Office Action dated Oct. 3, 2013 for U.S. Appl. No. 13/892,923, 62 pages.
Office Action dated Oct. 22, 2013 for U.S. Appl. No. 13/898,910, 50 pages.
Office Action dated Oct. 3, 2013 for U.S. Appl. No. 13/934,644, 17 pages.
Chinese Office Action dated Oct. 24, 2013 for Chinese Patent Application No. 200980117263.8, 13 pages.

(56) References Cited

OTHER PUBLICATIONS

Chinese Office Action dated Oct. 21, 2013 for Chinese Patent Application No. 200980117188.5, 11 pages.
Japanese Office Action dated Oct. 3, 2013 for Japanese Patent Application No. 2011-509669, 15 pages.
OA dated Oct. 2, 2012 for U.S. Appl. No. 12/484,026, 29 pages.
OA dated Oct. 11, 2012 for U.S. Appl. No. 13/487,794, 45 pages.
OA dated Oct. 9, 2012 for U.S. Appl. No. 13/298,924, 51 pages.
OA dated Nov. 1, 2012 for U.S. Appl. No. 12/276,058, 59 pages.
OA dated Nov. 5, 2012 for U.S. Appl. No. 12/484,072, 52 pages.
OA dated Nov. 20, 2012 for U.S. Appl. No. 12/275,878, 28 pages.
Japanese Office Action mailed Sep. 13, 2012 for Japanese Patent Application No. 2011-509669.
Canadian Office Action mailed Oct. 30, 2012 for Canadian Patent Application No. 2,722,324, 3 pages.
Japanese Office Action mailed—Sep. 13, 2012 for Japanese Patent Application 2011-509675, 4 pages.
Office Action dated Dec. 3, 2012 for U.S. Appl. No. 12/275,416, 33 pages.
OA dated Mar. 5, 2012 for U.S. Appl. No. 12/465,598, 55 pages.
OA dated Mar. 19, 2012 for U.S. Appl. No. 12/276,120, 68 pages.
OA dated Mar. 30, 2012 for U.S. Appl. No. 12/484,026, 30 pages.
Notice of Allowance dated Apr. 3, 2012 for U.S. Appl. No. 12/275,996, 38 pages.
OA dated Apr. 10, 2012 for U.S. Appl. No. 12/275,416, 32 pages.
OA dated Apr. 13, 2012 for U.S. Appl. No. 13/316,106, 35 pages.
Notice of Allowance dated Apr. 25, 2012 for U.S. Appl. No. 12/465,468, 35 pages.
OA dated May 8, 2012 for U.S. Appl. No. 11/457,129, 38 pages.
Office Action dated Jan. 17, 2013 for U.S. Appl. No. 13/554,710, 42 pages.
Final OA dated Feb. 15, 2013 for U.S. Appl. No. 12/579,957, 17 pages.
OA dated Feb. 26, 2013 for U.S. Appl. No. 12/276,120, 59 pages.
Chinese Office Action for Chinese Application No. 200980117263.8 dated Feb. 16, 2013, 7 pages.
Chinese Office Action for Chinese Application No. 200980117188.5 dated Jan. 31, 2013, 11 pages.
Final OA dated Mar. 14, 2013 for U.S. Appl. No. 12/484,072, 34 pages.
Office Action dated Dec. 12, 2013 for U.S. Appl. No. 12/276,120, 78 pages.
Hasan, Mohammad Masud; Huang, Xiadong; Jue, Jason P.; "Survivable Wireless Access Network Design with Dual-homing Capabilities"; IEEE Global Telecommunications Conference, Nov. 27-Dec. 1, 2006, 5 pgs.
Notice of Allowance dated Feb. 13, 2014 for U.S. Appl. No. 12/275,878, 34 pages.
Japanese Office Action dated Jan. 16, 2014 for Japanese Patent Application No. 2013-026198, 8 pages.
Office Action dated Mar. 26, 2014 for U.S. Appl. No. 12/465,585, 44 pages.
Office Action dated Mar. 24, 2014 for U.S. Appl. No. 13/934,644, 50 pages.
Notice of Allowance dated Apr. 4, 2014 for U.S. Appl. No. 14/090,802, 63 pages.
Office Action dated Mar. 24, 2014 for U.S. Appl. No. 13/671,191, 63 pages.

* cited by examiner

POINT OF SALES AND CUSTOMER SUPPORT FOR FEMTOCELL SERVICE AND EQUIPMENT

CROSS-REFERENCE TO RELATED APPLICATIONS

This application claims the benefit of U.S. Provisional Patent application Ser. No. 61/061,082, entitled "FEMTO CELL SERVICE FRAMEWORK" and filed on Jun. 12, 2008. This application also relates to U.S. patent application Ser. No. 12/465,598, filed on May 13, 2009, and entitled "ADMINISTRATION OF ACCESS LISTS FOR FEMTOCELL SERVICE", which claims the benefit of U.S. Provisional Application Ser. No. 61/052,813, filed May 13, 2008, entitled "MANAGEMENT OF ACCESS TO FEMTO CELL COVERAGE;" U.S. patent application Ser. No. 12/484,026, filed on Jun. 12, 2009, and entitled "FEMTOCELL SERVICE REGISTRATION, ACTIVATION, AND PROVISIONING;" and U.S. patent application Ser. No. 12/484,072, filed on Jun. 12, 2009, and entitled "MEDIATION, RATING, AND BILLING ASSOCIATED WITH A FEMTOCELL SERVICE FRAMEWORK." The entireties of the above-referenced applications are incorporated herein by reference.

TECHNICAL FIELD

The subject innovation relates to wireless communications and, more particularly, to a service framework that provides a point of sale architecture for purchase of femto cell service and femtocell equipment, and customer support system(s) for purchased service or equipment.

BACKGROUND

Femtocells—building-based wireless access points interfaced with a wired broadband network—are generally deployed to improve indoor wireless coverage, and to offload a mobility radio access network (RAN) operated by a wireless service provider. Improved indoor coverage includes stronger signal and improved reception (e.g., voice or sound), ease of session or call initiation and session or call retention as well. Offloading RAN reduces operational and transport costs for the service provider.

Coverage of a femto cell, or femto AP, is intended to be confined within the bounds of an indoor compound, in order to mitigate interference among mobile stations covered by a macro cell and terminals covered by the femto AP. Additionally, confined coverage can reduce cross-talk among terminals serviced by disparate, neighboring femto cells as well. Femtocells typically operate in licensed portions of the electromagnetic spectrum, and generally offer plug-and-play installation.

Coverage improvements via femtocells also can mitigate customer attrition as long as a favorable subscriber perception regarding voice coverage and other data services with substantive delay sensitivity is attained. In addition, a richer variety of wireless voice and data services can be offered to customers via a femtocell since such service offerings do not rely primarily on the mobility RAN resources. Therefore, a positive, rich customer experience can depend substantially on adequate femtocell service provided by the network operator.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) for a femto cell service framework for purchase of femtocell equipment and service and customer support thereof. A point of sale (POS) platform enables purchase of femtocell equipment based on a set of eligibility criteria. POS also allows purchase of add-on services. Direct fulfillment and post-sale transactions such as returns and equipment replacement are also provided. An account management service enables femtocell equipment and service self-care or through customer representatives. Configuration of femtocell service account(s) and monitoring of account status is provided. Customer care architecture also enables remote troubleshooting of purchased equipment. Remote troubleshooting includes diagnosis and related manipulation of purchased equipment.

Femto cell service framework for registration, activation, and provisioning of femtocell service. A provided account management service enables femtocell account creation, and registration thereof. Registration can include validation of service provider wireless coverage for a location of prospective operation of a femto AP, and validation of availability of support services that the service provider is mandated to supply, such as enhanced 911 (E911) service. Such validation is based on a specific address supplied for the femto AP. A component a component included in the account management service and that interfaces with an E911 service provider and a spectrum record storage system can conduct the validation checks. As part of registration provisioning, one or more attribute fields within a created femtocell account profile are updated to indicate registration status, and to retain valid standardized location data such as geographical location indicators obtained through validation checks. In addition, as part of provisioning, femtocell attributes can be recorded; for instance, specific address of a femto AP linked to the registered femtocell service account; equipment identifiers (EID); geographical location indicators, e.g., latitude and longitude; or the like. In addition, a mobility account associated with a mobile device linked to a subscriber responsible for the femtocell service account is tagged with a tracking feature, e.g., a logic variable or field, that indicates femtocell service is registered for the mobile device.

The account management service can be accessed through a broadband network, via a Femtocell Online Account Management (FOAM) interface exposed to a subscriber, and comprises two operational layers deployed within respective demarcation zones. A first layer includes a web tier that provides landing webpage and a legacy account manager that enables account management for mobility subscribers. A second layer includes an application layer associated with femtocell service, an application layer for legacy accounts, and a middleware component that provides functional connectivity application layers and backend service component. Account management service allows secure login to an existing mobility account, or legacy account, for creation of a femtocell service account, and secure redirection amongst femtocell and legacy service components for account management. FOAM interface can include a FOAM web tier and a FOAM application layer, which allows femtocell account profile creation or management (e.g., update of femto AP location, addition of femto AP(s), configuration of access list(s) such as white list(s) . . . ); and registration and activation of femto access points on a service provider network. FOAM interface allows a subscriber to effect or manage such manipulation and generation or update of femtocell account profile(s). A femtocell database retains account profile(s) that includes one or more equipment profiles associated with customer premises equipment (CPE), e.g., femto access point (AP), registered or activated. The femtocell maintains one or more access list(s), e.g., white list(s), and processes authentication requests (e.g., standard UMTS requests) for allowed devices.

A component included in the account management service and that interfaces with a femto network platform, or telecommunication network, can activate femto AP(s) associated with a registered femtocell account. Activation of a femto AP can be subsequent to registration, and proceeds independently thereto. Connection of femto AP to a network interface triggers activation process, and the femto AP delivers an activation request that includes payload data such as at least one of an equipment identifier or global positioning system (GPS)-based location data for the femto AP. Femto network platform validates registration of the connected femto AP and conducts a geographical location tolerance check. Validated tolerance lead femto network platform to assign a cell identifier (ID), e.g., a cell global identity (CGI), for the femto AP and assign one or more radio frequency channel(s) compatible with wireless spectrum coverage available for the femto AP. As part of activation, recordation of the assigned CGI with E911 service, or service provider, is effected. At least one of a recorded CGI and a time-stamp for recordation can be provisioned to the femtocell account profile linked to the femto AP that is assigned the CGI. When femto AP delivers an indication that it radiates wireless signal, network activation status indicators are provisioned to the femtocell account profile linked to the activated femto AP, and a dedicated database within the femto network platform. Additional femtocell attributes can be recorded or provisioned, such as assigned cell ID or radio frequency (RF) channel(s).

Security tracking features such as call analysis and monitoring can be activated when the femto AP is active. Various femtocell attributes recorded in a femtocell account profile are conveyed to a security platform the implements the security tracking feature(s). The activated security features can fulfill, at least in part, the regulations in the Communications Assistance for Law Enforcement Act (CALEA).

Errors that arise during femtocell account registration or femtocell access point activation can be handled through an exception manager component. Errors can be caused by component functionality outage(s), failure of integrity checks of supplied information that can be part of registration, or validation checks of wireless coverage or mandated service(s). Information related to fault condition(s) can be supplied to a subscriber via a messaging service such as Unstructured Supplementary Service Data (USSD) communication, instant message (IM) communication, multimedia message service (MMS), short message service (SMS), or email.

In an aspect of the subject innovation, from the residence or small business setting a femtocell connects through a broadband network or the Internet via a broadband network interface, such as cable modem, and a digital subscriber line (DSL) or substantially any other backhaul pipe to a femtocell gateway within a service provider network, the femtocell gateway can include one or more gateway nodes and can be part of femto network platform. It is noted that the femtocell gateway can perform various functions of a Universal Mobile Telecommunications System (UMTS) Radio Network Controller (RNC), and it connects to service provider core network elements (e.g., Mobile Switching Center Server/Media Gateway (MSS/MGW), Serving General Packet Radio Service (GPRS) Support Node (SGSN), or Gateway GPRS Support Node (GGSN)) using standard Iu-CS and Iu-PS interfaces, whereas support of IuR, logical connections to disparate femtocell gateways or RNCs can be either avoided or provided based on overhead and necessity considerations.

In yet another aspect, subscribers with Third Generation (3G) capable phones can receive data service subject to appropriate charges, and voice services (e.g., mobile-to-mobile, land-to-mobile, mobile-to-land, push to talk, group conferencing) on the femtocell substantially similar to macrocell service. In addition, subscribers can purchase a feature with a monthly recurring charge (MRC) which provides substantially unlimited voice time units (e.g., minutes) or substantially unlimited data while served through femtocell coverage.

Various example aspects of femto service framework such as point of sales (POS) system(s), billing system(s), online account management, femto cell account database for femto profile and account management, customer care and support, and mediation and rating are also provided.

Aspects, features, or advantages of the subject innovation can be exploited without reliance on specific wireless network architecture or radio technology and specific communication protocols associated therewith. In particular, aspects, features, or advantages of the subject innovation can be exploited in substantially any wireless telecommunication, or radio, technology; for example, Wi-Fi, Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP UMTS; High Speed Packet Access (HSPA); High Speed Downlink Packet Access (HSDPA); High Speed Uplink Packet Access (HSUPA), or LTE Advanced. Additionally, substantially all aspects of the subject innovation can include legacy telecommunication technologies.

It is noted that various aspects, features, or advantages of the subject innovation are illustrated in connection with femto access point(s) and associated femto network platform, such aspects or features also can be exploited in indoor-based base stations (e.g., home-based access point(s), enterprise-based access point(s)) that provide wireless coverage through substantially any, or any, disparate telecommunication technologies such as for example Wi-Fi (wireless fidelity) or picocell telecommunication.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
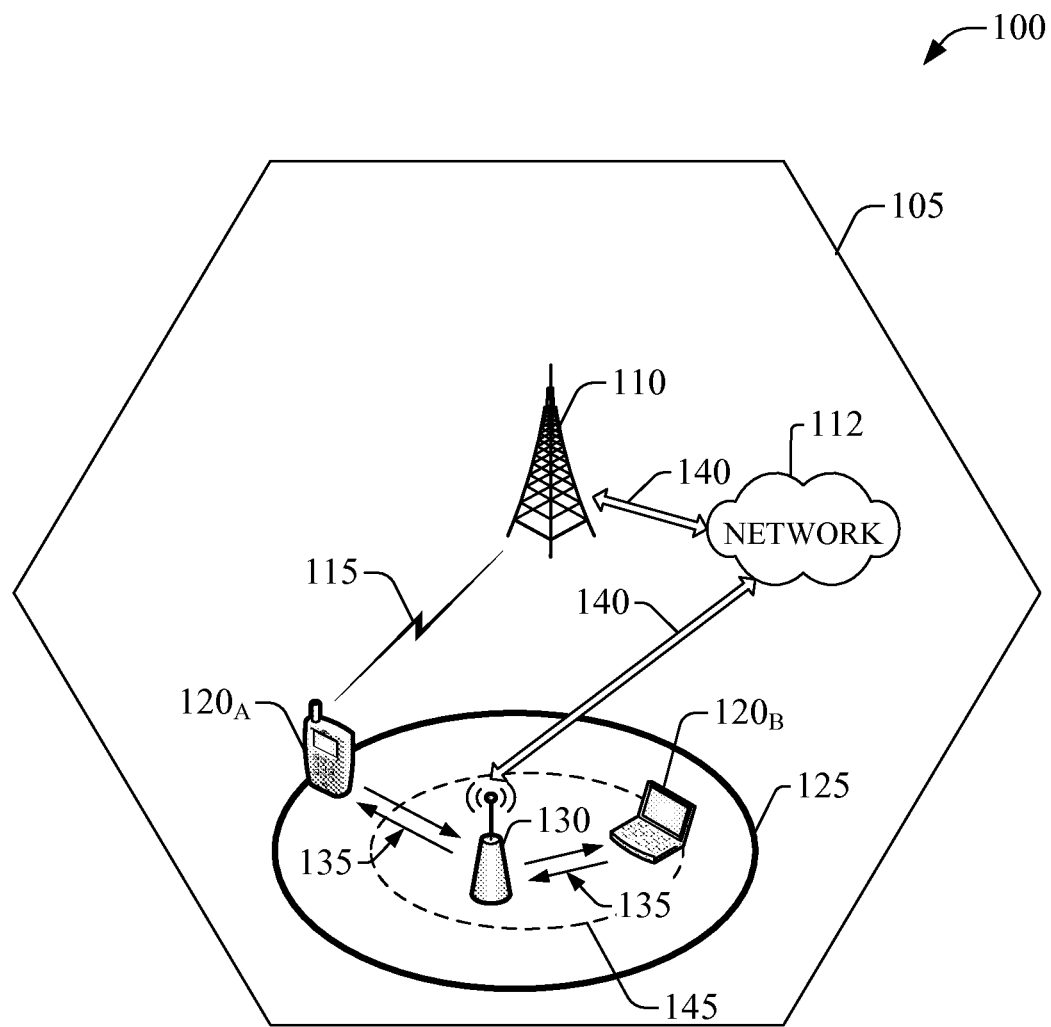
FIG. 1 a schematic deployment of a macrocell and a femtocell for wireless coverage in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "system," "platform," "component," "service," "framework," "interface," "driver," "tier," "layer," "node" and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. As utilized herein, the term "prosumer" indicate the following contractions: professional-consumer and producer-consumer.

In addition, the terms "wireless network" and "network" are used interchangeable in the subject application, when context wherein the term is utilized warrants distinction for clarity purposes such distinction is made explicit.

Referring to the drawings, FIG. 1 illustrates a schematic wireless environment (e.g., a network) 100 in which a femto cell can exploit various aspects described in the subject specification. In wireless environment 100, area 105 represents a coverage macro cell which is served by base station 110. Macro coverage is generally intended for outdoors locations for servicing mobile wireless devices, like UE $120_A$, and such coverage is achieved via a wireless link 115. In an aspect, UE 120 can be a Third generation partnership project (3GPP) Universal Mobile Telecommunication System (UMTS) mobile phone.

Within macro coverage cell 105, a femto cell 145, served by a femto access point 130, can be deployed. A femto cell typically covers an area 125 that is determined, at least in part, by transmission power allocated to femto AP 130, path loss, shadowing, and so forth. It should be appreciated that in certain deployment scenarios, area 125 can be substantially the same as 145. Coverage area typically is spanned by a coverage radius that ranges from 20 to 100 meters. Confined coverage area 145 is generally associated with an indoor area, or a building, like a residential or small business setting which can span about 5000 sq. ft. Femto AP 130 typically services a few wireless devices (e.g., subscriber station $120_B$) within confined coverage area 145. In an aspect, femto AP 130 can integrate seamlessly with substantially any PS-based and CS-based network; for instance, femto AP 130 can integrate into an existing 3GPP Core via conventional interfaces like Iu-CS, Iu-PS, Gi, Gn. Thus, operation with a 3G device and devices with a 3G subscriber identity module (SIM) card is straightforward with femto AP 130, and seamless when handoff to macro cell, or vice versa, takes place. It is to be noted that substantially all voice or data active sessions associated with users within femto cell coverage (e.g., area 125) are terminated once the femto AP 130 is shut down; in case of data sessions, data can be recovered at least in part through a buffer associated with a femto gateway at the network. Coverage of a suspended or hotlined subscriber station or associated account can be blocked over the air-interface, or through the RAN. However, if a suspended or hotlined customer who owns femto AP 130 is in Hotline/Suspend status, there is no substantive impact to the customers covered through femto AP 130. In another aspect, femto AP 130 can exploit high-speed downlink packet access in order to accomplish substantive bitrates. In yet another aspect, femto AP 130 has a LAC (location area code) and RAC (routing area code) that is different than the underlying macro network. These LAC and RAC are used to identify subscriber station location for a variety of reasons, most notably to direct incoming voice and data traffic to appropriate paging transmitters.

As a subscriber station, e.g., UE $120_A$, leaves macro coverage (e.g., cell 105) and enters femto coverage (e.g., area 125), as illustrated in environment 100, UE $120_A$ attempts to attach to the femto AP 130 through transmission and reception of attachment signaling, effected via a FL/RL 135; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE $120_A$ can be employed seamlessly after either of the foregoing transitions. In addition, femto networks typically are designed to serve stationary or slow-moving traffic with reduced signaling loads compared to macro networks. A femto service provider (e.g., an entity that commercializes, deploys, and/or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources as well.

When an attachment attempt is successful, UE 120 is allowed on femto cell 125 and incoming voice and data traffic are paged and routed to the subscriber through the femto AP 130. It is to be noted also that data traffic is typically routed through a backhaul broadband wired network backbone 140 (e.g., optical fiber backbone, twisted-pair line, T1/E1 phone line, digital subscriber line (DSL), or coaxial cable) associated with broadband network 112. To this end, femto AP 130 is connected to the broadband backhaul network backbone 140 via a broadband modem (not shown). In an aspect, femto AP 130 can display status indicators for power; active backhaul broadband, e.g., DSL, connection; and gateway connection. In another aspect, no telephone landline is necessary for femto AP 130 operation.

It is to be noted that as a femto AP 130 generally relies on a backhaul network backbone 140 for routing and paging, and for packet communication, substantially any quality of service handles heterogeneous packetized traffic. Namely, packet flows established for wireless devices (like terminals $120_A$ and $120_B$) served by femto AP 130, and for devices served through the backhaul network pipe 140. It is to be noted that to ensure a positive subscriber experience, or perception, it is important for femto AP 130 to maintain a high level of throughput for traffic (e.g., voice and data) utilized on a mobile device for one or more subscribers while in the presence of external, additional packetized, or broadband, traffic associated with applications (web browsing, data transfer (e.g., content upload), and the like) executed in devices within the femto coverage area (e.g., either area 125 or area 145).

Figure 2:
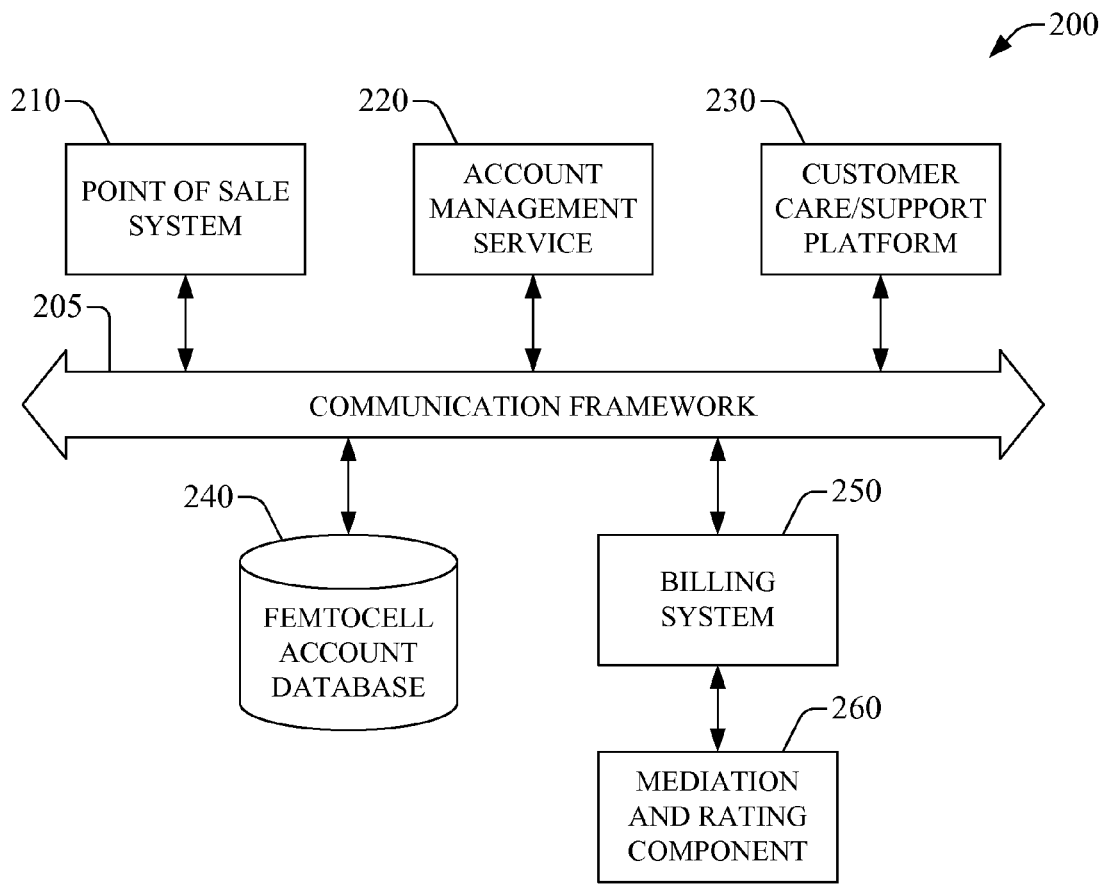
FIG. 2 is a block diagram of an example femto cell service framework in accordance with aspects disclosed herein.

FIG. 2 is a high-level block diagram of an example femtocell service framework 200 in accordance with aspects described in the subject innovation. Femto cell system framework 200 includes a point of sale (POS) system 210, also termed herein POS 210, which enables purchase of femto cell equipment, or femto access point, and returns and exchange as well. In addition, POS 210 enables addition of femtocell feature plans to customers that have access to a femto AP or are subscribed to wireless communication plan(s) for a service provider, or network operator, that administers femto cell coverage. In addition, POS 210 manages inventory of femtocell access points (APs) and associated equipment, such as spare parts. Femtocell customer premise equipment (CPE) purchased through POS 210, and accounts for femtocell coverage opened via POS 210 can be configured via account management service 220. This service is typically networked, and can be based off a web-based interface.

Various aspect of the subject innovation in connection with POS 210 include: (i) Femto cell CPE can be purchased by subscriber(s) and non-subscriber(s) of service provider, or network operator. (ii) POS 210 comprise substantially all sales channels that support sales of wireless communication equipment and plan add-on features (e.g., femtocell voice and femtocell data add-on features), such add-on features can be conveyed through catalogues in various media and mechanisms (e.g., direct mail solicitation, advertisement). In an aspect, resellers (e.g., mobile virtual network operators (MVNOs)) may not be encompassed in POS 210. It should be noted that POS 210 can implement limitations based on business and operation consideration(s) that can favor access to add-on features from subscriber(s) with postpaid subscribed service(s) with the network operator or service provider. (iii) Furthermore, POS 210 can structure commission schemes for at least one of voice, data, and add-on features in a conventional manner, or it can implement customized commission schemes to enhance specific markets and retailers, customer segments, business regions, and so forth. (iv) POS 210 can determine policies that make return and exchange of femtocell equipment, e.g., a femto AP, available in retail stores, e.g., offline corporate (COR) locations or touch points, rather than via direct fulfillment (DF) or through an online or networked interface. In addition, such policies can regulate warranty execution for femtocell equipment. Return of femto devices can be implemented in a conventional manner, e.g., in accordance with policy for wireless network devices or user equipment, or alternatively in accordance with custom mechanism(s) dictated by business operation(s). (iv) POS 210 can also implement mail-in rebates, which can be provided to customers who purchase femto cell equipment and meet a set of predefined business criteria. (v) It should be appreciated that to avoid complexity at a time of a purchase (or provisioning), no check is conducted to confirm that a customer has access to a 3G handset(s) or 3G subscriber identity module(s) (SIM(s)).

Account management service 220 provides customers with various configuration tools, such as secure login to an online account for registration and activation of femto AP and associated service, management of acquired femto access service (e.g., settings of voice and data, which can include video-streaming, music-streaming, IP-based television, online gaming, calendar and other organization tools; add-on features; generation and maintenance of femto access lists (e.g., white lists); parental monitor configuration (e.g., creation of voice and data usage logs) . . . validation and access to emergency call service like enhanced 911 (E911) for provided address(es), validation of service provider licensed coverage for provided address(es), network provisioning, and so on. In an illustrative aspect of the subject innovation, address(es) validation can be accomplished through a customized interface to a service provider of geographical location coordinates, or indicators, even though other location services can be utilized, including proprietary or custom services. It should be noted that substantially all subscriber configurable settings associated with a femtocell service account can be handled via customer self-care through the femto cell account management service 220, or a provisioning site at which a femtocell will operate. Moreover, a set of frequently asked questions (FAQs) and customer training can enable a customer to update his/her address when the femto AP (e.g., femto AP 130) is physically displaced, or relocated. Registration and activation updates, and update to femtocell service account settings can be notified to a customer through a notification service, which can include at least one of email, instant messaging (IM), short message service (SMS), multimedia message service, or the like.

Account management service 220 can facilitate femto cell provisioning through a networked interface, e.g., a self-service or self-care web portal, which can further support aspects of femtocell service account registration and equipment activation, and account management, which can include access list(s), e.g., white list(s), configuration. Femto cell provisioning web portal, or networked interfaced, can support consumer and business customers. In addition, femto cell provisioning networked interface, or web portal, can provide information on the femto cell activation process through a set of frequently asked questions, which can be updated at specific time intervals based upon information collected through customer care/support platform 230, for example. Active subscribers with access to an online management account, for example, or substantially any other web-based or networked interface, can access femto cell provisioning site.

In addition, purchase of equipment and account management can be supported via customer care/support platform 230: Customer care agents that operate through platform 230 can facilitate activation/deactivation of service, configuration of access list(s), e.g., white lists, validation and changes of address, adjustment to rate plans for femto coverage, creation of linked femto accounts such as CRU accounts that are created under a main enterprise account, etc. Moreover, customer care/support platform 230 agents can add or remove femtocell voice or femtocell data service(s), and femtocell add-on features to or from a customer account. Product description, pricing, and availability can be available, e.g., over a networked interface or communication framework 205, to all audiences that can access customer care/support platform 230. In addition, troubleshooting support information and escalation procedures can be available to appropriate audiences within customer care/support platform 230 based at least in part upon established work group responsibilities. In an aspect of the subject innovation, POS 210 and substantially all channels impacted outside customer care/support platform 230 can leverage off support content available in customer care/support platform 230. In another aspect of the subject innovation customer care/support platform 230 agents can input an address, in which the customer intends to use a femtocell access point, for at least one of femtocell wireless spectrum validation, enhance 911 (E911) service availability, or broadband service coverage, such validation is a courtesy check that can be optional and can be utilized as an instrument to enhance customer experience; such manipulation of femtocell information related to provisioning process for a customer can require a reference to M&Ps to be made.

In yet another aspect, customer care/support platform 230 can access current rebate programs as well as substantially any promotional campaign associated with femtocell coverage. Customers can download the mail-in rebate (MIR) forms from a dedicated online website, or can take the forms from a retailer or service provider stores. MIR forms can be sent to a database marketing group/section within service provider, e.g., POS system 210, to validate rebate eligibility. As an example, rebate eligibility can include evaluating whether a device MSISDN is active on a service provider platform. It should be appreciated that rebate validations can cover additional rebate eligibility checks.

In an aspect, customer care/support platform 230 can extract information retained in POS system 210 to inform subscriber about specific campaigns. In a further aspect, customer care/support platform 230 agents can instruct a customer who has lost, or misplaced, their unique femto equipment identifier, and thus cannot activate it, to locate the unique identifier in a purchase receipt, equipment box, or on another device. It is noted that agents are unable to retrieve a unique equipment identifier (EID) through femto cell service network or account management service 220. In a further yet aspect, customer care/support platform 230 can have visibility into location status, femto device status indicators for registration and activation, account settings, and capability to shutdown or reboot a femto cell, in order to troubleshoot customer issues. It is noted that femtocell troubleshooting can be managed or supported by Data Support/PMC.

Further to example framework 200, femto equipment (e.g., femto AP, accessories, parts) and service plan purchases, as well as retention of femto service, can be managed through billing system 250 in accordance with mediation and rating component 260. Billing system 250 includes charges administration for voice and data service plans, and add-on feature plans (e.g., on-demand video and music, Internet Protocol (IP)-based television (TV) shows, multicast conferencing, etc.). Moreover, billing system 250 includes tracking service-oriented communication (SoC), or a tracking flag, in a mobility profile, e.g., 427, associated with femtocell equipment profile or femtocell account profile for active or registered femtocell subscribers. It is noted that substantially any or any indication that a subscriber possesses a femtocell service account can be utilized; for instance, an indication can include at least one of a logical, numeric, or alphanumeric variable.

Various aspects of billing system 250 and mediation and rating component 260 are presented next. (i) Point of origination billing can be implemented to rate the calls based on whether the call originated on macro or femto network. (ii) A customer who has voice, data, and add-on features or SoCs can be rated against the features, otherwise the customer's regular voice or data units (e.g., minutes, Kbs) can be decremented accordingly. (iii) Billing system can include a component (not shown) that formats invoice (e.g., bill) presentation so as to display Femtocell billed usage via separate identifiers in accordance with the following illustrative and non-limiting types of usage:

Femtocell Kb data bucket
    Femtocell MMS data bucket
    Femtocell SMS/IM data bucket
    Femtocell Voice bucket Subscriber can access (e.g., view, or download) his/her billed usage for unlimited Femto cell minutes of use (MOU) free of charge. (iv) Femtocell coverage/service can be disconnected by end user or by billing system initiated on subscription cancelation, subscriber suspension, lack of invoice payment, etc. (v) Mediation and rating component can operate in accordance with a model based on the assumption that a femtocell site is assigned a unique cell-ID site. Thus, within such a model, voice mediation relies, at least in part on Mobile Switching Center (MSC), and LAC and cell-ID be defined and this combination be unique. To ensure uniqueness of cell-ID a pseudorandom sequence can be associated to the femto cell site, and cell-ID re-use can be utilized throughout a coverage region. Data mediation (e.g., mediation of GPRS/UMTS packet domain) also relies on the combination of LAC and cell-ID be unique. (vi) Mediation and rating component 260 can utilize femtocell LAC and cell-ID identifiers in MSC CDRs in substantially the same manner as these identifiers are utilized for non-femtocell cell-sites. In addition, mediation and rating component 260 can utilize femto cell LAC and cell-ID identifiers in SGSN Call Detail Records (CDRs) (S-CDRs) in substantially the same manner as utilized for non-femtocell cell-sites. Correlation of S-CDR attributes to other data usage CDR(s) is not performed by mediation and rating component 260. In addition, in an aspect of the subject invention, mediation and rating component 260 relies on the network providing LAC in GGSN and CSG EDR(s). It is noted that mediation during a correlation process can extract LAC from GGSN CDF or CSG EDR and include it within Instant Message/Multimedia Message Service (IM/MMS) CDR(s) for rating. (viii) Mediation and rating component 260 can get timely updates of femtocell cell sites (e.g., through an interface to customer care/support platform 230). (vii) To enable mediation, one or more networks that service macrocell and femtocell can recognize whether a call was initiated on the macrocell network or femtocell network.

POS 210 and conjunction with billing system 250 can generate commercial reports related to femto equipment sales, femto add-on features engaged or contracted. Such customer intelligence (e.g., information associated with a behavior of a consumer) can be stored in femtocell account database 240, or in a dedicated database therein. Such customer intelligence can be complemented with substantially any information available in database 240, and can be exploited for marketing campaign development and business forecasting, among other possible utilization. In addition, customer care/support platform 230 can manage, at least in part, mobility billing issues that can be identified within billing system 250. A combined billing and support group can manage combined billing customer issues.

Generally, an Interactive Voice Response (IVR) system can route femtocell subscriber calls to appropriate business (e.g., POS stores or corporate stores, e.g., 1660), billings, or consumer care/support systems or platforms for femtocell support. However, it should be appreciated that subscriber can be routed to specific customer representatives or agents of customer care/support platform 230 via an online session, such as a chat session, an instant message (IM) session, or videoconferencing, particularly for corporate subscribers with large femtocell deployments and substantive subscribers included in various access lists.

Substantially all information associated with subscriber(s) plan and configuration thereof can be stored in femtocell account database 240. Additional operation information associated with substantially any component, system, or platform that is a part of femtocell service framework can be stored in database 240. It should be noted that femtocell account database 240, or substantially any femtocell account database described herein, can exploit a database manager (DBM) functionally coupled thereto to implement substantially any mechanism for efficient data storage and manipulation, such as multidimensional data schemes, hierarchical representation, data compression based on parsimonious representations, wavelet compression, distributed database deployment. In the latter case, femtocell account database 240 comprise various dedicated databases that contain information based in accordance with markets, customer location, customer segments, etc. In an aspect of the subject innovation, femto cell account database is identified as a directory database (DD) for femtocell, or femtocell customer directory. The directory database (DD) is a main data repository, or database, for femto account profile(s) for online account management as described herein. Femto account profile(s) attributes can include, but are not limited to including, operation or activation status, such as an active flag which can be a logical variable or an alphanumeric variable; customer telephone number (CTN); equipment identification (ID) (EID) or customer premise equipment (CPE) ID; addresses and associated geographical indicator(s) (e.g., global positioning system (GPS) coordinates (x,y)); device, e.g., femto AP, label or "nickname" which typically can be determined, or configured, by a subscriber; effective date of registration; expiration date of service; manual override; network cell global identity (CGI), network CGI effective date, and network CGI expiration date. It should be appreciated that (x,y) coordinates of femtocell location addresses obtained through a geographical-indicator service provider, can be stored in a dedicated database within directory database 480 (DD). In another aspect, such dedicated database within DD also can store femtocell customer profile(s), access list(s) such as white list(s) or black list(s), or unique equipment identifier(s).

Figure 3:
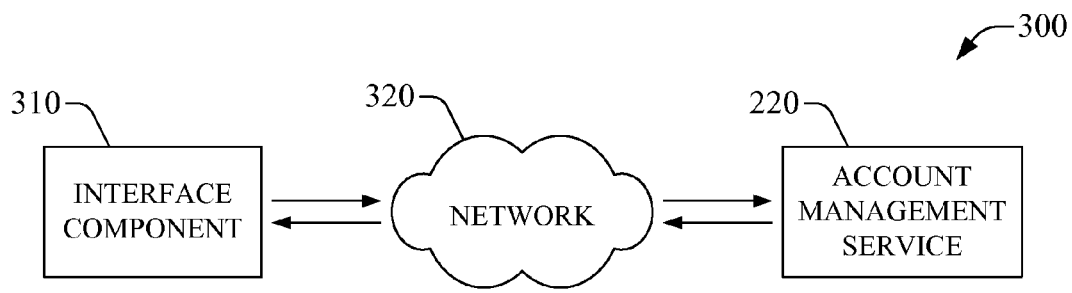
FIG. 3 is a block diagram of an example system that enables femtocell service account management in accordance with aspects described herein.

FIG. 3 is a block diagram of an example system 300 that enables femtocell service account management in accordance with aspects described herein. Management can include creation of a femto service account, generation of a femto account profile, and manipulation of access list(s), such as white list(s) or black list(s). Interface component 310 is linked through a network 320 to account management service 330. Network 320 can include one or more broadband networks such as a wide area network (WAN), a local area network (LAN), or a backhaul pipe such as backhaul network backbone 140. As an example, broadband network 320 can include a non-mobile broadband internet service provider, a local area network such as an enterprise network, or a mobile network platform (e.g., a core network in a cellular telecommunication environment).

Interface component 310 can allow delivery of attribute field values or information such as addresses, customer telephone numbers (CTNs), notification email addresses, add-on feature selection(s) or request(s), or the like that can enable, at least in part, configuration or setup of femto account(s) and related femto account profile(s), which can include access list(s) such as white list(s) of wireless mobile station numbers approved for coverage through a specific femto access point, e.g., femto AP 130. In addition to configuration of white list(s), interface component 310 can allow, at least in part, configuration of black list(s), which explicitly identify mobile devices that are to be excluded from femto coverage through access point 130 and that upon attachment to femto AP 130 can trigger an exception handling procedure. Moreover, interface component can enable, at least in part, configuration of relative service priority among mobile devices included in a white list. Moreover, interface component 310 can access a subscriber database (not shown) through network 320, in order to extract identification numbers, codes, tokens, or labels for subscribers/subscriber stations that can be entered in an access list, e.g., a white list.

In an aspect, interface component 310 can be a web-based, online graphic user interface (GUI) such as a conventional web browser that provides access to the internet e.g., network 320. However, it is noted that other networked interfaces to allow entry of attribute field values to configure access list(s), e.g., white list(s) or black list(s), or femto account profile(s) are possible; for instance, interface(s) commanded through at least one of voice or sound, touch, or biometric registers such as fingerprint pattern, iris pattern, deoxyribonucleic acid (DNA) profile, or the like. In example scenarios, it should be appreciated that biometric-driven interface(s) can be employed in environment(s) wherein addition(s) to white list(s) 343 or black list(s) 341, or white list profile(s) 345 is controlled by authorized personnel with specific clearances to add/remove attribute fields, since communication can be classified.

It is noted that interface component 310 can be associated with a consumer subscriber or a business subscriber. In addition, customer care agents or representatives can have a dedicated interface component that allows, at least in part, access to account management service 220. Interface component 310 can reside within customer care/support platform 230 or any customer care platform described herein. As an example, interface component 310 can include an internet browser that comprises a set of webpages or any other graphical user interfaces (GUIs) that include a web link, e.g., a Uniform Resource Locator (URL), to a landing webpage within a web tier that is part of account management service 220. (See below.) Remote connectivity to the femto web landing page can assists customer a care representative that customer care/support platform 230 with retrieving femtocell related product information, service features and availability, multimedia demonstration(s) of femtocell operation, information on registration and provisioning process, or the like.

Access list(s), e.g., white list(s), are an instrument (e.g., a component) for management of access to femtocell coverage through a specific femto AP. An access list, e.g., a white list, can establish access authorization, prioritization and revocation of subscriber(s) or subscriber station(s). As an example, an access list, e.g., a white list, can comprise wireless mobile station numbers approved for coverage through femto access point 130. It is to be noted that substantially any identification token(s), label(s), or code(s) that identify a subscriber station can be employed. Access list(s) can be stored in the data storage or memory (e.g., in volatile storage) within femto AP 130. Additionally, or alternatively, access list(s) can be stored in disparate (e.g., non-volatile) network components such as a network component (e.g., radio network controller, serving node(s), gateway node(s)) administered by a service operator. In an aspect, access list(s) can be retained within a dedicated femtocell account database 460.

In addition to admission control such as regulation of attachment attempts, access list(s), e.g., white list(s), can be employed for at least one of optimal or nearly-optimal paging, e.g., only IMSI(s) included on the access list(s) of a whitelisted AP are paged; assessment of optimal or nearly-optimal reject mechanism, e.g., different reject mechanisms if home AP LAC is same as visited AP LAC; or to control which AP accepts incoming handovers.

In a non-limiting example, access list(s), e.g., white list(s), or any set of numbers, codes or tokens thereon, that comprise a set of mobile phones approved for coverage by femto AP 130, can be portable through accounts or billing groups associated with a set of subscribers to a service operator that administers femto AP 130, or a macro network. As an illustration, femtocell voice and femtocell data add-on features can apply to substantially any femtocell in which a subscriber is incorporated into a white list associated with the femtocell. It should be appreciated that, in an aspect of the subject innovation, non-subscribers of femto service provider, or network operator, are unable to connect to a femto cell serviced by a femto provider; when a non-subscriber number is added to a white list, the non-subscriber fails to connect to the femtocell. As another illustration, access list(s), e.g., white list(s), can support up to N fields (N a positive integer; e.g., N=50) for unique mobile phone numbers (e.g., a mobile device identifier such as a 10-digit mobile directory number, a Mobile Subscriber Integrated Services Digital Network (MSISDN) number, an international mobile subscriber identity (IMSI) number, an international mobile equipment identity (IMEI), a temporary mobile subscriber identity (TMSI), packet TMSI (P-TMSI), an international mobile equipment identifier (IMEI), a mobile directory number (MDN), a mobile identification number (MIN), a Telecommunications Industry Association (TIA) electronic serial number (ESN), or a multi-bit identification number like the mobile equipment identification (MEID) code), or any suitable identifying codes or tokens. The number N of fields can be determined, or configured, by a service operator based at least in part on technical aspects (like network resources, quality of service (QoS) considerations; macrocell network area of coverage (e.g., Metropolitan Statistical Area/Rural Statistical Area (MSA/RSA), or the like) and commercial aspects such as promotional considerations, mitigation of customer attrition, gains in market share, etc., and subscriber type, e.g., consumer or enterprise; or aspects of provision of coverage. As an example, N can be subscriber dependent or femto AP dependent. It should be appreciated that, in an aspect of the subject innovation, end users are exposed to, and provide, one or more MSISDN(s) for inclusion in access list(s), e.g., 468, such mobile device identifiers are mapped, e.g., via a lookup mechanism, to actual Internation Mobile Subscriber Identity (IMSI) number(s) that one or more network component(s) can exploit. Femto account manager 605 can enable or implement such the lookup mechanism that effects mapping of a Mobile Subscriber Integrated Service Data Network Number (MSISDN) to an IMSI, or substantially any mapping that renders a mobile device identifier, code or token, provided by a user into a format that can be utilized by one or more network components.

In addition, access list(s), e.g., white list(s) or black list(s), can include various degrees of complexity. In an aspect of the subject innovation, white list(s) entries can be pre-populated with individual responsibility user (IRU) identifying information; business and consumer account holders information; active and suspended MSISDNs, IMSIs, IMEIs, ESNs, or substantially any other code or token. Deselect option flag(s) or attribute field(s) also can be provided in a pre-populated access list, e.g., a white list. As an example, it is noted that a white list can be associated with disparate white list(s) at the device identifier level, e.g., MSISDN level. Updates to at least one of access list(s), e.g., white list(s) or black list(s), or femto account profile(s) can be notified to a customer via email communication, instant message (IM), short message service (SMS) communication, multimedia message service (MMS) communication, or the like. In an aspect, email account(s) or address(es) for notification can be configured at the time of establishment of a femto account creation and generation of a profile associated with the femto account.

In an aspect of the subject innovation, when disparity among femto cell and macro cell billing and cost implication occur, a femto cell subscriber can be informed whether or not coverage, or wireless coverage, is provided through a femto cell. In particular, a whitelisted mobile can be provisioned an updated network indicator display when served through a femto cell. Upon entry in access list(s), e.g., white list(s), network or service provider can convey via SMS, MMS, IM, email, or the like, updated alphanumeric tag requirement(s), or substantially any other requirement(s), to a specific subscriber station. Such requirements can include a femto AP identifier and associated alphanumeric network display. After an update, the subscriber station can display the specified indicator while attached, or camped, on the femto AP.

In an aspect of the subject innovation, white list profile parameters that control utilization logic of access list(s), e.g., white list(s), content include, without being limited to including: (i) temporary access, e.g., full access for a specific time interval such as days or hours; (ii) access only within a window of time in a day (voice and data allowed from 9:00 a-6:00 p, or voice allowed after 9:00 p which can facilitate billing schemes already established by an operator/service provider); (iii) access to specific applications such as scheduler, calendar(s), news streaming, authoring tools, gaming, video and music, etc.; and (iv) relative priority of each access list, e.g., white list, subscriber entry. Relative priority can control service, e.g., voice calls or data sessions, delivery to subscribers included in an access list and attached to a femto AP for which the access list regulates control thereto. When the femto AP is overloaded and higher priority calls are queued, lowest priority calls can be pushed, or handed off, to macrocell coverage, and highest priority calls can be served on the femto AP. It is noted that an emergency call, e.g., enhanced 911 (E911), has the highest priority for service in the femto AP. A "priority access" priority class, which can be configured by a service provider, for example, can have the second highest priority and be assigned to subscriber(s) within the service account linked to the femto AP; e.g., user equipment (UE) for the subscriber that creates the service account can have priority access. In addition, a set of P configurable subscriber priorities, with P a natural number, can be established as part of an access list, e.g., white list, and utilized to prioritize service calls for subscribers included in the access list. It is noted that predetermined criteria, e.g., minimum signal strength or quality, for macrocells have to be met prior to handing off mobile devices with lowest priority in an access list to such macrocells. For instance, mobile devices with strongest macrocell signal can be handed off first. Through one or more white list profile parameters, a subscriber also can reserve femto AP capacity for specific access list, e.g., white list, subscriber priority classes. In such a case, other priority and overflow mechanisms can apply to remaining non-reserved capacity.

Figure 4:
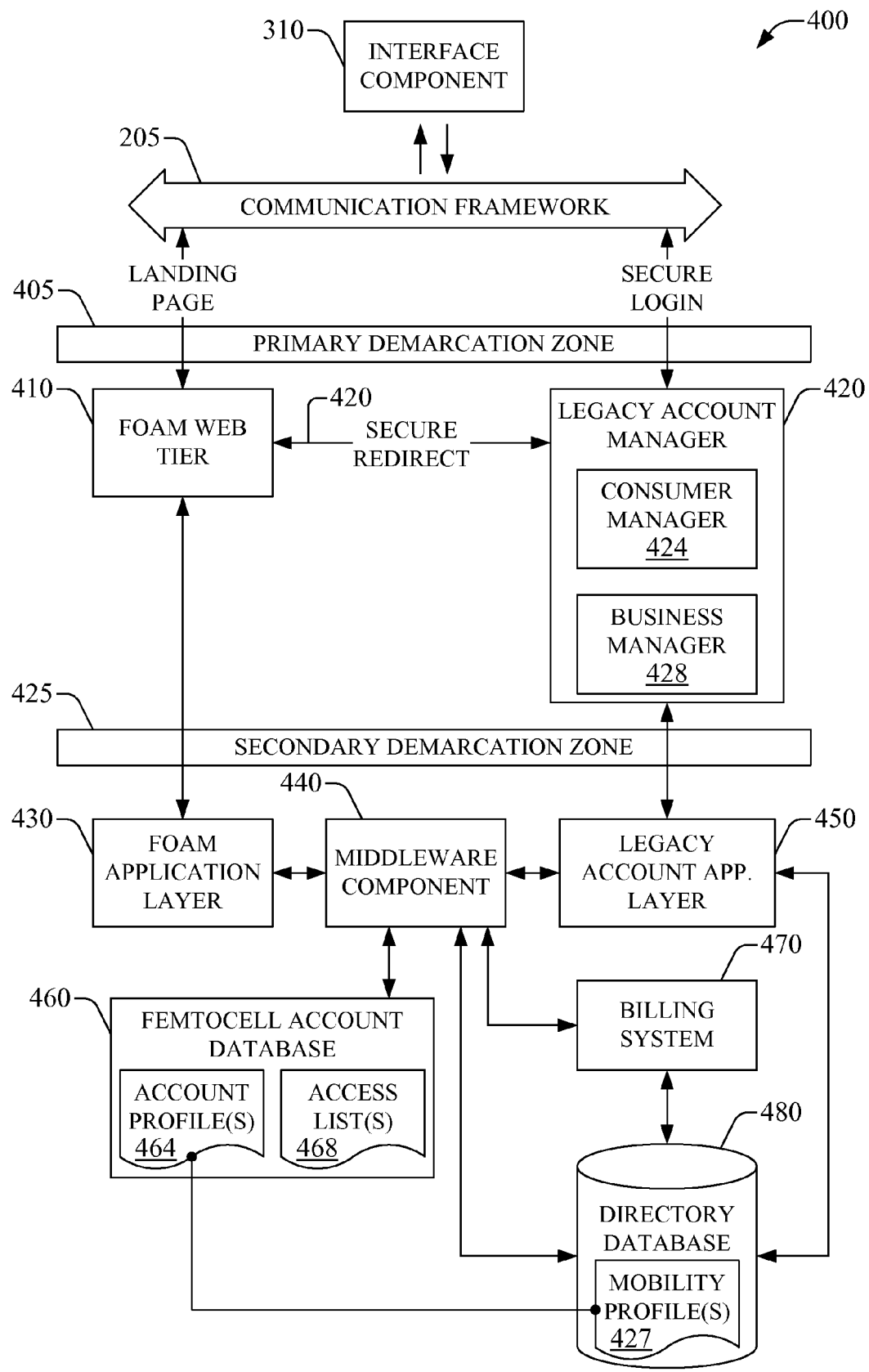
FIG. 4 illustrates an example embodiment of an account management service in accordance with aspects described herein.

FIG. 4 illustrates an example embodiment 400 of account management service 220 in accordance with aspects described herein. Account management service 220 comprises two layers that can be distinguished through two disparate demarcation zones, e.g., a primary demarcation zone 405 and a secondary demarcation zone 425. The primary demarcation zone 405 includes a Femto Online Account Management (FOAM) web tier 410 and a legacy account manager component 420, also termed herein legacy account manager 420, that enables account management for conventional consumer or business accounts; in an aspect, a consumer manager component 424, also termed herein consumer manager 424, enables management of consumer accounts, whereas a business manager component 428, also termed herein business manager 428, allows management of business accounts. FOAM web tier 410 can include a web site through which femtocell customers can create account profile(s) for acquired equipment, register and activate femto AP(s) on the service provider network, and manage access list(s), e.g., white list(s), and addresses. In an aspect, legacy account manager 420 receives signaling for secure login from an interface component 310. Upon successful login, legacy account manager 420 securely redirects a session to FOAM web tier 410 and a landing webpage hosted therein. As an example, secure redirection can exploit hypertext transfer protocol secure (HTTPS) with advanced encryption standard (AES) with P-bit key(s), P being a natural number, such as 256-bit key(s). Other secure mechanisms also can be utilized, such as at least one of secure shell (SSH) login, Internet protocol security (IPsec), virtual private network (VPN) environment(s), or the like. Such secure session can enable creation of a femtocell account profile, e.g., 464, which can be retained in femtocell account database 460. For extant femtocell account profile(s), upon successful login, legacy account manager 420 can securely redirect a session to FOAM web tier for femtocell account profile management. Account profile(s) 464 can be configured by a subscriber, e.g., a consumer subscriber or a business subscriber, at the time of creation of a femtocell service account. Alternatively or additionally, an account profile can be created, at least in part, by one or more network management component(s).

Secondary demarcation zone 425 can include a FOAM application layer 430 that interfaces with FOAM web tier 410 and internal information technology back office systems of the service provider. In order to access internal services, secondary demarcation zone includes middleware component 440 that can extract information from billing system 470, femtocell account database 460, and directory database 480. In addition, secondary demarcation zone 425 also can include legacy account application layer 450 that can access directory database 480 and provides at least part of the functionality to legacy account manager 420.

In an aspect, FOAM application layer 430 and middleware component 440 can manage femtocell service workflow for at least one of femtocell wireless coverage validation and network registration; validation and activation of emergency services such as enhanced 911 (E911); or management of access list(s), e.g., white list(s), monitoring of a femto AP registration or activation status, change of address location of a femto AP, addition or removal of access point equipment, disconnection from telecommunication network, or femtocell service account deletion. In an aspect, a femtocell subscriber who registered and activated a femto AP (e.g., femto AP 130) is allowed to manage access list(s), or white list(s), of the femto AP within his/her femtocell account profile, which can be created through account management service 220. In another aspect of the subject innovation, access list(s), e.g., white list(s), owners based on configured privileges associated with subscriber femtocell account profile 464 can view which subscriber is actively registered on their femto cell. For instance, an administrator subscriber can manage femtocell service within an enterprise femto network, which can comprise a set of one or more femto APs and serve a set of corporate responsibility users (CRUs); the administrator subscriber can monitor registration or inclusion for service supplied through a group of femto APs that are part of an enterprise femto network.

Femtocell account profile(s) 464, also termed herein account profile(s) 464, which can be created through account management service 220 as discussed below, can be retained in femtocell account database 460. In an aspect, femtocell account profile(s) 464 can be linked, or associated, with subscriber mobility profile(s) 484, also herein referred to as mobility profile(s) 484, that is retained within directory database 480, which can include subscribed information for mobility service provided through a macrocell network. In addition, access list(s) 468, e.g., white list(s), can be retained in femtocell account database 460. It should be appreciated that while account profile(s) 464 and access list(s) 468 are illustrated as residing separately within femtocell account database 460, in one or more additional or alternative embodiments, account profile(s) 464 can include access list(s) 468. One or more access list(s) 468 can be linked to a single account profile, particularly in enterprise femto network deployments. Mobility profile(s) 427 can be associated with consumer mobility account profile(s) or business mobility account profile(s).

To generate a femtocell account profile, a subscriber is securely redirected from femto web tier 410 to legacy account manager 420 for secure login to the subscriber mobility account profile, e.g., mobility profile 427. Based on subscriber type, e.g., a consumer subscriber or business subscriber, secure redirection is effected towards consumer manager 424 or business manager 428. Upon successful login, legacy account manager 420 can securely redirect control of the secured session to FOAM web tier 410, which directs control to FOAM application layer 430. Secure redirection can exploit hypertext transfer protocol secure (HTTPS) with advanced encryption standard (AES) with 256 bit key(s) or other secure mechanisms such as secure shell (SSH) login, Internet protocol security (IPsec), virtual private network environment(s), or the like. Secure redirection can include at least one of the subscriber mobility CTN or a notification service address, such as an individual responsibility user (IRU) or a corporate responsibility user (CRU) email address for consumer subscriber(s) or business subscriber(s), respectively. In an aspect of the subject innovation, in a scenario in which a notification service address, e.g., email address, in not present in the secure redirect, FOAM application layer 430 can collect a notification service address in at least two manners: (1) Collection of legacy notification service address(es). FOAM application layer extracts, through legacy account manager 420 and legacy application layer 450, one of an IRU email address or a CRU email address retained in a mobility profile associated with mobility CTN. (2) Subscriber input. When extraction of IRU or CRU email address fails, FOAM application layer 430 can allow a subscriber to provide the address of a notification service, e.g., email service. Provision of the notification service address is accomplished interactively via FOAM web tier through remote interface component 310. A notification service address supplied by a subscriber can be relayed to FOAM application layer 430 and delivered to middleware component 440, which can record the received service address in a 'Notification service address' within a created femtocell account profile linked to the subscriber mobility CTN.

Subscriber mobility CTN is, at least in part, the basis for association of a mobility account, e.g., mobility profile(s) 427, with a femtocell account profile, e.g., account profile(s) 464, created by the subscriber through FOAM application layer 410. Upon redirection, FOAM application layer 430 can instruct middleware component 440 to create a femto account profile within femtocell account database 460, the femtocell account profile linked to a mobility profile identified through the received mobility CTN, and associated with the received notification service address. In an example embodiment 600 of FOAM application layer, illustrated in FIG. 7, account creation component 607 can enable generation of a femtocell account profile. In an aspect, a femto database manager (DBM) (not shown in FIG. 4) can create the femto account profile and generate 'CTN' and 'Notification Service Address' attribute fields therein. Subsequent to creation of the femto account profile, the femto DBM can convey a signal to acknowledge the directive to create the femto account profile. Middleware component 440 can relay such signaling to FOAM application layer 430, which can return control to FOAM web tier 410 and prompt the subscriber, via interface 310, to configure an equipment profile for each equipment identifier (EID), e.g., a code or token, such as a serial number, that uniquely identifies a femto AP that is to be registered under the created femtocell account profile and with a telecommunication network of a service provider.

The equipment profile is associated with the unique EID for a corresponding femtocell access point (AP), the unique EID can be entered by the subscriber via interface 310 in accordance with a rendered web landing page, and delivered to FOAM application layer 430. An EID received at FOAM application layer 430 can be relayed to middleware component 440, which can conduct an integrity check on the EID value. As an example, an integrity check can include application of checksum rules such as Luhn algorithm to validate a received EID. When the EID value verifies the integrity check(s), middleware 440 can signal an indication to generate an equipment profile within a corresponding account profile retained in femtocell account database, and recordation of the EID in the generated profile. When one or more integrity checks fail, e.g., EID is an invalid serial number, middleware component 440 can deliver an error indication, which can be relayed to FOAM web tier 410 by FOAM application layer 430. Alternatively, or in addition, the error indication can convey an instruction to retry input of EID(s).

In an aspect of the subject innovation an equipment profile is extensible, and middleware component 440 can push records for various attributes fields within the equipment profile. In addition, subscriber input for attribute fields can be pushed into an equipment profile through FOAM application layer 430. In an aspect, an initial equipment profile can include (i) a specific address for the profiled femto AP, wherein the address discloses a location for prospective operation of the femto AP; and (ii) a mobility CTN associated with the femto account profile as part of an initial, or default, access list.

When a femtocell account profile is created and an equipment profile linked thereto is generated, FOAM application layer 430 can trigger a registration process of the femtocell equipment, e.g., femto AP(s), in a telecommunication network. The registration process can proceed after wireless spectrum coverage is validated and E911 service confirmed to be available for the address specified for the femtocell equipment.

Figure 5:
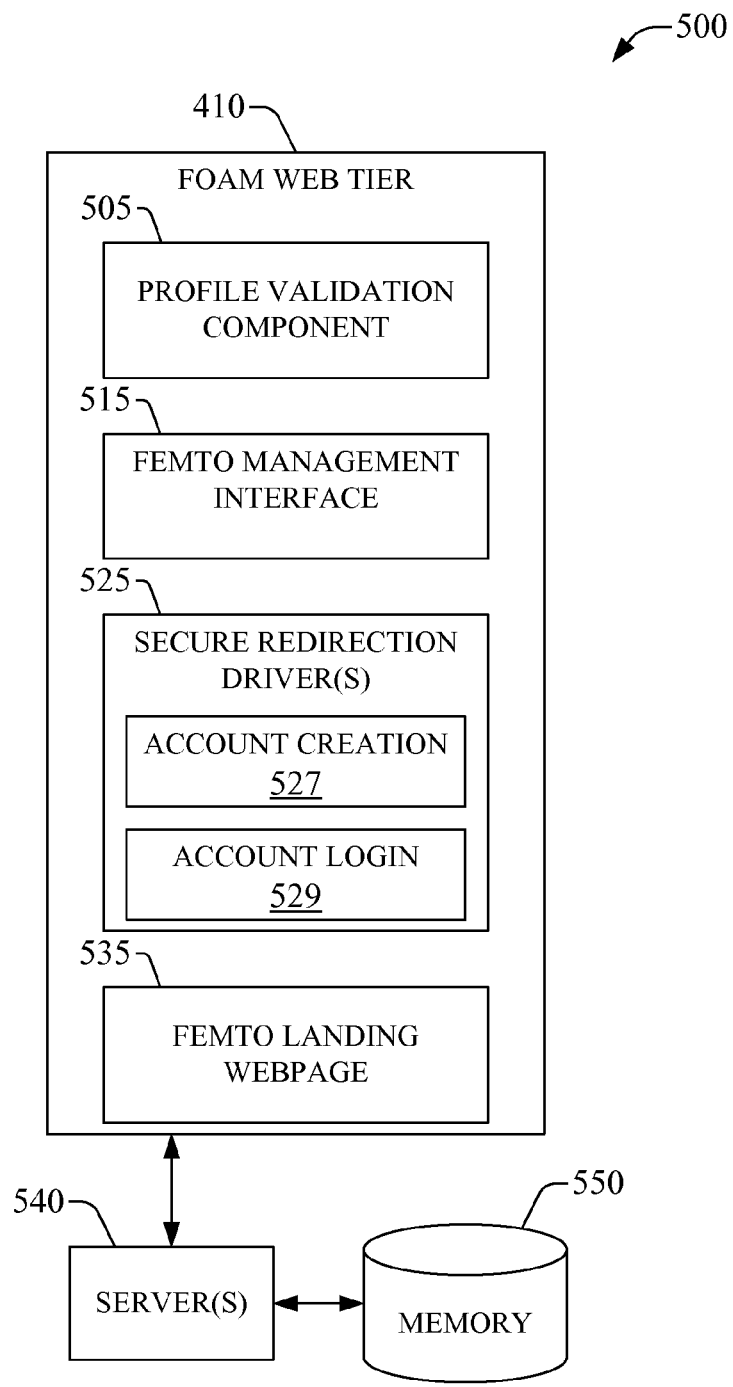
FIG. 5 is a block diagram of an example embodiment of a FOAM web tier in accordance with aspects described herein.

FIG. 5 is a block diagram of an example embodiment of a FOAM web tier 410 in accordance with aspects described herein. Femto landing webpage 535 can be accessed from various web locations such as service provider or network operator website; business partner website(s) such as web portal in which femtocell service or other mobility services are advertised by the network operator; or contractor website(s). Femto landing webpage can offer web links to educational material related to femtocell services and components of the femtocell solution. In addition, femto landing webpage 535 can direct an existing customer or prospective customer to purchase equipment, e.g., femto AP(s), and accessories thereof related to femtocell solution. Moreover, femto landing webpage 535 can allow existing subscribers or femtocell service or conventional mobility service(s) to identify themselves as part of access to femtocell account management service; identification of a subscriber conveys the relationship of the subscriber with the service provider, such as a consumer subscriber or a business subscriber.

Femto management interface 515 exposes a subscriber to various webpages selected through femto landing webpage 535 upon successful login. At least a portion of such pages provide one or more URLs to web portal for self-care such as address change, shutdown of equipment, replacement of equipment, on-line purchases, and the like, as described herein. In addition, femto management interface 515 can enable, at least in part, services provided through the various webpages, e.g., purchase of equipment and add-on features; educational resources such as femtocell related product information, service features and availability, multimedia demonstration(s) of femtocell operation, information on registration and provisioning process; troubleshooting, or the like. Content(s) presented through the various webpages linked to femto landing webpage can be retained in memory 550 and retrieved there from via server(s) 540. Femto management interface 515 also delivers and receives signaling and traffic to and from FOAM application layer 430, and components therein, as well as legacy account manager 420. Secure redirection driver(s) 525 can receive signaling from femto landing webpage 535. Account creation driver 527 enables secure redirection to legacy account manager 420 for at least one of consumer account, e.g., consumer service, or business account, e.g., business service.

Profile validation component 505 can query a billing system or directory database to determine an account type based at least in part on a received CTN or other identification provided by a subscriber. Profile validation component can signal account type to legacy account manager 420 to implement subscriber identity management. Queries can be enabled, at least in part through middleware component 440. In addition, profile validation component 505 can signal extraction of account profiles for specific EIDs, such extraction also can be accomplished, at least in part, through middleware component 440.

Server(s) 540 include at least one of a processor, a memory, and a bus architecture, and can be functionally connected to each component in FOAM web tier 410. Server(s) 540 can confer, at least in part, the described functionality of component(s), interface(s) and driver(s), and component(s) or functional element(s) therein, within FOAM web tier 410. Server(s) 540 can functionally connect to each of the component(s), interface(s), or driver(s) within FOAM web tier 410 through a bus (not shown) for data or any other information exchange; such a bus can be embodied in at least one of a memory bus, a system bus, an address bus, or one or more reference link(s) or interface(s). Additionally or alternatively, server(s) 540 can execute one or more of the component(s), interface(s), or driver(s) included within FOAM web tier 410. Moreover, or as another alternative, one or more components, interface(s), or driver(s) that comprise FOAM web tier 410 can reside within server(s) 540. Server(s) 540 can execute, e.g., through the at least one processor therein, code instructions such as software or firmware application(s), stored in a memory, e.g., memory 550, to provide at least part the functionality of one or more of the component(s), interface(s), or driver(s) that reside within FOAM web tier 410.

Figure 6:
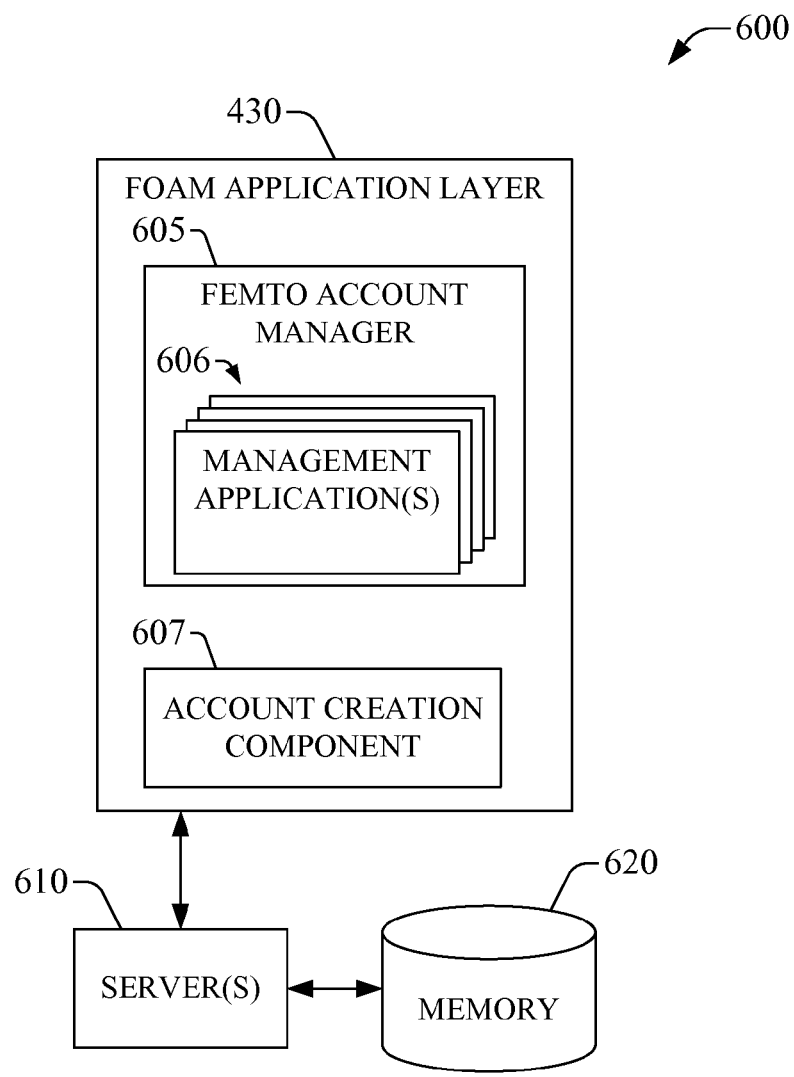
FIG. 6 is a block diagram of an example embodiment of a FOAM application layer that can be part of an account management service in accordance with aspects described herein.

FIG. 6 is a block diagram of an example embodiment 600 of a FOAM application layer 430 in accordance with aspects described herein. Femto account manager component 605, also termed herein as femto account manager 605, can create, at least in part, femtocell service account profile(s) and populate initial access list(s), e.g., a white list, with a CTN linked to the owner of the equipment for which the profile is created. In addition, femto account manager 605 includes a set of management applications 606 that enable various maintenance operations such as femtocell shutdown, profile deactivation, femtocell update, generation of access list(s) and configuration thereof, preparation of mail-in rebate forms, or the like. In addition, femto account manager 605, through middleware component 440, can enable at least in part management of femto account profiles and access list(s) through creation, deletion, or revision of records associated with existing femto account profiles, and related access list(s), in femtocell account database 460. Creation of records, or changes thereto, can be based at least in part on information received through femto management interface 515. In addition, femto account manager 605 can extract and convey femto account profiles, and access list(s) therein, for specific EIDs.

Server(s) 610 include at least one of a processor, a memory, and a bus architecture, and can be functionally connected to each component in FOAM application layer 430. Server(s) 610 can confer, at least in part, the described functionality of component(s) within FOAM application layer. Server(s) 610 can functionally connect to each of the component(s) within FOAM application layer 430 through a bus (not shown) for data or any other information exchange; such a bus can be embodied in at least one of a memory bus, a system bus, an address bus, or one or more reference link(s) or interface(s). Additionally or alternatively, server(s) 610 can execute one or more of the component(s) within FOAM application layer 430. Moreover, or as another alternative, one or more components that comprise FOAM application layer 430 can reside within server(s) 610. Server(s) 610 can execute, e.g., through the at least one processor therein, code instructions such as software or firmware application(s), stored in a memory, e.g., memory 620, to provide at least part the functionality of one or more of the component(s), interface(s), or driver(s) that reside within FOAM application layer 430.

Figure 7:
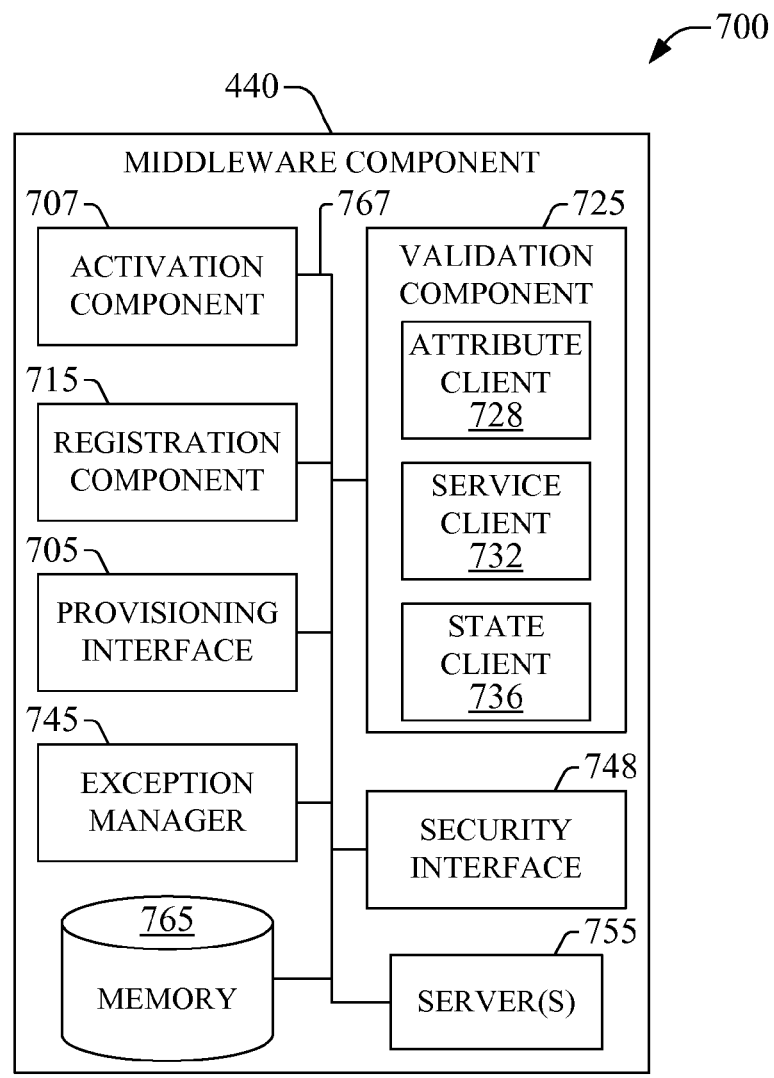
FIG. 7 is a block diagram of an example embodiment of a middleware component that can be part of an account management service in accordance with aspects disclosed in the subject specification.

FIG. 7 is a block diagram of an example embodiment 700 of middleware component 440 in accordance with aspects described herein. Middleware component 440 can deliver various configuration information to other application layers, such as FOAM application layer 430, or various network components. Middleware component 440 can connect various components that are part of an information technology system that provides backend services, e.g., configuration, billing, mediation, customer service, to one or more components such as a gateway node or a provisioning server, that operate a wireless network. Middleware component 440 also can enable, at least in part, recordation of a femtocell service account.

In embodiment 700, middleware component 440 can include a registration component 715 that can validate a specific address for prospective operation of a femto AP, and an activation component 707 that manages exchange of information associated with activation of femto AP and recordation of related information. Validation of the specific address can include at least one of verification of E911 service availability or wireless spectrum coverage of the location identified by the specific address. Registration component 715 also allows information exchange amongst various components that implement, at least in part, such validation.

As part of registration of the femtocell service account or activation of a femto access point associated therewith, middleware component 440, through validation component 725, can implemented one or more validation checks to verify availability of service(s) related to operation of a femto AP linked to the femtocell service account; integrity of attribute(s) associated with the femtocell service account; or logical state of a set of one or more logical indicators, flags, or variables that convey operational status of the femto AP linked to the femtocell service account. In addition, validation component 725 can conduct validation checks associated with at least one of relocation of active femto AP(s), availability of add-on features for femtocell service, addition of code that identifies a mobile device into access list(s), or the like.

Validation component 725 can include an attribute node, a service node 732, or a state node 736. Attribute node 728 can verify integrity, e.g., validity or availability, of various attributes that are part of an equipment profile associated with a femto AP linked to a femtocell service account. As an example, attribute node 728 can enable verification of mobile device identifiers entered in an access list; verification can be implemented by querying at least one of femtocell account database 460 or directory database 480. As another example, validation can include logic verification of a cell identifier, e.g., CGI, assigned to a femto AP as part of activation thereof. Service node 732 can implement validation of at least one of high-speed internet service; wireless coverage; or availability of a service mandated to be available to a femtocell service subscriber, such as E911 service. State node 736 can confirm status of various logical variables or flags that disclose configuration of a femtocell service account, or operation of a femtocell access point associated therewith; for example, state node 736 can probe registration and activation status of a femto AP.

Middleware component 440, through exception manager component 745, also referred to herein as exception manager 745, can signal outcome of a validation check or verification. To at least that end, exception manager 745 can receive information signaling from validation component 725, or one or more nodes therein, that discloses outcome of an integrity check or validation procedure. As an example, exception manager 745 can convey an error signal such as an unstructured supplementary service data (USSD) message, or supply one or more bits that indicate PASS or FAIL for a verification or validation check. In addition, exception manager 745 can implement retry cycles, or can supply signaling to redirect control of an interface employed by a subscriber for management or manipulation of a femtocell service account.

Additionally, exception manager 745 can signal substantially any other errors not returned as part of a registration or activation normal flow, or acts, described herein, as service provider outage. Such outage error conditions, in addition to errors associated with integrity checks described above, can manage the customer experience within a networked interface, e.g., interface 310, through communication to the subscriber of an indication of an abnormal condition in the wireless network environment or backend information technology system(s). Alternatively or additionally, exception manager 745 can deliver a set of instructions, for example, attempt activation at a later time, associated with an abnormal condition or integrity check faults. Communication of abnormal conditions, and related instructions in response to the conditions, can be delivered through at least one of an email message, an SMS communication, an MMS communication, an instant message (IM) communication, or the like.

Middleware component 440 also can include a provisioning interface 705 that can access information retained in at least one of directory database 480, femtocell account database 460, billing system 470, or customer care/support platform 230; and record information therein. Access to and recordation of information can be part of registration of femtocell service account(s) and activation of femto AP(s) linked thereto. In an aspect, provisioning interface 705 can manipulate information to effect, at least in part, registration and activation. As an example, middleware component 440, through provisioning interface 705, can provision updated access list(s) for a specific account profile related to customer premises equipment (CPE) with a specific EID. Moreover, middleware component 440 can associate mobile station identifiers in an access list, e.g., a white list, with respective ICCIDs or IMSIs.

Server(s) 710 include at least one of a processor, a memory, and a bus architecture; and can be functionally connected to each interface or functional element within middleware component 440. Server(s) 710 can confer, at least in part, the described functionality of interface(s) within middleware component 440. Server(s) 710 can functionally connect to each of the interface(s) or component(s) within middleware component 440 through a bus 767 for exchange of data or any other information; such a bus can be embodied in at least one of a memory bus, a system bus, an address bus, or one or more reference link(s) or interface(s). Additionally or alternatively, server(s) 710 can execute one or more of the interface(s) or component(s) within middleware component 440. Moreover, or as another alternative, one or more interface(s) or component(s) that comprise middleware component 440 can reside within server(s) 710. Server(s) 710 can execute, e.g., through the at least one processor therein, code instructions stored in a memory, e.g., memory 720, to provide at least part the functionality of one or more of the interface(s) or component(s) that reside within middleware component 440. Such code instructions can include program modules or software or firmware application(s) that implement one or more example methods described in the subject specification and associated, at least in part, with functionality of middleware component 440. It is noted that in one or more embodiments, server(s) 710 and server(s) 610 can be the same entity. Likewise, memory 720 can be at least a portion of memory 620, or vice versa.

Figure 8:
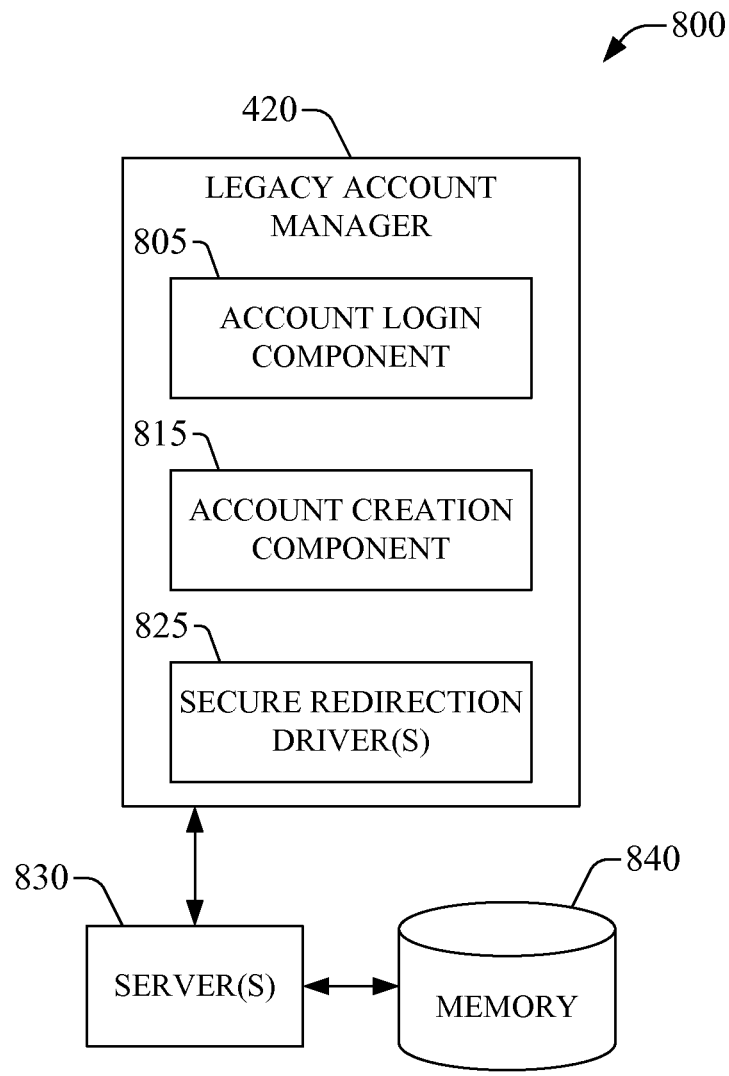
FIG. 8 illustrates a block diagram of an example embodiment of a legacy account manager component in accordance with aspects described herein.
Figure 9:
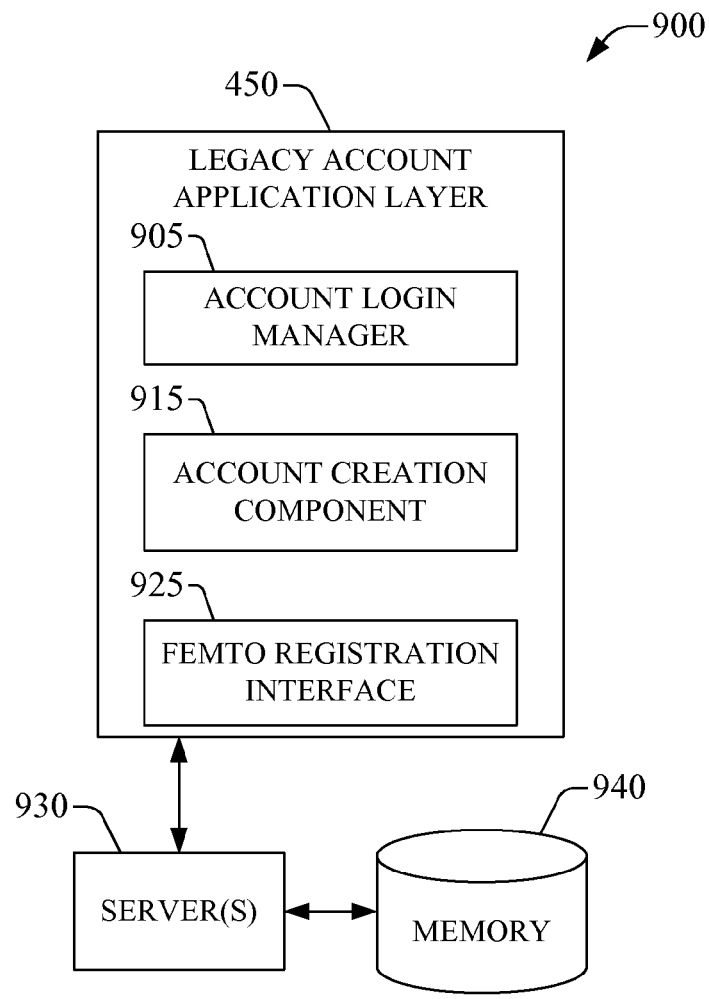
FIG. 9 is a block diagram of an example embodiment for a legacy account application layer in accordance with aspects described herein.

FIG. 8 illustrates a block diagram of an example embodiment 800 of a legacy account manager 420 in accordance with aspects described herein. Account login component 805 can receive signaling from FOAM web tier 410 that indicates a login request to a subscriber account; received signaling can convey whether a login is for a consumer account or a business account. Account login component 805 can direct request to login to a component within legacy account application layer 450. In an example embodiment 900, illustrated in FIG. 9, account login manager component 905 can implement a single sign-on or login based at least in part on subscriber identity credentials retained in directory database 480. Upon successful login to a consumer or business account, secure redirection driver(s) 825 can direct logged on access to FOAM web tier 410. Secure redirection can exploit hypertext transfer protocol secure (HTTPS) with advanced encryption standard (AES) with 256 bit key(s) or other secure mechanisms such as secure shell (SSH) login, Internet protocol security (IPsec), virtual private network environment(s), or the like. In addition, secure redirection can expose femto registration interface 925, which can enable creation of a femto account profile for specific CPE, e.g., one or more femto APs. It is noted that such creation of a femto account profile can include manipulation of existing access list(s).

In example embodiment 800, legacy account manager 420 also can include account creation component 815 for either a consumer or business subscriber. Account creation component 815 can enable establishment of femtocell service features such as voice, data, or add-ons which can include location-based services, automatic customization of access list(s), parental controls, tracking of attachment attempts to a registered AP by mobile devices within range, and so forth. In an aspect, account creation component 815 can exploit account creation component 915 within legacy account application layer 450. Account creation component 915 within legacy account application layer 450 can create requested femtocell service features within billing system 470 or directory database 480.

Server(s) 830 include at least one of a processor, a memory, and a bus architecture, and can be functionally connected to each component, driver, or functional element within legacy account manager 420. Server(s) 830 can confer, at least in part, the described functionality of component(s) or driver(s) within legacy account manager 420. Server(s) 830 can functionally connect to each of the component(s) or driver(s) within legacy account manager 420 through a bus (not shown) for exchange of data or any other information; such a bus can be embodied in at least one of a memory bus, a system bus, an address bus, or one or more reference link(s) or interface(s). Additionally or alternatively, server(s) 830 can execute one or more of the component(s) or driver(s) within legacy account manager 420. Moreover, or as another alternative, one or more components or drivers that comprise legacy account manager 420 can reside within server(s) 830. Server(s) 830 can execute, e.g., through the at least one processor therein, code instructions such as software or firmware application(s), stored in a memory, e.g., memory 840, to provide at least part the functionality of one or more of the interface(s) that reside within legacy account manager 420.

With respect to legacy account application layer 450, server(s) 930 functionally coupled thereto can include at least one of a processor, a memory, and a bus architecture, and can be functionally connected to each component, interface, or functional element within legacy account application layer manager 450. Server(s) 930 can confer, at least in part, the described functionality of component(s) or interface(s) within legacy account application layer 450. Server(s) 930 can functionally connect to each of the component(s) or interface(s) within legacy account application layer 450 through a bus (not shown) for exchange of data or any other information; such a bus can be embodied in at least one of a memory bus, a system bus, an address bus, or one or more reference link(s) or interface(s). Additionally or alternatively, server(s) 930 can execute one or more of the component(s) or driver(s) within legacy account application layer 450. Moreover, or as another alternative, one or more components or interfaces that comprise legacy account application layer 450 can reside within server(s) 930. Server(s) 930 can execute, e.g., through the at least one processor therein, code instructions such as software or firmware application(s), stored in a memory, e.g., memory 940, to provide at least part the functionality of one or more components or interfaces that reside within legacy account application layer 450.

Figure 10A:
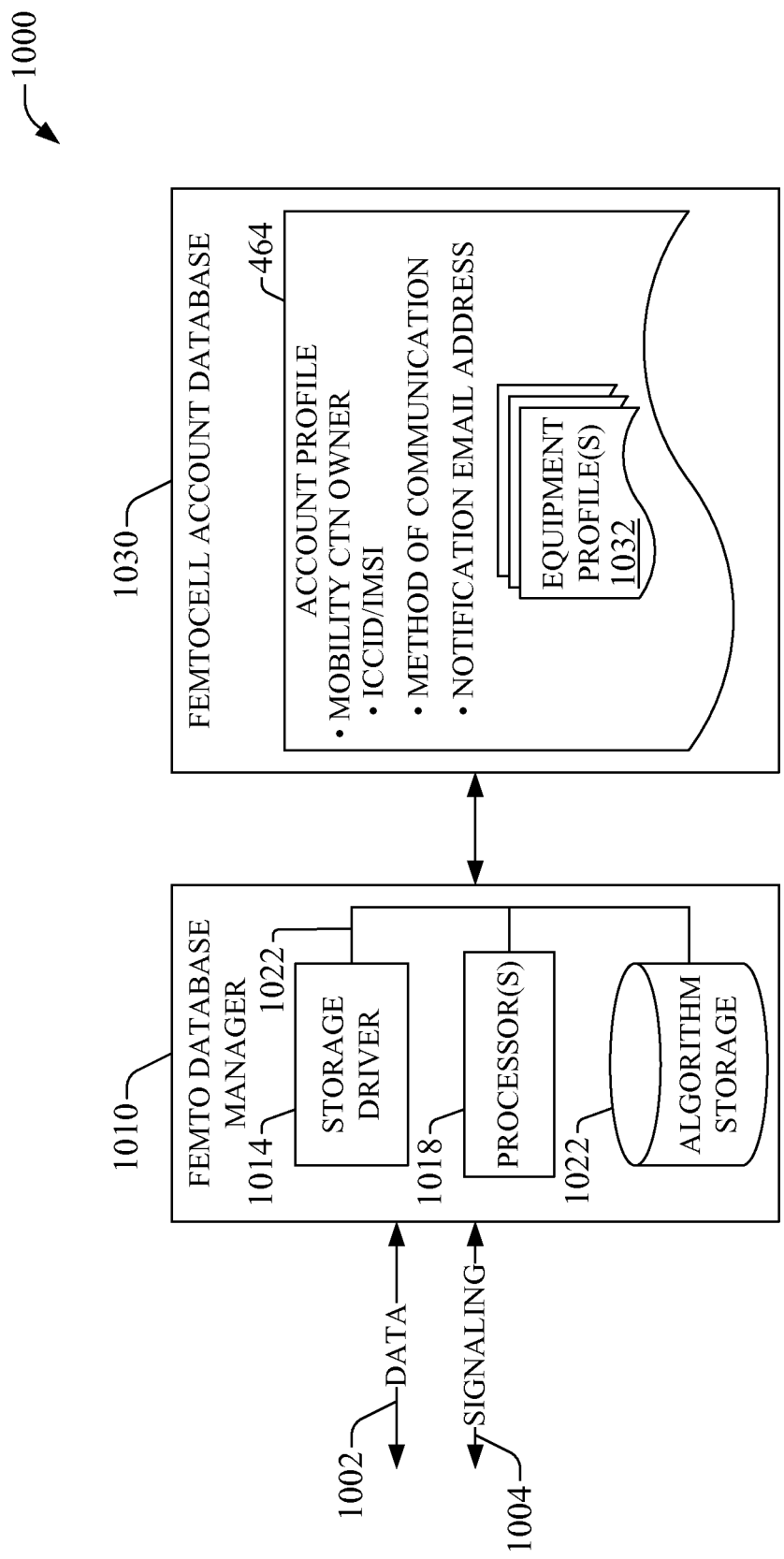
FIGS. 10A and 10B illustrate, respectively, an example femtocell account database and associated database manager component, and an example equipment profile that can be included in a set of equipment profiles within a femto account profile associated with a femto account linked to a subscriber customer telephone number (CTN) in accordance with aspects described herein.

FIG. 10A is a block diagram 1000 of an example femtocell account database and associated database manager component in accordance with aspects described herein. Femtocell account database 1030 includes account profile 464, which comprises a set of one or more equipment profile(s) 1032; an example of an equipment profile within the set of equipment profile(s) 1032 is illustrated below. Multiple equipment profiles 1032 can arise from a single femto service account linked to various femto AP such as can be the case in an enterprise deployment or in a large residential environment. Femto database manager component 1010 also is referred to herein as femto database manager (femto DBM) 1010. Storage driver component 1014, also referred herein to as storage driver 1014, can implement storage functionality to maintain consumer or business subscriber account profile association with femtocell equipment, or customer premise equipment (CPE). Association of femtocell equipment and subscriber account profile for directory database 480 for mobility customers, either consumer or business customers, can be based at least in part on the CTN of the subscriber that acquires femtocell equipment and associated femtocell service. In addition, for each femtocell device, e.g., femto AP, storage driver 1014 can implement storage of authorized "white list" mobile numbers allowed to utilize the femtocell device, or receive femto service there from, when in range of the femtocell device, or femto AP; the range typically dictated by the radiating power of the femto AP. It is noted that signaling 1004 can be exchanged with components external to femto DBM 1010 to accomplish manipulation and control of femtocell account database 1030. Data 1002 can be received for storage in femtocell account database 1030, and can be delivered as a result of queries to femtocell account database 1030.

Moreover, for each CPE, or femto AP, storage driver 1014 can retain applicable addresses up to a total of Q addresses, wherein one address is an active, current address, and Q-1 addresses are historical; Q is a positive integer, e.g., Q=5. Furthermore, storage driver 1014 can maintain pre-population of unique equipment identification (EID), e.g., serial number(s) of femto AP(s), supplied by the network. Further yet, storage driver 1014 can exploit algorithms to effect periodic, e.g., daily, weekly, or monthly, reconciliation processes for billing purposes. In addition, storage driver 1014 can implement reconciliation process(es) based at least in part on predetermined events.

Processor(s) 1018 is functionally connected to storage driver 1014, and other conventional component(s) (not shown) in femto DBM 1010. Processor(s) 1018 can confer, at least in part, the described functionality of storage driver 1014, and other component(s) (not shown) within storage driver 1014. Processor(s) 1018 can functionally connect to each of the component(s) within femto DBM 1010 through a bus 1022 for data, control, or any other information exchange; such a bus can be embodied in at least one of a memory bus, a system bus, an address bus, or one or more reference link(s) or interface(s). Additionally or alternatively, processor(s) 1018 can execute storage driver 1014, or other component(s) within femto DBM 1010. Processor(s) 1018 can execute code instructions such as software or firmware application(s), stored in a memory, e.g., memory 1018, to provide at least part the functionality of one or more of the component(s), interface(s), or driver(s) that can reside within femto DBM 1010. Such code instructions can include program modules than implement methodologies described herein.

Figure 10B:
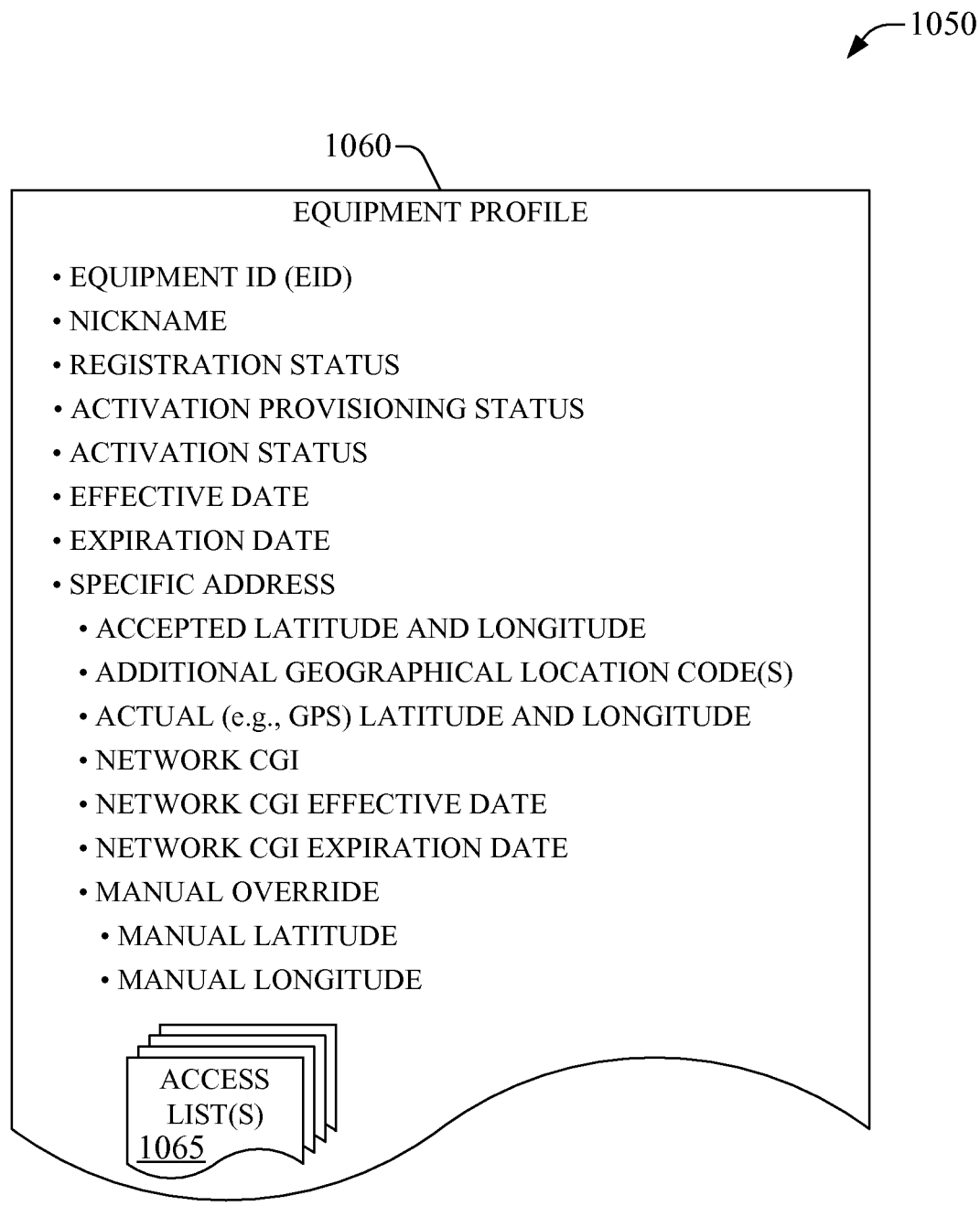

FIG. 10B is an example diagram 1050 of an example equipment profile that can be included in a set of equipment profiles 1032 within a femto account profile 464 associated with a femto account linked to a subscriber CTN (customer telephone number) in accordance with aspects described herein. A customer, as identified through a CTN, can have several equipment profiles assigned under a single CTN account. In an aspect, a single customer can have a set of femto APs deployed within a residence in order to provide wireless coverage with various areas within the home. Alternatively or additionally, a business customer can be have a set of femto APs deployed within an enterprise, e.g., a hotel, a supermarket, a factory, a hospital, or the like. Equipment profile 1060 can be linked to at least one of a mobility CTN owner or a single piece of equipment or femto AP ID, and can include the following sub-attributes: (A) Mobility CTN owner. (1) Method of communication, e.g., email, SMS, IM, . . . ). (2) Notification email address. In an aspect, the femto notification email address is provided by an IRU or a corporate responsibility user (CRU), and can be supplied at the time of creating a femto account as part of purchase, provisioning, or registration of an access point. (3) Integrated Circuit Card identification (ICCID) of the mobile device associated with the CTN of subscriber. (B) Device. (i) Equipment ID (EID) assigned to the profile; for example, the EID can be a serial number (SN) of a femto AP. (ii) Nickname of the device, or femto AP. (iii) Registration status. Status can be characterized by a system logical flag, e.g., "registration," that adopts logical values such as TRUE or FALSE, or a system variable that can adopt explicit values that represent stat of registration; for instance, "Registered," "Failed," or "Unknown," wherein "failed" can indicate a registration process has been unsuccessfully implemented and "unknown" conveys that no registration process has been effected for the device. (iv) Activation status. Activation status is an activation transaction from the network, through a network provisioning component to middleware component to update activation status within femtocell account database 460, or within a local account database. Activation status can be represented by a system logical flag with possible values of TRUE or FALSE, or a system variable that can comprise the following values "Active," "Registered-only," or "None," wherein Active can indicate successful activation has been completed, Registered-only can convey that activation process has not succeeded, and None can disclose that no activation process has been implemented. (v) Effective date. A time-stamp that can indicate activation time for the device, or femto AP. (vi) Expiration date. Deactivation or disconnection time-stamp. (vii) Specific address for the location of equipment, e.g., the femto AP, which can include the following. (a) Accepted latitude and longitude, as supplied as part of a registration process by a geographic information system (GIS) which can be part of an enhanced 911 (E911) service provider. (b) Actual latitude and longitude for the device, or femto AP. Such latitude and longitude can be supplied through global positioning system (GPS) component(s), e.g., transceiver, processor(s), of the femto AP. (c) Network CGI (cell global identity). An identifier issued to a device, or femto AP, as part of activation process. (d) Network CGI effective date. This is a time stamp that conveys a time at which the device has been supplied a valid CGI. (e) Network CGI expiration date. A time stamp that discloses a time a CGI linked to the device, or femto AP, ceased to be valid. (f) Manual Override. An indication that a subscriber has opted for manual entry, e.g., through the device, of location information for the device. (g) Manual latitude. (h) Manual longitude. (9) A set of one or more access list(s) 1065 and respective white list numbers or black list numbers.

Figure 11A:
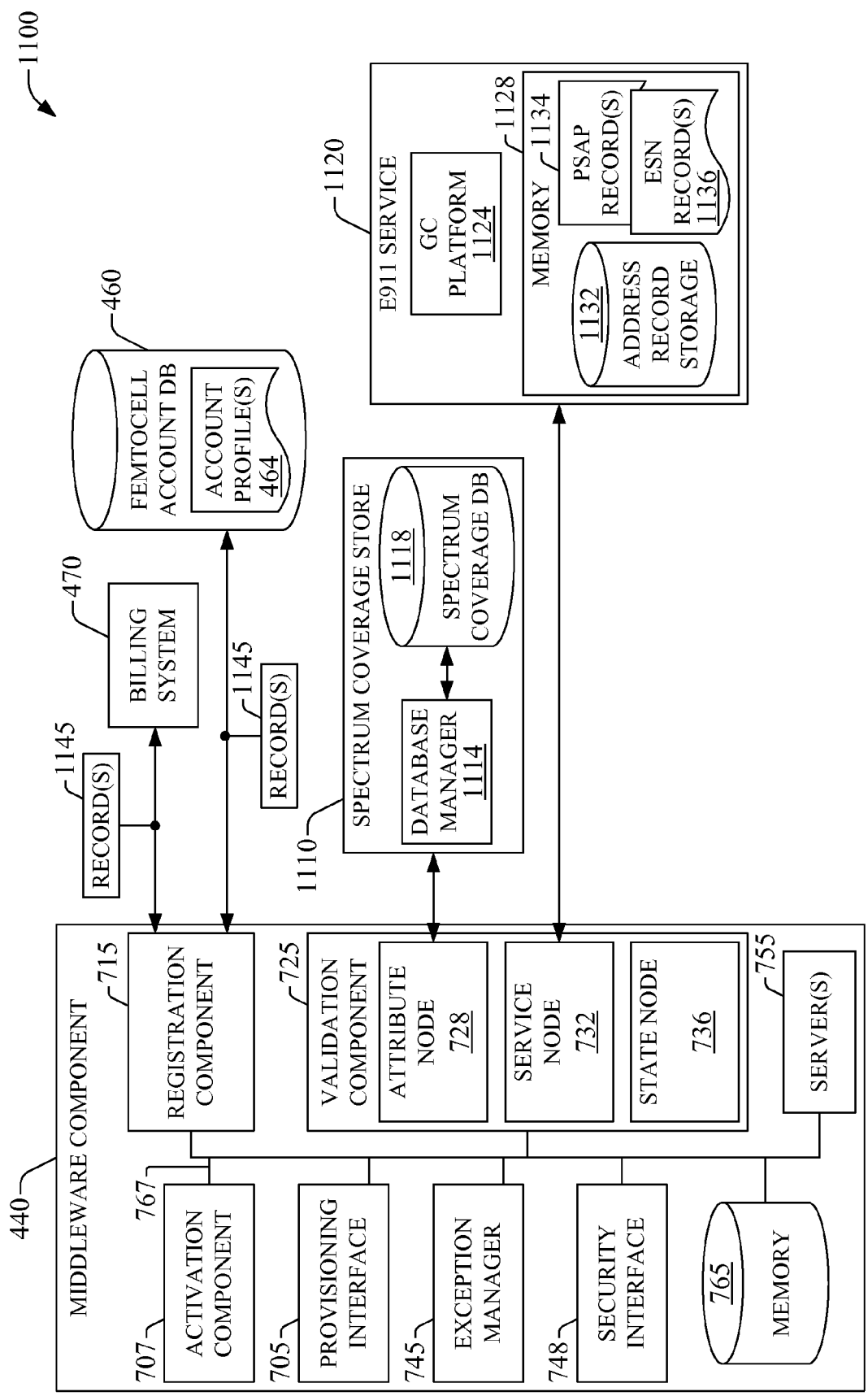
FIGS. 11A-11B is a block diagram of an example system that enables registration of a femtocell service account in accordance with aspects described herein.

FIG. 11A is a block diagram of an example system 1100 to register a femtocell service account in accordance with aspects described herein. Registration component 715 receives a specific address for a location in which a femto access point is planned to operate. In addition, registration component 715 can receive a CTN associated with an account profile for the femtocell service account for which registration is pursued. The address can be received through FOAM application layer 430, as part of femtocell account management effected through a remote interface.

Registration component exploits validation component 725 to effect a transaction that determines if wireless coverage is available for the received address. Validation of wireless coverage, or spectrum coverage, probes if the service provider that administer femtocell service has licensed electromagnetic (EM) radiation spectrum at the location identified through the received address. To accomplish validation of wireless coverage, attribute node 728 delivers the received specific address to a spectrum coverage store 1110, which can record and manage licensing information of EM radiation spectrum for the service provider. For instance, spectrum coverage store 1110 can record substantially all or all radio frequency bands for GSM or UMTS operation that are available to the service provider. It is noted that RF bands for operation in LTE, WiMax, Wi-Fi, UMB, or the like, also can be retained in spectrum coverage store 1110. Database manager 1114 can receive the specified address and query spectrum coverage database 1118, which include licensed spectrum for county coverage and available frequency channels for linked to the licensed spectrum. In response to the query, when spectrum coverage is available, database manager 1114 can convey an indication, e.g., a USSD code, an SMS communication, an IM communication, an email message, to attribute node 728 that one or more frequency channels are available for wireless communication in the location specified by the received address. Attribute node 728 can receive the indication of successful spectrum validation and relay it to registration component 715 to continue registration. In an aspect, a logical variable or flag that indicates successful validation can be configured and retained (not shown) in memory 765.

When coverage is not available for the received address, database manager 1114 can indicate, through signaling such as a multi-bit word delivered in a control channel, that spectrum coverage check has failed. Moreover or as an alternative, database manager 1114 can supply a set of one or more, e.g., three, alternative addresses that nearly match the received address and for which spectrum coverage is available. Validation component 725 can identify received signaling as error message(s) and relay the signaling to exception manager 745, which can supply an error message to a subscriber through at least one a FOAM layer and a FOAM web tier. In an aspect, the error message can include at least one of a directive to specify a different address or an instruction to analyze and supply one of the nearly-matching addresses provided by database manager 1114 as part of address validation.

A specified address that is successfully validated against spectrum coverage can be supplied, by service node 732, for example, to an E911 service 1120 to confirm that an associated geographical location indicator, e.g., a geospatial entity object code (geocode), is available. Geographical code (GC) platform 1124 can exploit address record storage, which can include a Master Street Address Guide (MSAG), to ascertain if a geographical location indicator is available for the supplied address. GC platform 1124 can signal service node 732 the availability of the geographical indicator code. When a geographical location indicator for the supplied address is unavailable, GC platform 1124 can convey an error signaling to service node 732, which can relay the error signaling to exception manager 745 for delivery to a remote interface, e.g., interface 310, through which registration is administered.

Figure 11B:
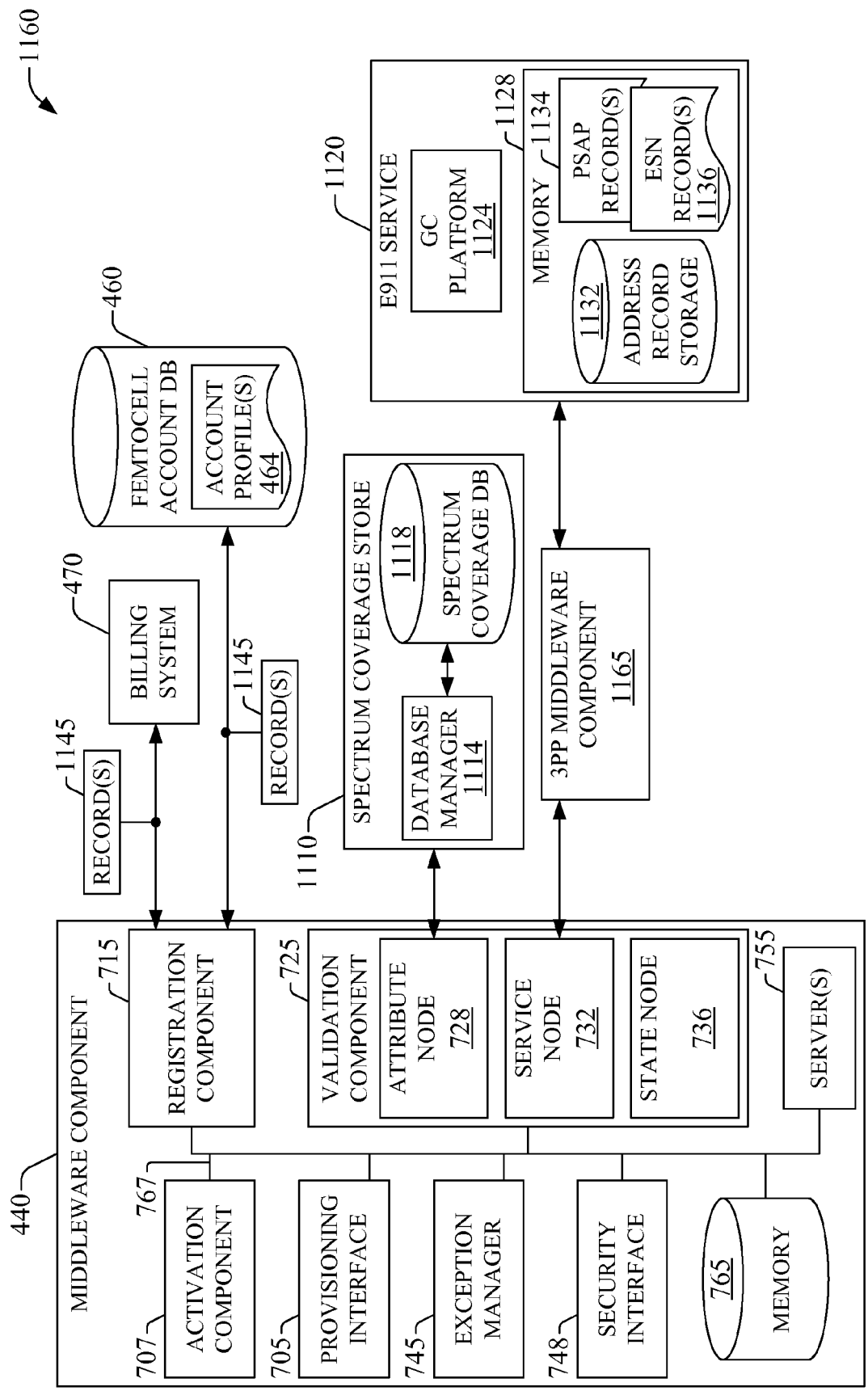

In an aspect of the subject innovation, when the specific address is received, registration component 715 also can effect a transaction to confirm availability of E911 service for the received address. Such transaction can occur independently from the transaction that validates spectrum coverage as described above. GC platform 1124 receives the specific address and queries address record storage 1132 to identify a geographical location indicator, e.g., geocode, for the received address. The specific address can be conveyed to E911 service platform through service node 732. However, in one or more alternative embodiments, e.g., example embodiment 1160 illustrated in FIG. 11B, a third-party provisioning (3PP) middleware component 1430 that can interface middleware component 440 with E911 service 1120, can broker delivery of the address and signaling associated with validation thereof. Absence of a matching field within address record storage 1132, such as a matching address within a MSAG results in delivery, through GC platform 1124, of an error message conveyed via signaling. Service node 732 receives error signaling and relays it to exception manager 745, which can convey an error message to a remote interface of a subscriber that implements registration of a femtocell account service. When an address within address record storage 1132 that matches the received address is identified, GC platform 1124 can query Public Safety Answering Point (PSAP) record(s) 1134 to confirm one or more PSAPs, and associated Emergency Service Numbers (ESNs), are available for the received address. Availability of one or more PSAPs for the received address confirms E911 service availability; confirmation can be signaled to service node 732 which can set a logic flag within memory 765 to record E911 availability for the femtocell service account for which registration is pursued.

When spectrum coverage and E911 service availability are validated, registration component 715 can assign and record a tracking flag, e.g., a tracking Service-oriented Communication (SoC) record, within billing system 470. Tracking flag can be part of record(s) 1145. In addition, registration component 715 can record a unique EID within an account profile associated with the received mobility CTN and retained within femtocell account database (DB). Moreover, the geographical location indicator, e.g., geocode, or zip code, extracted for the specified address of prospective operation of a femtocell, is recorded as part of an equipment profile retained in femtocell account database 460.

Additionally, upon validation of coverage spectrum and E911 service availability, middleware component 440, through provisioning interface 705, can deliver a registration provisioning message, or request, to a network provisioning component 1220, or gateway, to provision registration of the femto AP linked to the registered femtocell service account. Network provisioning component 1220 can receive the registration provisioning message and return an acknowledgement indication thereof. Middleware component 440 can utilize such acknowledgement indication to handoff control of the registered femtocell service account to a remote interface for online account management; e.g., registration of additional femtocell access points; management of an access list and control parameters therein, such as service priorities for authorized mobile device numbers, or the like.

Figure 12:
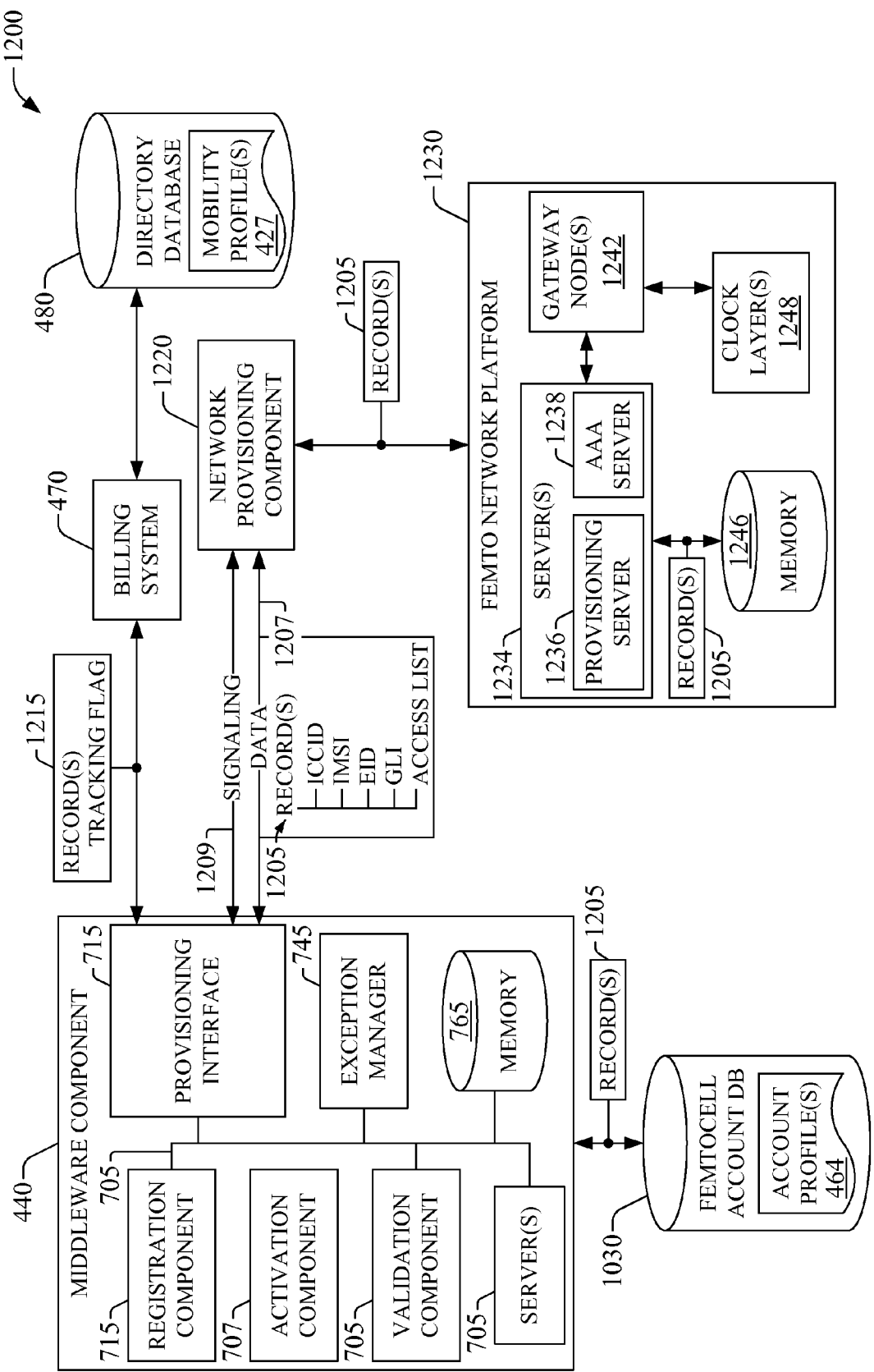
FIG. 12 presents a block-diagram of an example system for provisioning registration of a femtocell service account and associated femto AP with a femto network platform in accordance with aspects described herein.
Figure 13:
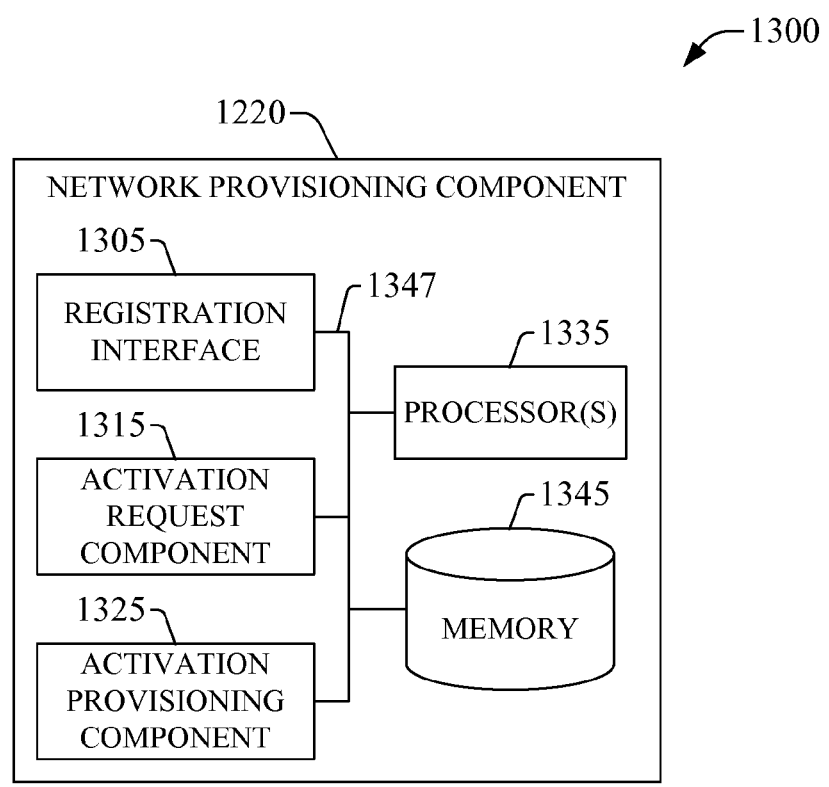
FIG. 13 illustrates a block diagram of an example embodiment of a network provisioning component in accordance with aspects described herein.

FIG. 12 presents a block-diagram of an example system 1200 for provisioning registration of a femtocell service account and associated femto AP with a femto network platform in accordance with aspects described herein. As part of provisioning network registration, provisioning interface 715 can retrieve ICCID and an IMSI for a mobile device linked to mobility profile(s) 427 for the CTN of the subscriber associated with the femtocell service account for which a specific address and E911 service have been validated. In an aspect, the ICCID and the IMSI can be part of record(s) 1215, and are gathered from directory database 480 via billing system 470. As described supra, provisioning interface 715 delivers a registration provisioning request to network provisioning component 1220. The request can be delivered as part of signaling 1209. Additionally, the registration provisioning request includes a set of record(s) 1205 that comprise at least one of the retrieved ICCID; IMSI; EID for the femto AP linked to the femtocell service account; geographical location indicator (GLI), e.g., geocode; or an access list, which can include at least the mobility CTN of the subscriber responsible for the femtocell service account. Network provisioning component 1220 can acknowledge, through signaling 1209, receipt of the network provisioning request. Acknowledgement can be conveyed as part of a USDD message, a multi-bit ACK word, or a set of predetermined bits or symbols within a control packet. In an example embodiment 1300, illustrated in FIG. 13, network provisioning component 1220 can include a registration interface 1305 that can convey an acknowledgement indication, e.g., ACK signal, for a received network provisioning request. In embodiment 1300, processor(s) 1335 is functionally connected to interface(s) and component(s) within network provisioning component 1220. Processor(s) 1335 can confer, at least in part, the described functionality of component(s) and interface(s) within storage driver 1014. Processor(s) 1335 can functionally connect to each of the component(s) within processor(s) 1335 through a bus 1022 for data, control, or any other information exchange; such a bus can be embodied in at least one of a memory bus, a system bus, an address bus, or one or more reference link(s) or interface(s). Additionally or alternatively, processor(s) 1335 can execute interface(s) or component(s) within network provisioning component 1220. Processor(s) 1335 can execute code instructions such as software or firmware application(s), stored in a memory, e.g., memory 1345, to provide at least part the functionality of one or more of the component(s), interface(s), or driver(s) that can reside within network provisioning component 1220. Such code instructions can include program modules than implement methodologies described herein.

Network provisioning component 1220, through registration interface 1305, can relay the network provisioning request, with record(s) 1205, to femto network platform 1230. In an aspect, provisioning server(s) 1236 within server(s) 1234 can receive the request and record(s) 1205, and persist the record(s) 1205 in a femto DB (not shown) within memory 1246. Provisioning server 1236 can deliver an indication that record(s) 1205 have been successfully persisted to network provisioning component 1220. Server(s) 1234 includes a provisioning server 1236 and an Authentication, Authorization, and Accounting (AAA) server 1238. In another aspect, a gateway node within node(s) 1242 can receive the request and record(s) 1205, retain the record(s) 1205 within memory 1246, and deliver an indication the record(s) 1205 were successfully persisted to network provisioning component 1220. Gateway node(s) 1242 can be coupled to clock layer(s) 1248, which can include the clock strata of network time protocol (NTP).

Network provisioning component 1220, through registration interface 1305, can convey an acknowledgement, e.g., ACK signal, of network registration provisioning to provisioning interface 715. In response to such acknowledgement signaling, provisioning interface 715 can update a Registration Status logical variable, or attribute field, within account profile(s) 464 to Registered in order to reflect that the femtocell service account, and attributes therein, have been registered within a femto network platform that provides, at least in part, femtocell service.

Figure 14:
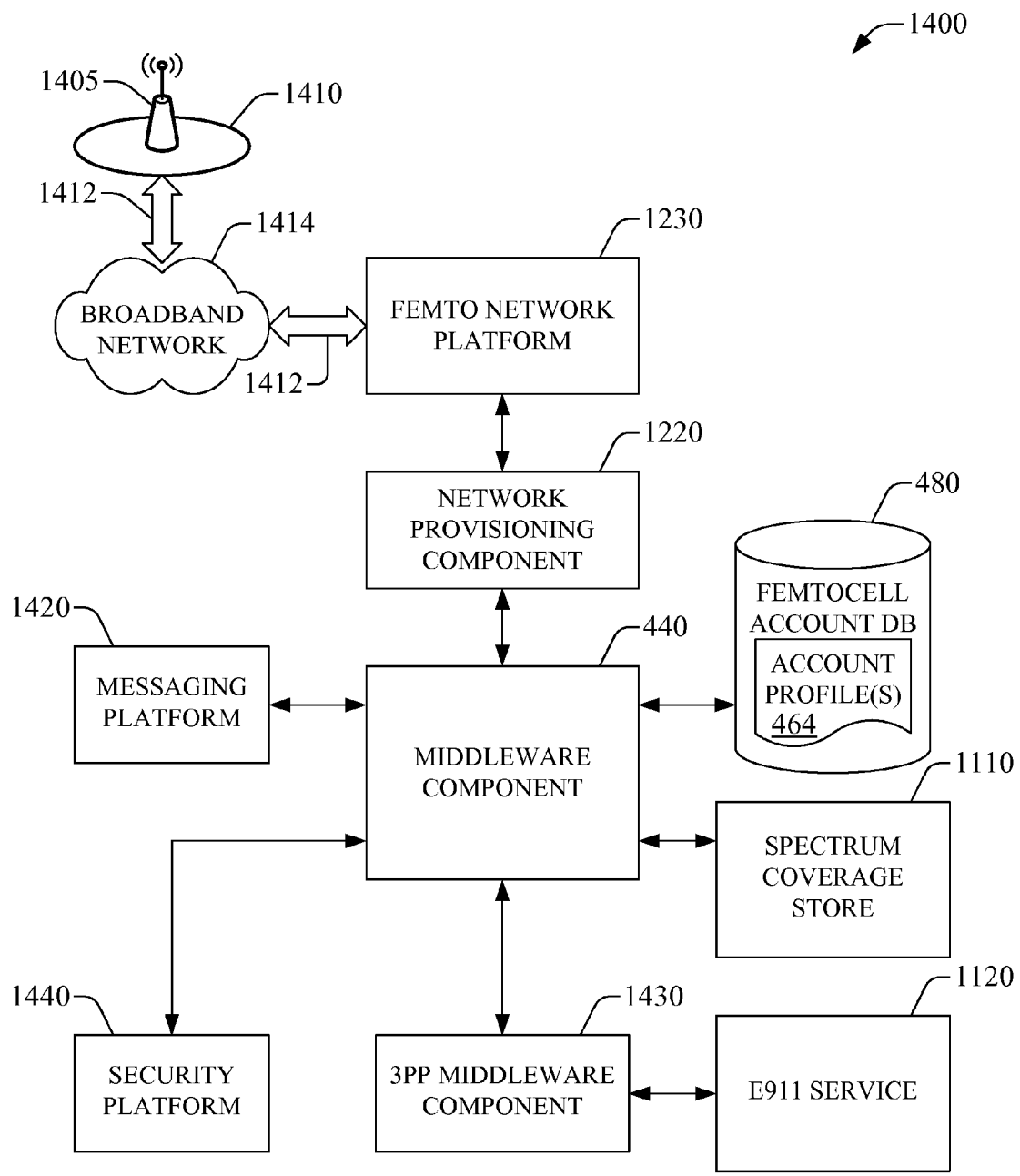
FIG. 14 is a block diagram of an example system that can enable activation of femto access point linked to a registered femtocell service account in accordance with aspects described herein.

FIG. 14 is a block diagram of an example system 1400 that can enable activation of femto access point linked to a registered femtocell service account in accordance with aspects described herein. Activation of a femto AP is independent of registration of a femtocell service account. In an aspect, activation of the femto AP is effected to record a CGI assigned thereto, through a wireless network, with the E911 service provider that serves an address registered for the femto AP. It is noted that activation of a femto AP can occur at substantially any time after a femtocell service account linked to the femto AP is registered, when middleware component 440 receives an activation request from a femto network platform 1230.

Activation is initiated when femto AP 1405, intended to provide wireless service to a confined or nearly-confined are 1410, is connected to an interface that functionally couples the femto AP 1405 to broadband network 1414 through link(s) 1412. Upon connection of the femto AP 1405 to broadband network, a discovery process is triggered to locate a gateway node within femto network platform 1230 for traffic and control communication with femto AP 1405. Traffic and control can be transmitted in accordance with TCP/IP protocol. When communication amongst femto AP 1405 and a corresponding gateway node within femto network platform 1230 has been established, femto AP 1405, or a processor that confers at least part of the functionality thereto, can deliver an activation request. In an aspect, the activation request transports a payload that comprises at least one of EID of femto AP 1405 and Global Positioning System (GPS) data for the location of the femto AP. Femto network platform 1230, through the identified gateway node, which can be one of gateway node(s) 1242, can receive the activation request, and payload therein, and determine if femto AP 1405 is registered with femto network platform.

When it is determined femto AP 1405, as identified by its EID, is registered, the gateway node that serves femto AP 1405 can relay the activation request, and associated data, to a provisioning server 1236 (not shown in FIG. 14 for clarity) which can perform a location tolerance check, wherein the difference amongst received GPS location data and recorded location data for femto AP 1405, e.g., a geocode for a registered address for femto AP 1405, is ascertained against a configurable tolerance or offset. The offset, e.g., 300 m or 1000 m, can be dynamically configured based at least in part on network operator policy or limitation(s) imposed by one or more regulatory entities, or area of coverage such as MSA or RSA. In a scenario in which the tolerance check fails, femto network platform 1220 can deliver, through network provisioning component 1220, an error indication or message to middleware component 440 which can manage the subscriber experience via a messaging service such as USDD, SMS, MMS, email, etc. In an aspect, exception manager 745 can administer notification of error messages in accordance with a notification service address recorded as part of account profile creation for a femtocell service account linked to femto AP 1405. Exception manager 745 can utilize messaging platform 1420 to effect subscriber notification through various communication services; messaging platform can include at least one of an email server, a Short Message Service Center (SMSC), router component(s) such as Messaging Application Router (MAR); or gateway node(s), e.g., Open Messaging Gateway (OMG).

When tolerance check is validated, femto network platform 1220, through the provisioning server 1236, assigns a CGI to the location of femto AP 1405 and conveys the activation request and associated payload to middleware component 440 via network provisioning component 1220. The associated payload includes the data received with activation request in addition to at least one of the assigned CGI or a time-stamp for the assignment of the CGI. In embodiment 1300 of network provisioning component 1220, activation request component 1315 can receive the activation request and related payload, and relay such information to middleware component 440.

When activation request and associated payload is received, middleware component 440 retrieves a specific address registered in femtocell account database 480 for femto AP 1405; the address can be part of an equipment profile for femto AP 1405 retained in femtocell account DB 480. It is noted that middleware component 440 can extract other information, such as notification service address, mobility CTN, or ZIP code, from femtocell account database 480 that identifies, at least in part, femto AP 1405. Middleware component 440 can deliver the extracted specific address and the assigned CGI for femto AP to a third-party provisioning (3PP) middleware component 1430 that can interface middleware component with E911 service 1120, which can record the received CGI for the specific address; recordation can be effected within address record storage 1632. E911 service 1120 can deliver a confirmation that CGI is recorded, and 3PP middleware component 1430 can relay the confirmation to middleware component 440. It is noted that in one or more additional example systems that enable activation, 3PP middleware component 1430 can be absent, and communication amongst middleware component 440 and E911 service 1120 can proceed directly.

In addition, middleware component 440 can request from spectrum coverage store 1110 a UARFCN for the GPS location data for femto AP 1405 received in the payload linked to the activation request of femto AP 1405.

When the UARFCN is received in response to the request, and confirmation of CGI recordation for the specific address on record for femto AP 1405 is available to middleware component 440, an activation validation indication can be supplied to network provisioning component 1220. The indication notifies femto network platform 1230 that femto AP 1405 can be activated and allowed to radiate. In addition, the indication can include at least one of mobility CTN linked to femtocell service account, femto AP 1405 EID, or UARFCN. Network provisioning component 1220 can relay the activation validation indication to a gateway node within femto network platform 1230. The gateway node can persist the data received with the activation validation indication, e.g., EID and UARFCN, and transmit an acknowledgement, e.g., ACK, signal to middleware component 440 via network provisioning component 1220. It is noted that recordation of the activation validation indication does not confirm that femto AP 1405 is radiation, rather it discloses that femto network platform 1230 has been notified to activate femto AP 1405. When middleware component 440 receives the ACK signal, it updates to Active an Activation Provisioning Status attribute within an equipment profile, e.g., profile 1060, linked to femto AP 1405.

Recordation of the activation validation indication for femto AP 1405 within a femto DB in memory 1246 results in transmission of an activation message to femto AP 1405. Provisioning server 1236 can convey, via a gateway node, the activation message, which includes a directive to radiate. When radiation is successful, femto AP 1405 delivers an ACK signal to femto network platform 1230. In response, the gateway node relays the ACK signal to provisioning server 1236, which records an Activation status to Active within a femto DB in memory 1246. In addition, provisioning server 1236 delivers an Activation Status update message that indicates Activation Status is Active to network provisioning component 1220, which relays the update message to middleware component 440. In an aspect, in example embodiment 1300, activation provisioning component 1325 can relay the Activation Status update message. Middleware component 440, through activation component 707 updates Activation Status within femtocell account database 1030 with an 'Active' indicator. In that instance, the address associated with femto AP 1405 is recorded as an active address.

In response to updated Activation Status, security interface 748 can update or record a set of femtocell attributes, extracted from femtocell account DB 480, in a memory (not shown) within security platform 1440. Security platform 1440 can conduct lawful call analysis and monitoring within the context of CALEA. As an example the femtocell attributes pushed to security platform 1440 include at least one of mobility CTN, EID, assigned CGI, GPS location data for femto AP 1405, which can include a ZIP code extracted from subscriber-provided latitude and longitude or specific address entered at registration. In an aspect, security interface 748 can utilize HTTP protocol to supply the femtocell attributes.

Security platform 1440 can record the received femtocell attributes in a dedicated DB, with exception of EID and mobility CTN.

Exception handling that originates in error(s) in communication amongst middleware component 440 and security platform 1440 can be implemented by exception manager 745. For instance, interface outage can be notified to a fallout manager (not shown) that can be part of backend systems or service(s) linked to middleware component 440. Likewise, case error(s) related to erroneous or corrupted femtocell attributes can be handled by exception manager 745. It should be appreciated that such error(s) among security interface 748 and security platform 1440 do not hinder activation of femto AP 1405.

Middleware component 440, via provisioning interface 705, also can convey an indication of successful activation to a subscriber responsible for the femtocell service account linked to femto AP 1405. Provisioning interface 705 can utilize messaging platform 1420 to convey the indication of successful activation as an email message, an SMS communication, or an MMS communication.

Figure 15:
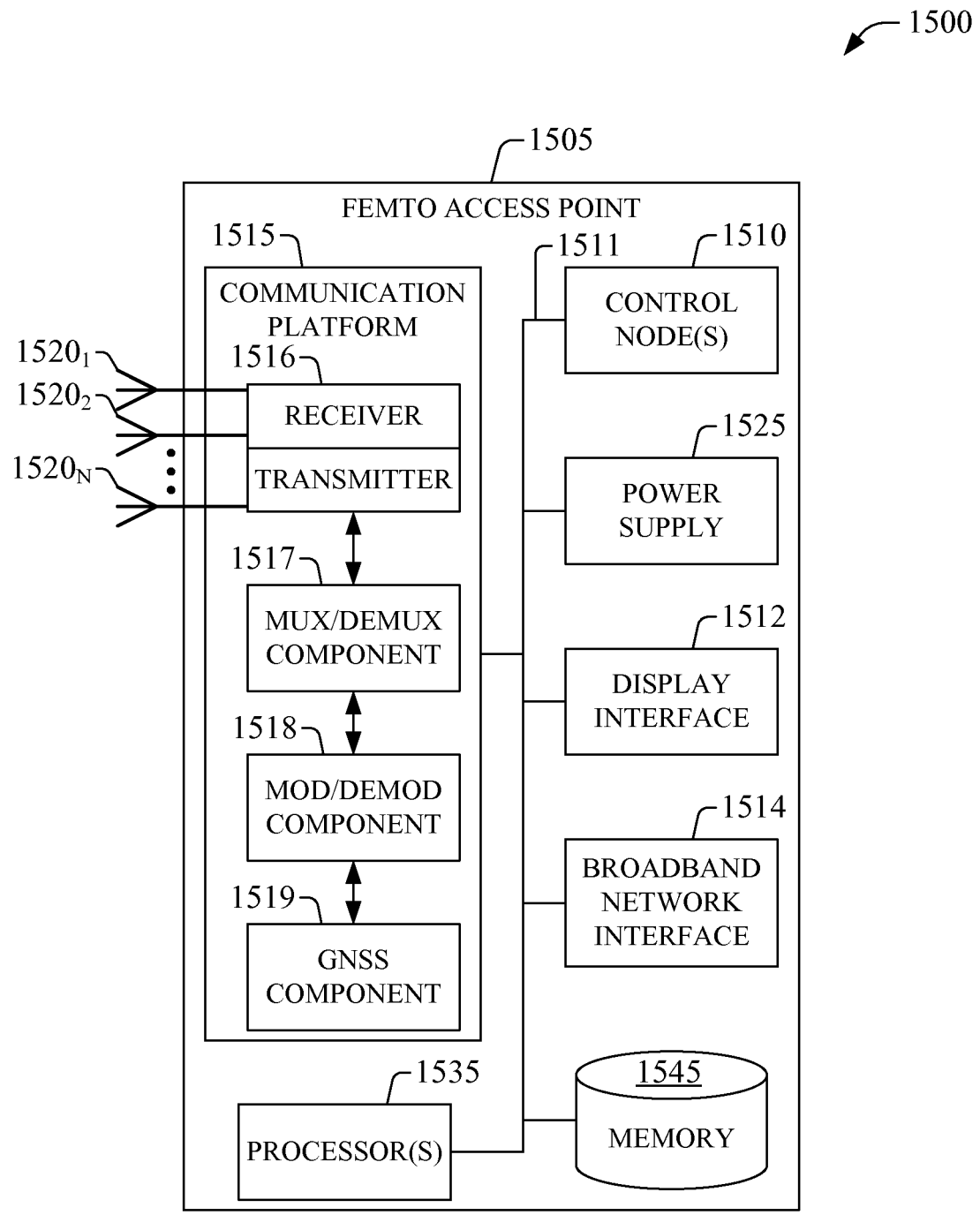
FIG. 15 is a block diagram of an example femto access point that operates in accordance with aspects disclosed in the subject specification.

FIG. 15 is a block diagram of an example femto access point that operates in accordance with aspects disclosed in the subject specification. Femto AP 1505 can embody each of the femtocell access points referenced throughout the subject disclosure. In embodiment 1500, femto AP 1505 can receive and transmit signal(s) (e.g., attachment signaling) from and to wireless devices like femto access points, access terminals, wireless ports and routers, or the like, through a set of antennas $1520_1$-$1520_N$ (N is a positive integer). It should be appreciated that antennas $1520_1$-$1520_N$ are part of communication platform 1515, which comprises electronic components and associated circuitry that provides for processing and manipulation of received signal(s) and signal(s) to be transmitted. communication platform 1515 includes a receiver/transmitter 1516 that can convert signal from analog to digital upon reception, and from digital to analog upon transmission. In addition, receiver/transmitter 1516 can divide a single data stream into multiple, parallel data streams, or perform the reciprocal operation. Coupled to receiver/transmitter 1516 is a multiplexer/demultiplexer (mux/demux) component 1517 that facilitates manipulation of signal in time and frequency space. Electronic component 1517 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1517 can scramble and spread information (e.g., codes) according to substantially any code known in the art; e.g., Hadamard-Walsh codes, Baker codes, Kasami codes, polyphase codes, and so on. A modulator/demodulator (mod/demod) 1518 is also a part of communication platform 1515, and can modulate information according to multiple modulation techniques, such as frequency modulation, amplitude modulation (e.g., M-ary quadrature amplitude modulation (QAM), with M a positive integer), phase-shift keying (PSK), and the like.

Communication platform 1505 also can include a global navigation satellite system (GNSS) component 1519 to process and exploit signals for geospatial positioning that can be received by antennas $1520_1$-$1520_N$. GNSS component 1519 can utilize, at least in part, mux/demux component 1517 and mod/demod component 1518 to process such signals. GNSS-based, e.g., GPS, location data that identifies the global position of femto AP 1505 can be supplied by GNSS component 1519. In an aspect, the GPS location data can be delivered to a femto network platform, e.g., 1230, for network activation of femto AP 1505 as described herein.

Femto access point 1505 also includes processor(s) 1535 configured to confer, and that confers, at least in part, functionality to substantially any component platform or interface, and related circuitry in femto AP 1505. In particular, processor(s) 1535 can enable, at least part, configuration of femto AP 1505, via radio control (RC) node(s) 1510. RC node(s) 1510 can operate in substantially the same or the same manner as a conventional radio network controller (RNC); for instance, RC node(s) can schedule, at least in part, radio resources for telecommunication via femto AP 1505; effect queuing functions to supply specific QoS for call (voice or data) sessions; or activate or deactivate PDP contexts for voice or data delivery through femto AP 1505. In an aspect, control node(s) 1510 can supply system messages that can be broadcasted via communication platform 1515; broadcast messages can be employed for attachment of mobile devices identified in access list(s) to femto AP 1505. In yet another aspect, control node(s) 1510 can autonomously adjust transmitted power of pilot signal(s) delivered through communication platform 1515 to mitigate signaling among a mobile device that hands over from macrocell coverage to femto coverage served through femto AP 1505.

Additionally, femto AP 1505 includes display interface 1512, which can display functions that control functionality of femto AP 1505, or reveal operation conditions thereof. For instance, display interface can include a set of color-code light emitting diodes (LED) to convey severity of an operation condition. In addition, display interface 1512 can include a screen to convey information to an end user. In an aspect, display interface 1512 can be a liquid crystal display (LCD), a plasma panel, a monolithic thin-film based electrochromic display, and so on. Moreover, display interface can also include one or more component(s) (e.g., speaker(s), microphone) that enables communication of aural indicia, which can also be employed in connection with messages that convey operational instructions to an end user. For example, a buzzing signal can be actuated, e.g., via control node(s) 1510, when a specific set of operation condition(s) is detected. In an aspect, operational criteria related to alarming the femto AP 1505 can be retained in memory 1545. In an aspect, operational conditions can be reported to a network component, e.g., gateway node(s) 1242, which can relay the conditions to a troubleshooting component (see below). Display interface 1512 also can allow data entry (e.g., through a linked keypad or via touch gestures), which can enable femto AP 1505 to receive external commands (e.g., restart operation, ping messages).

Broadband network interface facilitates connection of femto AP 1505 to femto network via backhaul link(s) 153 (not shown in FIG. 15), which enables incoming and outgoing data flow. Broadband network interface 1514 can be internal or external to femto AP 1505, and it can utilize display interface 1512 for end-user interaction and status information delivery.

Femto AP 1505 also includes power supply 1525, which can provide power to component(s), interface(s), platform(s), or other functional elements, within femto AP 1505, and can regulate power output of wireless signal(s) emitted therefrom. In an aspect, power supply 1525 can attach to a conventional power grid and include one or more transformers to achieve power level(s) that can operate femto AP 1505 components, functional elements, and related circuitry. Additionally, power supply 1525 can include a rechargeable power component, e.g., a rechargeable battery, to ensure autonomous operation when femto AP 1505 is disconnected from the power grid.

Processor(s) 1535 also is functionally connected to communication platform 1515 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor(s) 1535 is functionally connected, via data, system, or address bus 1511, to display interface 1512 and broadband network interface 1514 to confer, at least in part functionality to each of such components.

Memory 1545 also can store data structures, code instructions and program modules, or substantially any type of software or firmware applications; system or device information such as access list(s), e.g., white list(s) or black list(s); code sequences hypotheses, and modulation and multiplexing hypotheses; spreading and pilot transmission; femto AP floor plan configuration, e.g., deployment configuration of a set of femto APs in an enterprise femto network; and so on. Furthermore, memory 1545 also can retain content(s) (e.g., multimedia files, subscriber-generated data); security credentials (e.g., passwords, encryption keys, digital certificates, biometric reference indicators like voice recordings, iris patterns, fingerprints); or the like. It is noted that memory 1545 can be internal to femto AP 1505 and include removable and stationary memory elements, or it can be an offline memory that is external to the femto AP 1505 and is functionally coupled thereto through one or more links or interfaces, e.g., USB, general purpose interface bus (GPIB), IEEE 1394, or the like. As an example, an offline memory can be a memory within a server in a confined wireless environment served through femto AP 1505.

Processor(s) 1535 is functionally coupled, e.g., via a memory bus, to the memory 1545 in order to store and retrieve information necessary to operate and/or confer functionality to the components, platform, and interface that reside within femto access point 1505.

Figure 16:
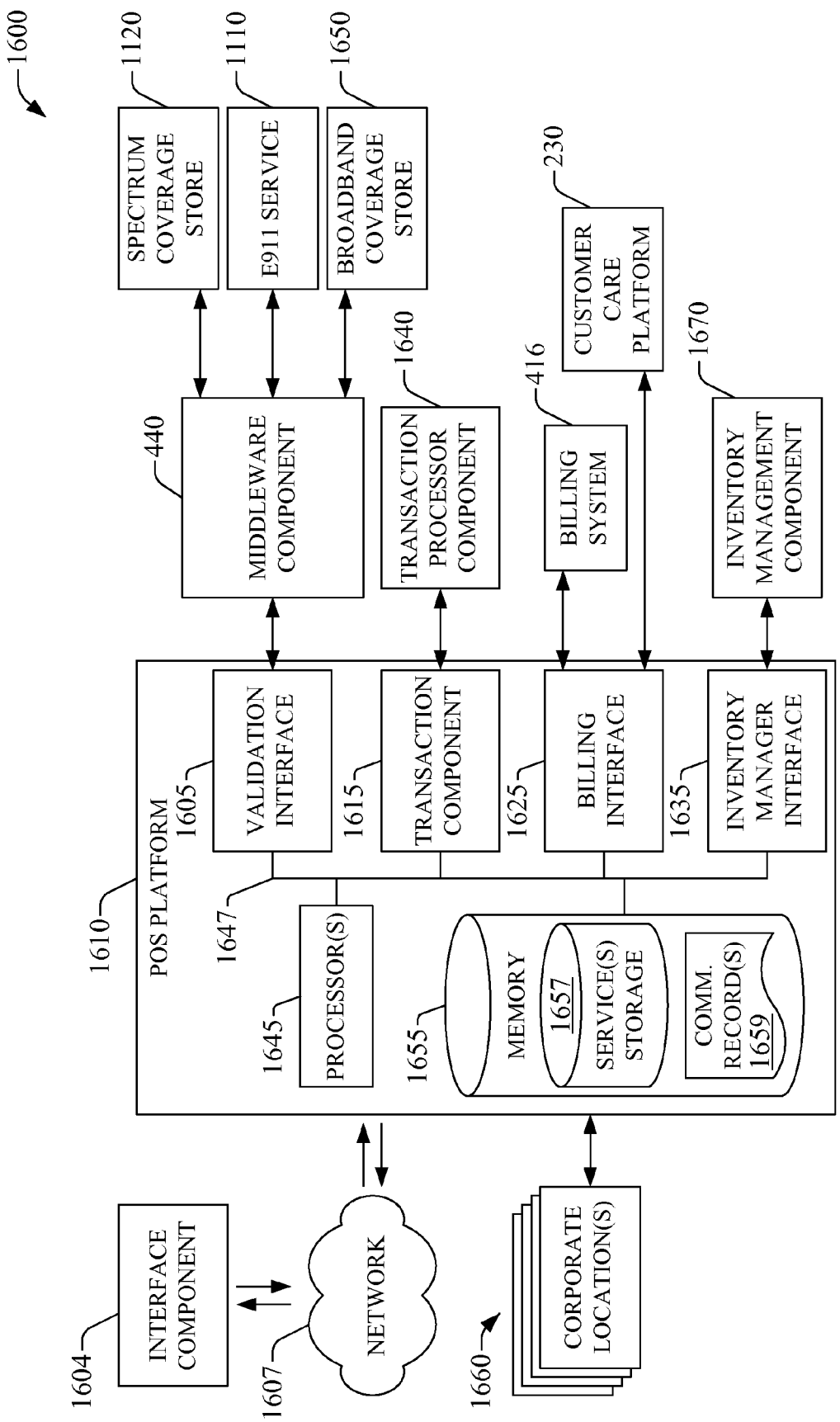
FIG. 16 is a block diagram of an example embodiment of an example POS system in accordance with aspects described herein.

FIG. 16 is a block diagram of an example embodiment of an example POS system 1600 in accordance with aspects described herein. An interface component 1605 is functionally connected through network 1607 with POS platform 1610. Interface component 1604 has substantially the same or the same functionality or functional features of interface component 310. While illustrated separately, interface component 1604 can be part of corporate location(s) 1660 wherein customers can purchase femtocell equipment. In an aspect, while mobile customers regardless of network operator can purchase femtocell equipment, e.g., access points; spare parts or accessories such as connectors, memory cards, antenna sets and controller thereof . . . , those mobile customer that are subscribers of femtocell service provider can be allowed to register and activate femtocell equipment and to utilize it. In addition, it is noted that any consumer, even those without a subscription to mobile services, can purchase a femtocell; for instance, a first individual without mobile service can buy a femto AP for a second individual that utilizes mobile services.

To effect a purchase, interface component 1605 can control various components of POS platform 1610. In an aspect, through interface component 1605, a prospective address for femtocell operation can be submitted to POS platform 1610 for various validation checks. Outcome of such validation checks can be employed to determined eligibility of a customer for purchasing femtocell equipment. Eligibility checks include at least one of wireless spectrum confirmation or verification the network operator is licensed to operate in the location specified by the specific address; verification of E911 service availability, or verification of high-speed internet service provided by the femtocell network operator or a disparate operator. POS platform 1610 can include a validation interface 1605 that can enable the various above-mentioned verification checks. Validation interface 1605 can be accessed through call sessions to inquire femtocell service eligibility.

Validation interface 1605 can supply a specific address to middleware component 440, which can relay the address to a spectrum coverage store 1120 for validation of wireless spectrum coverage. Validation interface can receive a binary response, e.g., Yes or No, from spectrum validation check(s). In addition, spectrum information can be received with a response. In an aspect, when an address is not validated, response from spectrum coverage store 1120 can include a set of one or more nearly-matching addresses for which coverage is available. It is noted that failure to validate an address for wireless spectrum does not hinder purchase of equipment. Middleware component 440 can relay the address to E911 service provider 1110 to validate the specified address against an address record database and confirm availability of PSAP for the validated address. Moreover, middleware component 440 can deliver the address to a broadband coverage store 1650, for validation of available high-speed service.

In an aspect of the subject innovation, utilization of validation interface 1605, and validation enabled there from, can be integrated with legacy or conventional eligibility drivers, e.g., verification of credit worthiness, interface that verifies employed at corporate location(s) for sale of macrocell equipment. Femtocell eligibility inquiries also can include additional conventional retail eligibility checks.

POS network platform 1610 also includes a transaction component 1615 that can implement financial operations associated with purchase of femtocell equipment. Transaction component 1615 can exploit transaction processor component 1640, which can accept and process credit card or debit card authorization requests. Moreover, POS network platform 1610 can include a billing interface that is functionally coupled to billing system 470 and customer care platform 230. At least one of billing system 470 or customer care platform 230 can configure service plans, e.g., establish a monthly recurring charge (MRC) and apply femto rate plans in accordance with specific features purchased by a consumer. Available service plans for femtocell coverage can be reained in service(s) storage 1657 in memory 1655. Billing interface 1625 also can enable configuration of voice add-on features such as unlimited voice or data add-on features with an MRC, which can provide unlimited voice MOU or unlimited data usage for calls that originate or terminate on a femto AP.

In an aspect, transaction component 1615 can maintain a record of commercial transactions and, at least in part, in conjunction with inventory manager interface, establish femtocell equipment commission record(s) 1659, retained in memory 1655, for one or more corporate locations 1660. Commission record(s) generated for equipment sales can be based at least in part on Stock Keeping Unit(s) (SKU(s)). In addition, commission record(s) also can be created for sales of femtocell add-on features to service plans. Moreover, POS platform 1610 can include an inventory manager interface that is functionally connected to an inventory management component 1670 that can administer femtocell inventory and supply chain. Inventory management component 1670 can utilize conventional processes to configure reference data to enable sales of femtocell equipment. In an aspect, inventory management component 1670 can define specific, provider specific unique EIDs for femtocell equipment.

Processor(s) 1645 is functionally connected to interface(s) and component(s) within POS platform 1610. Processor(s) 1645 can confer, at least in part, the described functionality of component(s) and interface(s) within POS platform 1610. Processor(s) 1645 can functionally connect to each of the component(s) within processor(s) 1645 through a bus 1647 for data, control, or any other information exchange; such a bus can be embodied in at least one of a memory bus, a system bus, an address bus, or one or more reference link(s) or interface(s). Additionally or alternatively, processor(s) 1645 can execute interface(s) or component(s) within POS platform 1610. Processor(s) 1645 can execute code instructions such as software or firmware application(s), stored in a memory, e.g., memory 1645, to provide at least part the functionality of one or more of the component(s), interface(s), or driver(s) that can reside within POS platform 1610. Such code instructions can include program modules than implement methodologies described herein.

Figure 17:
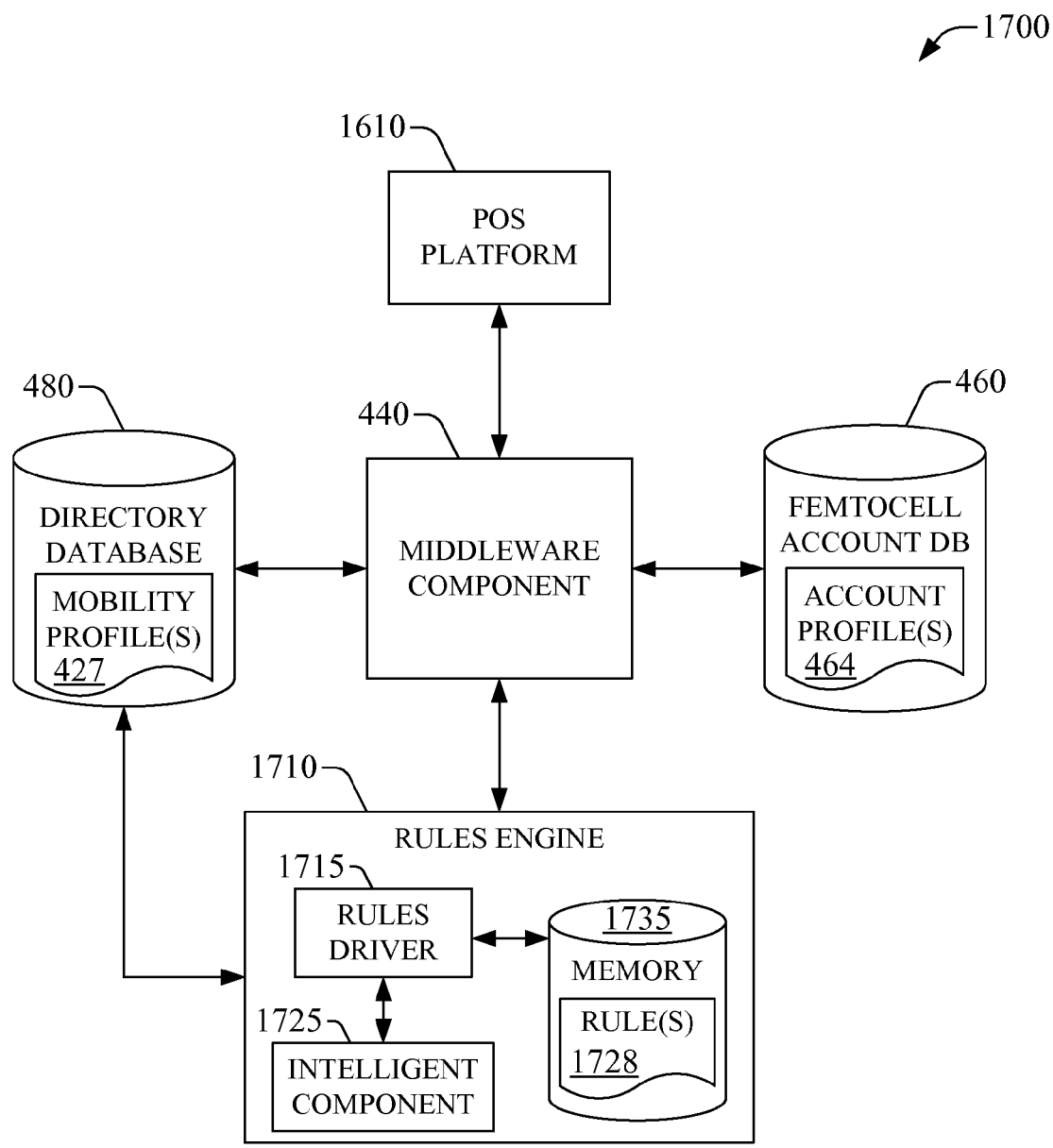
FIG. 17 illustrates a block diagram of an example system that can determine femtocell eligibility of a prospective femtocell subscriber in accordance with aspects described herein.

FIG. 17 illustrates a block diagram of an example system 1700 that can determine femtocell eligibility of a prospective femtocell subscriber in accordance with aspects described herein. In example system 1700, middleware component 440 can convey outcome of the various eligibility checks prompted by POS platform 1610. A rules engine can receive the result(s) of validation checks and apply a set of business rules 1728, retained in memory 1735, for femtocell eligibility and femtocell offerings such as discounted equipment, plan limitations, or the like. To determine at least one of femtocell eligibility or offerings, rules engine 1710 also can utilize subscriber information retained in at least one of directory database 480 or femtocell account database 460. As an example, a prospective femtocell subscriber that is included in one or more access list(s) retained as part of femtocell account profile(s) 464 can receive a larger discount of femtocell service plan that a subscriber that is not currently included in an access list. It should be appreciated that rules engine 1710 can evaluate other metrics such as mobility payment history, subscriber segment, e.g., consumer or business subscriber, high-value or low-value subscriber, loyal or new subscriber, or the like.

Rules driver component 1715 can implement application of eligibility rules 1728, and evaluate external subscriber intelligence to determine femtocell eligibility. To conduct such evaluation, rules driver 1715 can exploit an intelligent component 1725 to infer at least one of suitable femtocell eligibility outcomes, e.g., Yes or No response(s), or service offerings. In addition, rules driver component 1715 can infer eligibility rules and business logic that can be utilized to establish a femtocell service eligibility response. For example, through intelligent component 1725, rules engine driver 1715 can extract patterns of responses and subscriber intelligence, and correlate such patterns to infer suitable rules. At least one advantage of such autonomous determination is that rules 1728 can be customized dynamically.

Various aspects of the subject innovation can be automated through artificial intelligence (AI) methods to infer (e.g., reason and draw a conclusion based upon a set of metrics, arguments, or known outcomes in controlled scenarios), for example, generation of eligibility rules based on a metric that distinguishes customer commercial value. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

Processor(s) (not shown) is functionally connected to driver and component and memory(ies) within rules engine 1710. Processor(s) (not shown) can confer, at least in part, the described functionality of component(s) and driver(s) within rules engine 1710. Processor(s) (not shown) can functionally connect to each of the component(s) within rules engine 1710 through a bus (not shown) for data, control, or any other information exchange; such a bus can be embodied in at least one of a memory bus, a system bus, an address bus, or one or more reference link(s) or interface(s). Additionally or alternatively, the processor(s) (not shown) can execute component(s) or driver within rules engine 1710. The processor(s) (not shown) can execute code instructions such as software or firmware application(s), stored in a memory to provide at least part the functionality of one or more of the component(s) or driver(s) that can reside within rules engine 1710. Such code instructions can include program modules than implement methodologies described herein.

Figure 18:
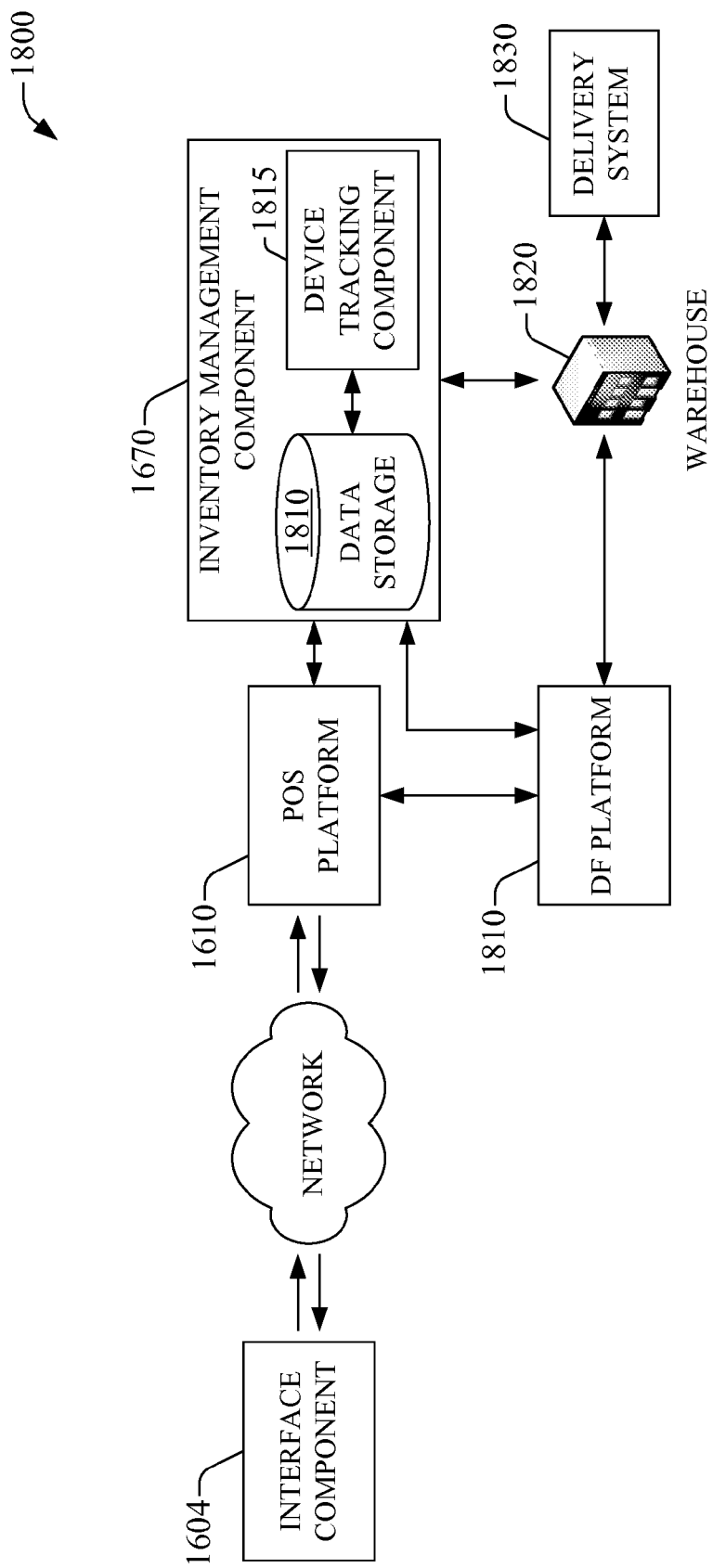
FIG. 18 is an example system that enables direct fulfillment in accordance with aspects described herein.

FIG. 18 is an example system 1800 that enables direct fulfillment in accordance with aspects described herein. Direct fulfillment can be provided on a selective basis; for instance, it can be available to current subscriber of femtocell service provider. In direct fulfillment, a subscriber of a network operator that administer femtocell service can receive purchased femtocell equipment through mail delivery instead of picking up the equipment in a corporate location(s) 1660, or company store. In an aspect, in Ddirect fulfillment a subscriber initiates a call session to a customer care platform 230, e.g., a network operator call center and orders femtocell equipment; the call session can routed through interface 1605 via network 1604, and it can be voice session or data session. POS platform 1610 can apply femtocell eligibility rules as described above, and generate an eligibility response and term(s) of femtocell service, e.g., discounted equipment, specific length of service contract, etc. For subscriber that is eligible for femtocell service and agrees to the term(s) of contract, a Direct Fulfillment (DF) platform 1810 can gather customer shipping address and the order purchase details, such as number of items ordered, description of items ordered, part number(s), or the like. DF 1810 can supply the collected information to inventory management component 1670, which can retain supplied data in data storage 1810, e.g., a data warehouse, and create a log that tracks ordered parts, the log can be created through a device tracking component 1815 that is part of inventory management component 1670. In addition, DF platform 1810 can deliver purchase order information to warehouse 1820, or a warehouse system therein for identification, packaging, and delivery of the purchase equipment to the subscriber through a delivery environment 1830, which can include tracking devices, delivery agents, selected routes, support network such as weather monitoring network, or the like.

One or more processor(s) (not shown) and memory(ies) (not shown) can reside within DF platform 1810 and delivery system 1830 to provide functionality thereof. The processor(s) (not shown) can operate in substantially the same or the same manner as other processor(s) described herein. In addition, the processor(s) (not shown) can execute instructions retained in memory(ies) not shown that reside within DF platform 1810 and delivery system 1830.

Figure 19:
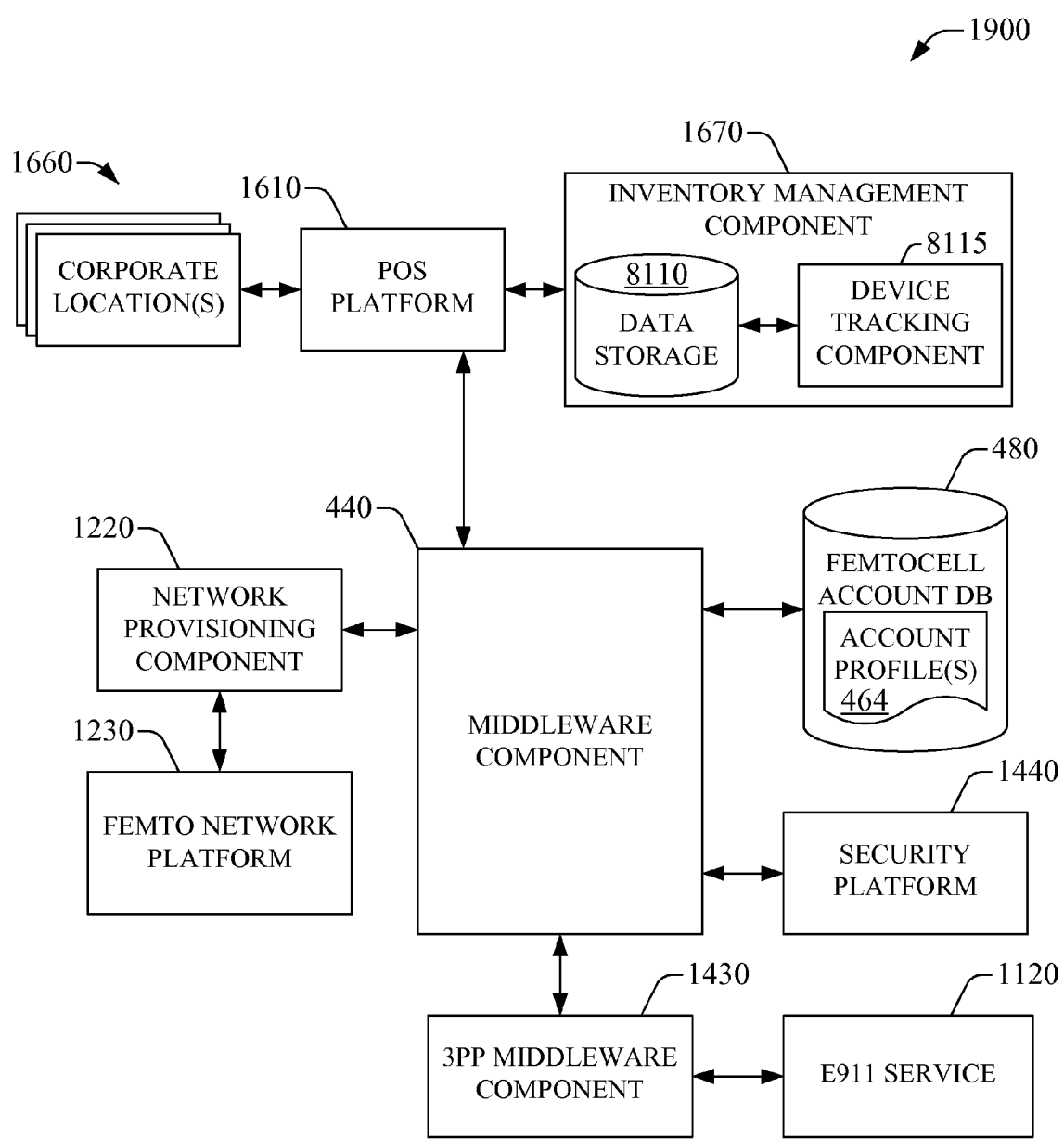
FIG. 19 is a block diagram of an example system that enables femtocell equipment returns in accordance with aspects described herein.

FIG. 19 is a block diagram of an example system 1900 that enables femtocell equipment returns in accordance with aspects described herein. In system 1900, femtocell equipment can be returned at a corporate location(s) 1660. Information such as the serial number can be collected for the returned equipment. The information can be relayed to POS 1610 and conveyed, via inventory manager interface 1635, to inventory management component 1670 for update of data records and inventory tracking, via device tracking component 1815. In addition, when return of the femtocell equipment is accepted, POS platform 1610 can signal middleware component 440 to terminate femtocell service for the identified equipment. As an example, signaling can be effected via validation interface 1605. Upon receiving acknowledgement from a gateway node associated with the terminated femto AP and form a database manager that controls records in femtocell account DB 480 that the terminated femto AP is shutdown, middleware component triggers one or more transactions that terminate E911 service; such termination can proceed through signaling delivered by middleware component 440 to 3PP middleware component 1430 and relayed to E911 service provider. In addition, middleware component can indicate deactivation of the femto AP to security platform 1440 to terminate service tracking, and retain termination records, such as time-stamp for deactivation and network information related to the femto AP at the time of termination.

One or more processor(s) (not shown) and memory(ies) (not shown) can reside within inventory component 1670 to provide functionality thereof. The processor(s) (not shown) can operate in substantially the same or the same manner as other processor(s) described herein. In addition, the processor(s) (not shown) can execute instructions retained in memory(ies) not shown that reside within inventory management system 1670.

Figure 20:
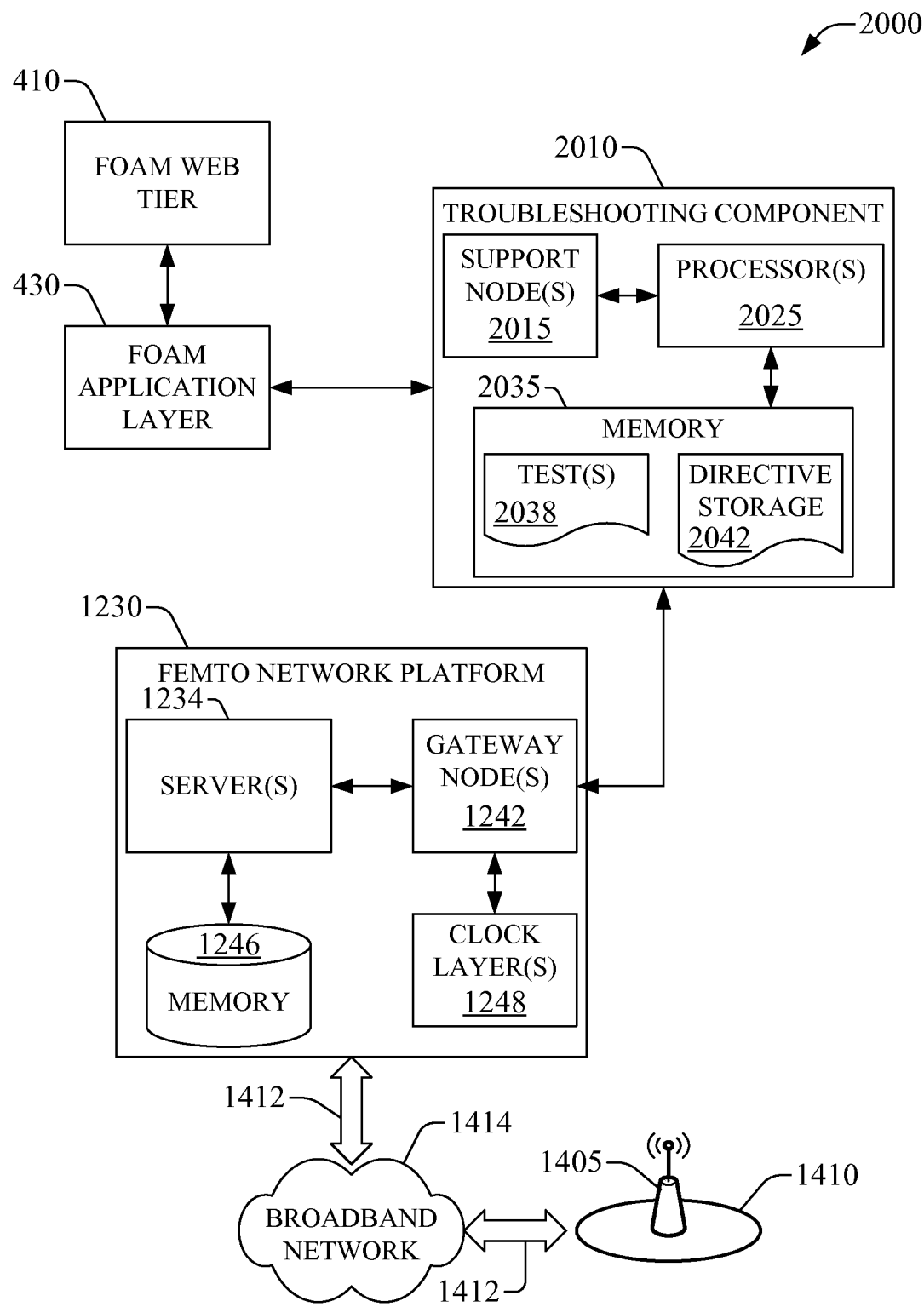
FIG. 20 is a block diagram of an example system that enables maintenance of femtocell service account and operation of one or more femto APs that provide the service in accordance with aspects of the subject innovation.

FIG. 20 is a block diagram of an example system 2000 that enables maintenance of femtocell service account and operation of one or more femto APs that provide the service in accordance with aspects of the subject innovation. In system 2000 a troubleshooting component 2010 can enable troubleshooting or manipulation of operation of a femto AP. Troubleshooting component 2010 is functionally connected to gateway node(s) 1242 in a femto network platform 1230, wherein the gateway node(s) provide traffic and signaling to a femto AP, e.g., femto AP 1405. Troubleshooting component 2010 can deliver traffic and signaling to the femto AP through gateway node(s) 1242. Communication of traffic and signaling occurs as described above. In addition, troubleshooting component 2010 is functionally connected to FOAM web tier 410 through FOAM application layer 430. Such connectivity allows a customer care platform 230 to access troubleshooting component 2010 and exploits it capabilities. In an aspect, a representative of customer care platform 230 can login to account management service 220 and be exposed to functionality of troubleshooting component 2010 through FOAM application layer 430.

In an aspect, troubleshooting component 2010 can include one or more support node(s) 2015 that can implement, at least in part, a set of test(s) 2030 to diagnose operation conditions or operational status of a femto AP, e.g., femto AP 1405. Diagnosis can be based at least in part on operational data generated at the gateway node(s) level and retained in memory 1246, or operation information generated and consumed, or retained, at the femto AP. Test(s) also can be employed to probe configuration of access list(s), to determine adequate format or presence of configuration parameters, such as relative priority for service among mobile or wireless devices authorized access to the femto AP. Test(s) can be customized by a customer representative by utilizing commands stored within directive storage 2042. Test(s) 2038 and directives stored in memory element 2042 can be based at least in part on radio technology(ies) employed by the femto AP.

In addition, support node(s) can deliver instructions or directives to remediate an identified faulty condition in the femto AP. Directives that can be delivered to the femto AP includes at least one of an instruction to reboot or reinitiate the access point, measure channel conditions, or adjust operational parameters such as radiating power.

The directives that are available for troubleshooting are retained in directive storage 2042. Available directives can be retained in a hierarchy in accordance with access level cleared by a customer representative that utilizes troubleshooting component 2010. For example, low-level clearance can allow a customer representative to reboot the femto AP, to power off and power on the femto AP for hard reboots. A medium-level clearance can allow a customer representative to perform diagnosis at the low-level in addition to run tests such as monitoring power of radiated signal, level of memory available to the femto AP, etc. High-level of clearance can enable the customer representative to determine number of active peripheral devices, wireless or otherwise, connected to the femto AP; monitor radio channel conditions; tune position of remotely controllable antennas in the femto AP; download sample data in accordance with a privacy profile configured by the subscriber responsible for the femtocell service account linked to the femto AP; etc. A high level clearance can allow a customer representative.

Testing and monitoring performed through troubleshooting component 2010 can be retained in memory 2035 for analysis and determination if remote manipulation can solve a technical issue or an on-site visit is to be scheduled or dispatched. In addition, retained log record(s) can enable a customer representative to make recommendations related to parts replacements for femto equipment, or relocation of a femto AP within a facility.

In view of the example systems described above, example methods that can be implemented in accordance with the disclosed subject matter can be better appreciated with reference FIGS. 21-40 which display various flowcharts and interaction diagrams, or call flows. For purposes of simplicity of explanation example methods disclosed herein are presented and described as a series of acts; however, it is to be understood and appreciated that the claimed subject matter is not limited by the order of acts, as some acts may occur in different orders and/or concurrently with other acts from that shown and described herein. For example, it should be understood and appreciated that an example method could alternatively be represented as a series of interrelated states or events, such as in a state diagram, or interaction diagram. Moreover, not all illustrated acts may be required to implement a method in accordance with the subject specification. Additionally, at least a portion of two or more example methods disclosed herein can be combined. Moreover, it should be further appreciated that the example methods disclosed hereinafter and throughout the subject specification are capable of being stored on an article of manufacture to facilitate transporting and transferring such example methods to computers or other devices with processing capabilities for execution, and thus implementation, by a processor or for storage in a memory within the computers or devices.

Figure 21:
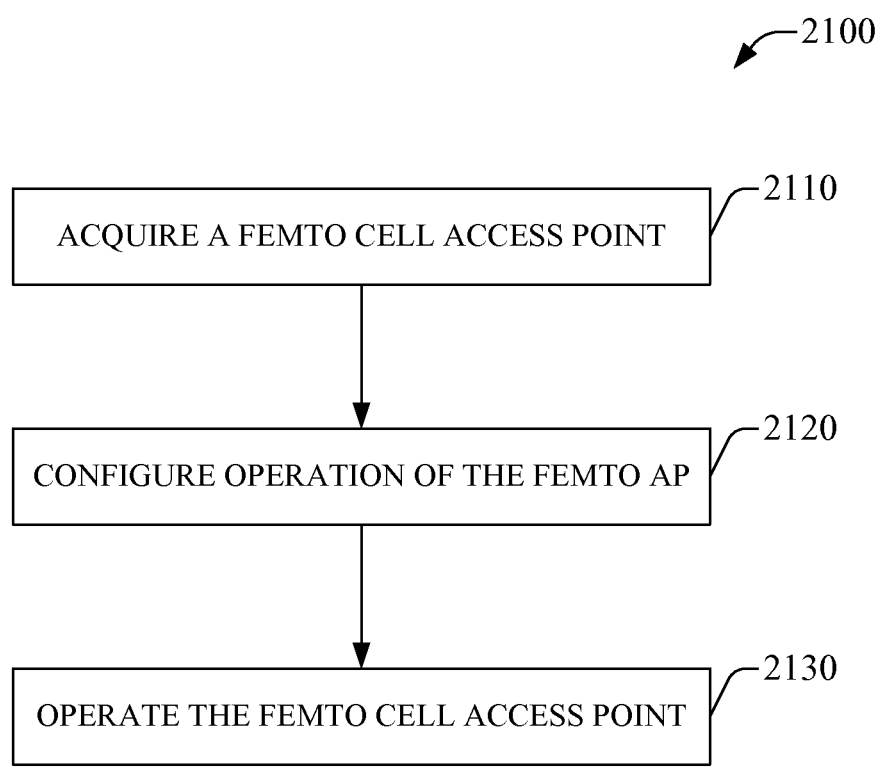
FIG. 21 presents a flowchart of an example methodology for supplying femtocell service according to aspects of the disclosed subject matter.

FIG. 21 presents a flowchart of an example method 2100 for servicing a femto cell access point. At act 2110 a femto cell access point is acquired. In an aspect, acquisition is conducted through a point of sales system (e.g., system 210), which can be deployed in a networked configuration (e.g., deployed over the internet). Additionally, POS can include substantially all systems necessary to facilitate acquisition and manage post-sale events such as inventory update, service provision, service availability checks, and so on. Is should be appreciated that acquisition of the femto AP can include purchase of voice and data plans, including add-on features such music and video on-demand, subscriptions to internet protocol television (IPTV), and so forth, from a service provider, or network operator. At act 2120, the femto AP is configured. Configuration can be effected through a networked interface, e.g., an online platform, that facilitates location validation and access to emergency services coverage, generation and management of access profile(s) for specific subscribers that can access service through the femto AP, service account registration and preference setup, and service provisioning. It should be appreciated that other configuration events can be managed at act 2120, like femto AP service deactivation and shutdown. In an aspect of the subject innovation, customer care/support agents can manage configuration of a femto AP, including address validation, white list(s) management, provisioning, and so forth. At act 2130, the femto AP is operated. Operation can include various aspects such as accessing agreed service (e.g., voice and data), requesting customer support, which can be provided through a networked interface (e.g., web-based, or voice-based), receiving and acting upon billing, maintaining the femto AP, like downloading software for security features or customized service, and so forth.

Figure 22A:
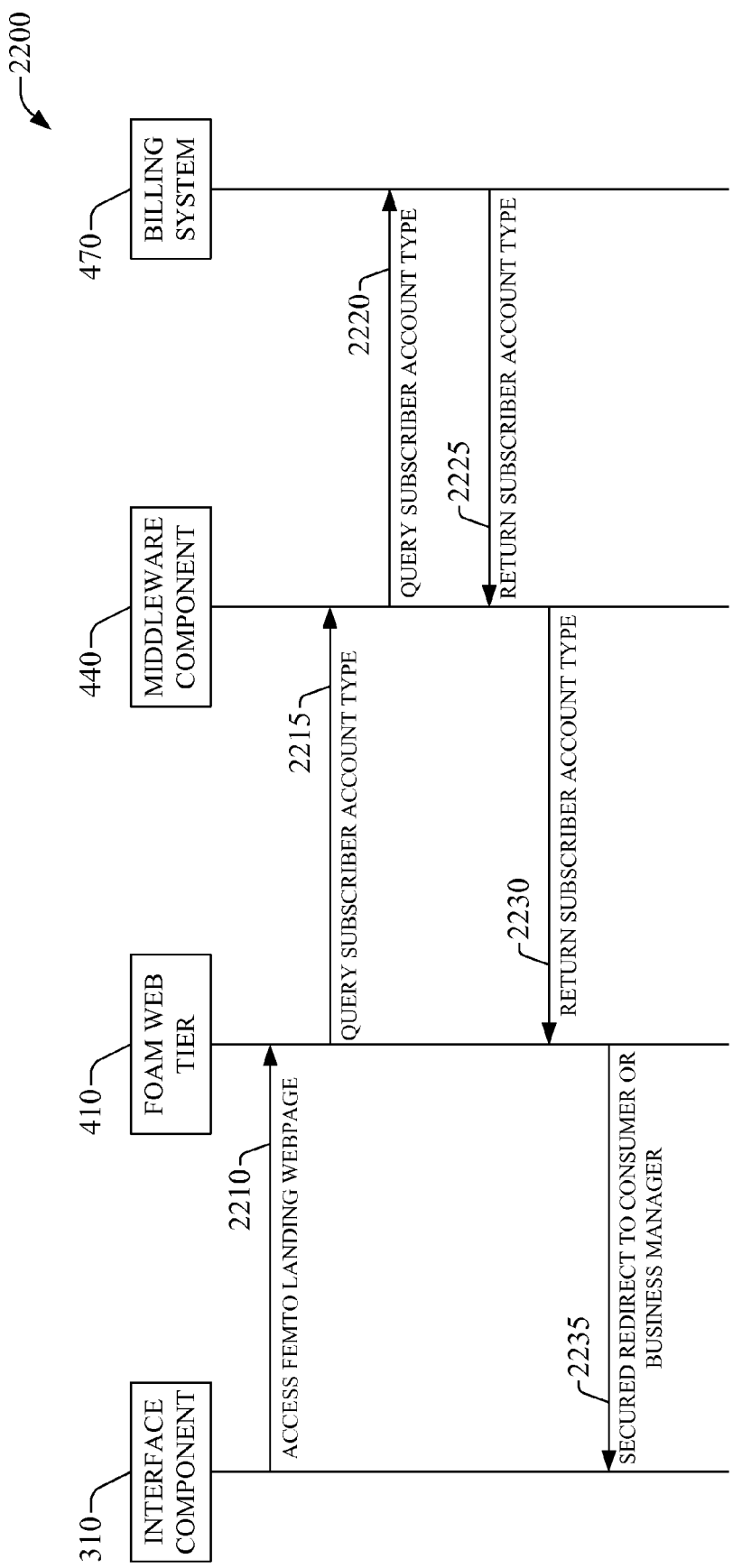
FIGS. 22A-22B illustrate example call flows for logging in into an account management service according to aspects of the subject innovation.

FIG. 22A illustrates an interaction diagram 2200 or call flow for an example method for logging in into an account management service according to aspects of the subject innovation. As illustrated various components can enact portions of the login call flow. In an aspect, server(s) or processor(s) associated with the various components and that provide functionality thereto can enable enacting, at least in part, the subject example method. Interface component 310 accesses femto landing webpage at 2210; the landing webpage can be hosted in FOAM web tier 410. To determine a type of subscriber account and direct login to a proper legacy account manager, FOAM web tier 410 conveys at 2215 a query to extract subscriber account type, which can be either a consumer account or a business or enterprise account. In an aspect, the query is based at least in part on a subscriber CTN provided through the femto landing webpage. Subscriber account type query is conveyed to middleware component 440, which at 2220 relays the query to billing system 470. It is noted that in an alternative or additional example call flow or method, subscriber account type identification can be provided by a customer care platform, e.g., 230. Billing system, 470, at 2225, returns or conveys a subscriber account type, wherein the account type can be extracted through a received subscriber CTN and subscriber mobility profile(s) retained in a directory database, e.g., 480, or subscriber database. Middleware component 440 receives subscriber account type indication and relays it to FOAM web tier 410 at act 2230. FOAM web tier 410 receives the indication of subscriber account type and at 2235 securely redirects interface component 310 to consumer manager 424 or business manager 428 when the account type is, respectively, of the consumer or business type. In an aspect, secure redirection can be based on hypertext transfer protocol secure (HTTPS) protocol with advanced encryption standard (AES) based at least in part on P-bit (P=128, 256 . . . ) encryption key(s). In addition, secure redirect also can be based at least in part on IPsec, VPN, or the like.

Figure 22B:
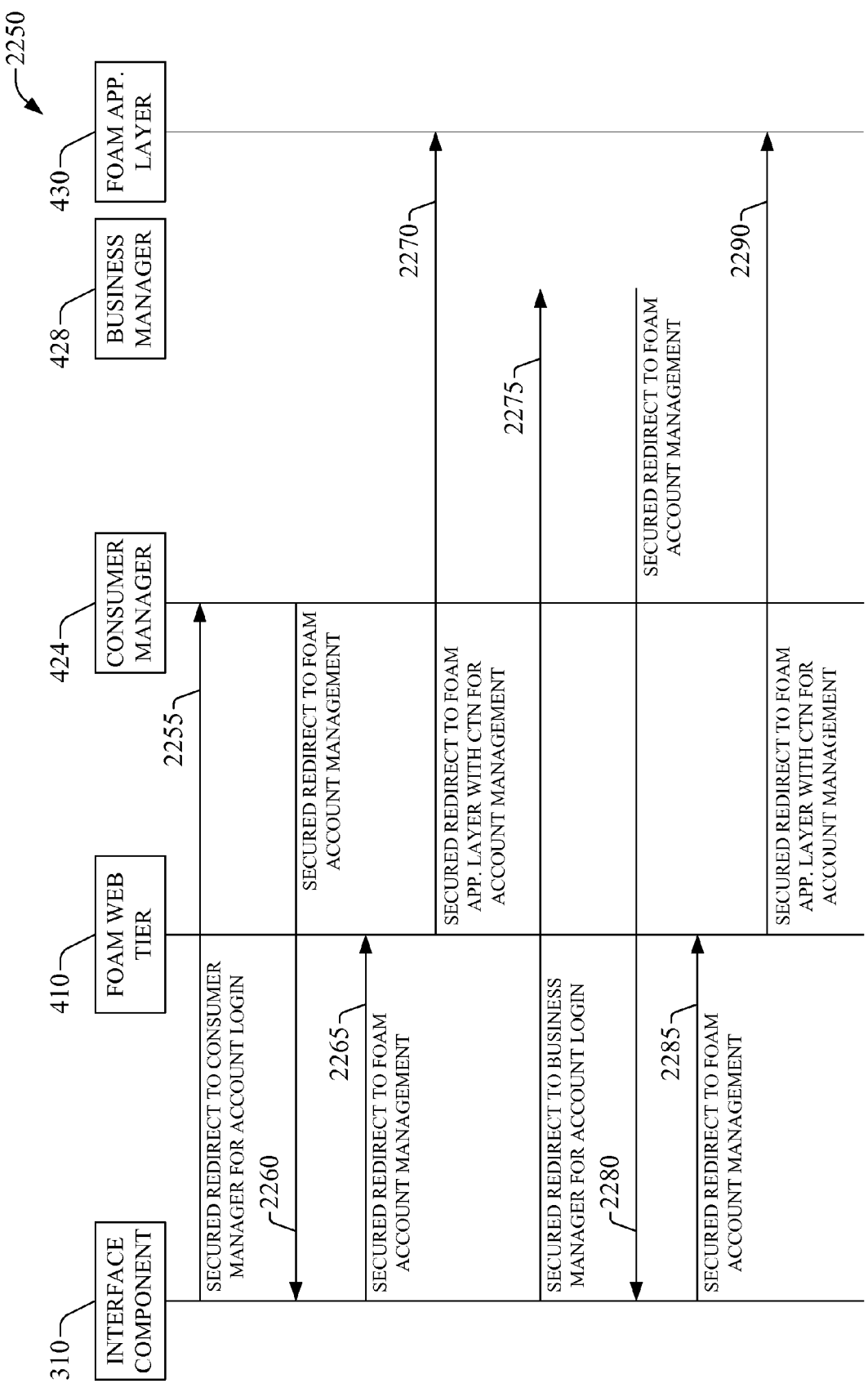

FIG. 22B is an example interaction diagram or call flow 2250 for logging in into an account management service, e.g., service 220, according to aspects of the subject innovation. At 2255, interface component 310 securely redirects to consumer manager component 424 for account login. As mentioned supra, redirection act can be secured through HTTPS with AES based at least in part on 256 encryption key(s). At 2260, upon successful login, which can include at least password exchange, consumer account manager component 424 securely redirects interface component to FOAM account management. At 2265, interface component 310 securely redirects to FOAM account management interface within FOAM web tier 410. At 2270, FOAM web tier securely redirects to FOAM application layer 430 with CTN for account management. Acts 2255 through 2270 allow account management for a consumer type account. When an account to be managed is a business account, interface component 310 securely redirects to business manager component 428 for account login. At 2280, upon successful login, which can be based at least on a password exchange, business manager component 428 securely redirects interface component 310 to FOAM account management. In an aspect, when interface component 310 is a consumer web browser, such redirection switches a rendered webpage conveyed to a subscriber. In particular, content of a rendered webpage upon redirection can include content customized to the subscriber. At 2285, interface component 310 securely redirects to FOAM web tier 410 for FOAM account management. At 2290, FOAM web tier 410 securely redirects to FOAM application layer 430 with CTN for account management. As mentioned supra, redirection act can be secured, for example, through HTTPS with AES based at least in part on P-bit (P=128, 256 . . . ) encryption key(s).

Figure 23:
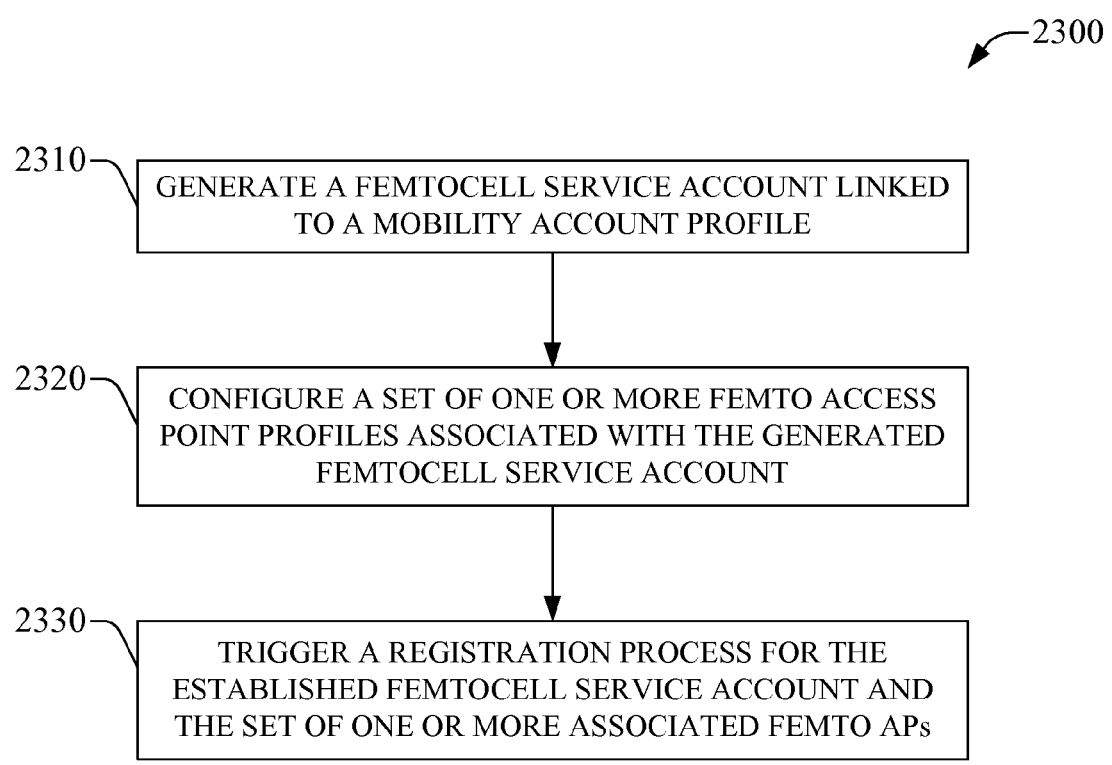
FIG. 23 is a flowchart of an example method for registering femtocell service through one or more femto access points.

FIG. 23 is a flowchart of an example method 2300 for registering femtocell service through one or more femto access points. At act 2310, a femtocell service account linked to a mobility account profile, e.g., 427, is generated. At act 2320, a set of one or more femto access point profiles associated with the generated femtocell service account are configured. Configuration can include logical and physical creation of the profiles in memory, such as within a femtocell account database. In addition, configuration can comprise population of specific attribute fields within the generated profiles, contents of attribute field can be extracted from the mobility account profile or received from an interface that collects subscriber input. At act 2330, a registration process for the established femtocell service account and the set of one or more associated femto APs is triggered.

Figure 24:
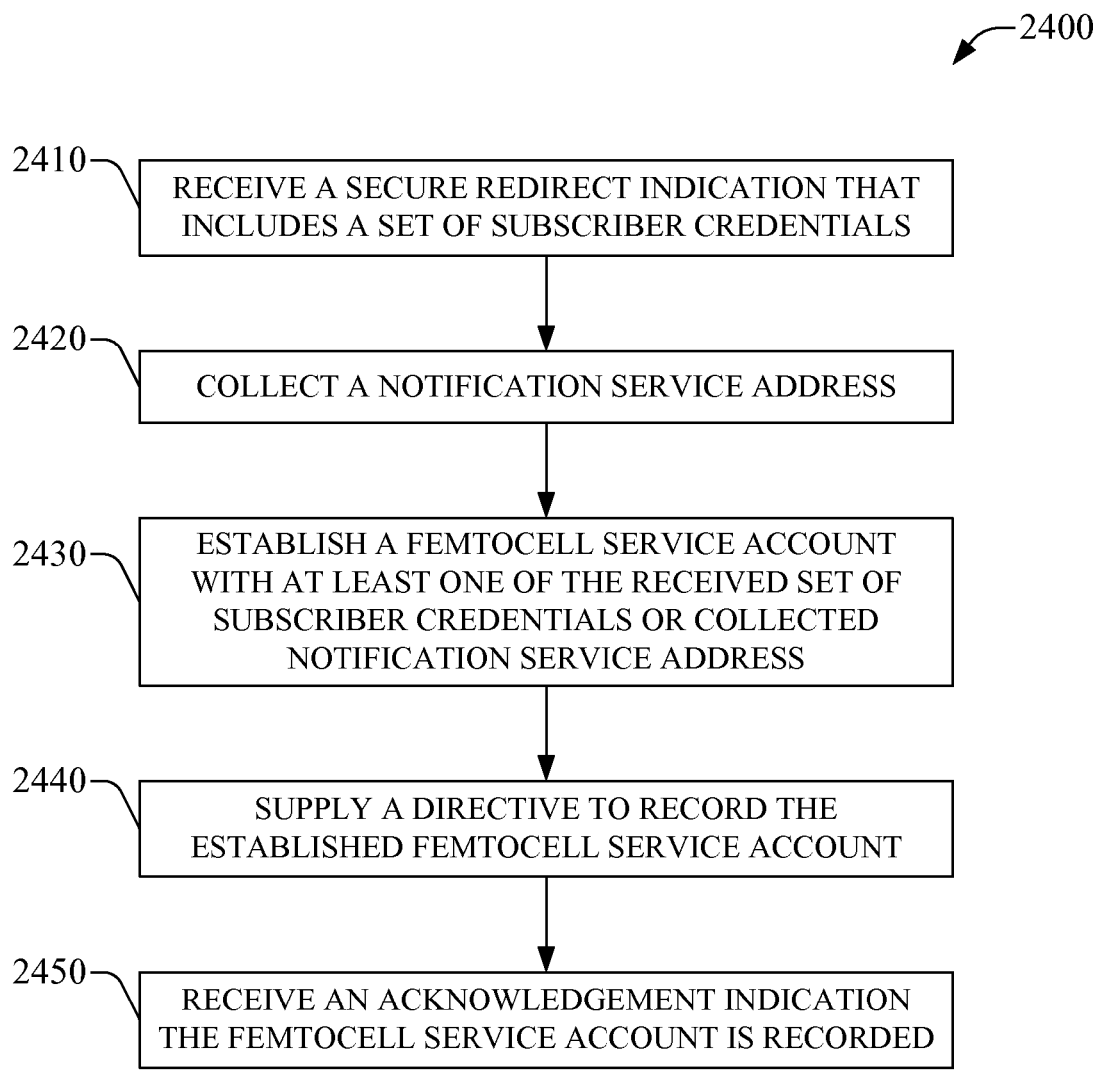
FIG. 24 is a flowchart of an example method for creating a femto AP equipment profile account in accordance with aspects of the subject innovation.

FIG. 24 is a flowchart of an example method 2400 for creating a femto AP equipment profile account in accordance with aspects of the subject innovation. At act 2410, a secure redirect indication that includes a set of subscriber credentials is received. The subscriber credentials can include a customer telephone number (CTN) associated with a mobility service account. At act 2420, a notification service address such as one of an email address, an instant messenger alias, a short message service telephone number, or the like, is received. At act 2430, a femtocell service account is established, the account includes at least one of the received set of subscriber credentials or collected notification service address. At act 2440, a directive to record the established femtocell service account is supplied. At act 2450, an indication that acknowledges recordation of the femtocell account is received.

Figure 25:
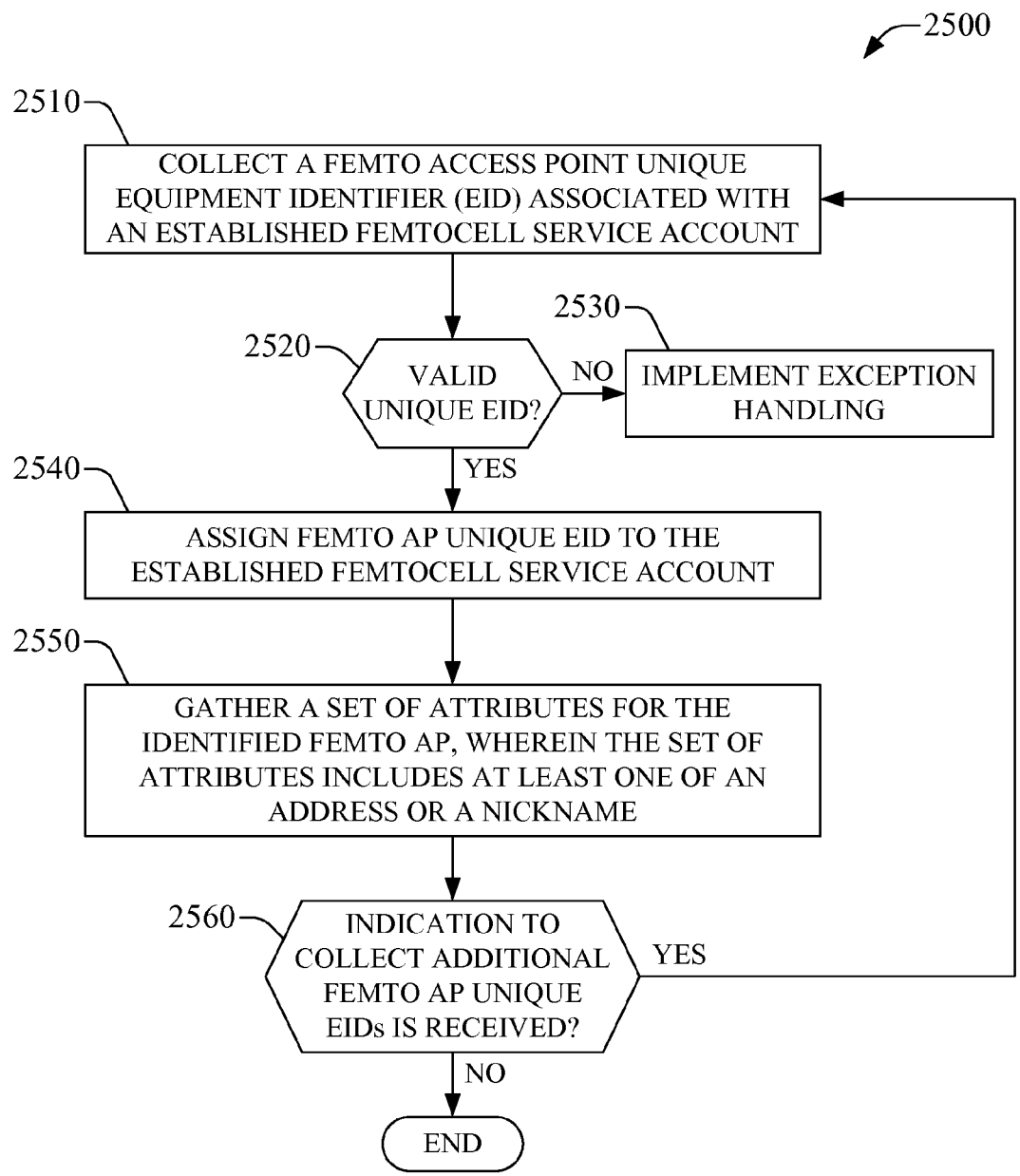
FIG. 25 presents a flowchart of an example method for populating an equipment profile associated with an established femtocell service account in accordance with aspects disclosed in the subject innovation.

FIG. 25 presents a flowchart of an example method 2500 for populating an equipment profile associated with an established femtocell service account in accordance with aspects disclosed in the subject innovation. At act 2510, a femto AP unique EID associated with the established femtocell service account is collected. In an aspect, collection can proceed through a FOAM web tier. At act 2520, it is determined whether the unique EID is a valid identifier, e.g., the EID is issued by an authorized or registered vendor, or a checksum procedure such as Luhn algorithm is fulfilled when applied to the unique EID. When the outcome of act 2520 is negative, exception handling is implemented at 2530. Alternatively, when the outcome is affirmative, at act 2540, the femto AP unique EID is assigned to the established femtocell service account. At act 2550, a set of attributes for the identified femto AP is gathered, wherein the set of attributes includes at least one of an address or a nickname. Gathering the set of attributes can include prompting a subscriber for input of such attributes. The set of attributes can be recorded within a femto AP equipment profiled that can be retained as part of the established femtocell service account. At act 2560, it is probed whether an indication to collect additional femto AP unique EIDs is received. In the affirmative case, flow is directed to act 2510, whereas a negative outcome completes the subject example method as disclosed.

Figure 26A:
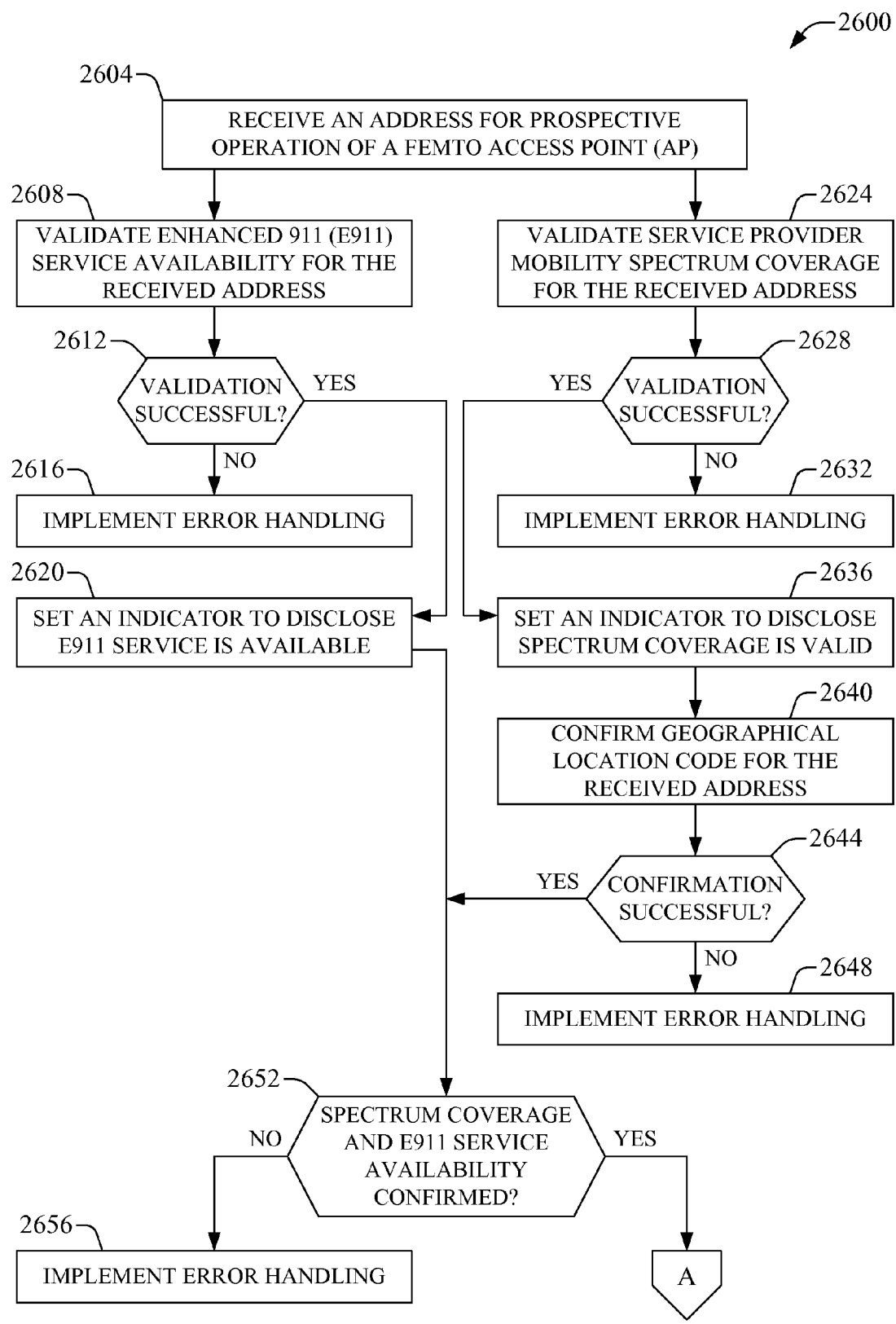
FIGS. 26A-26B display a flowchart of an example method for registering a femto access point in accordance with aspects disclosed in the subject innovation.
Figure 26B:
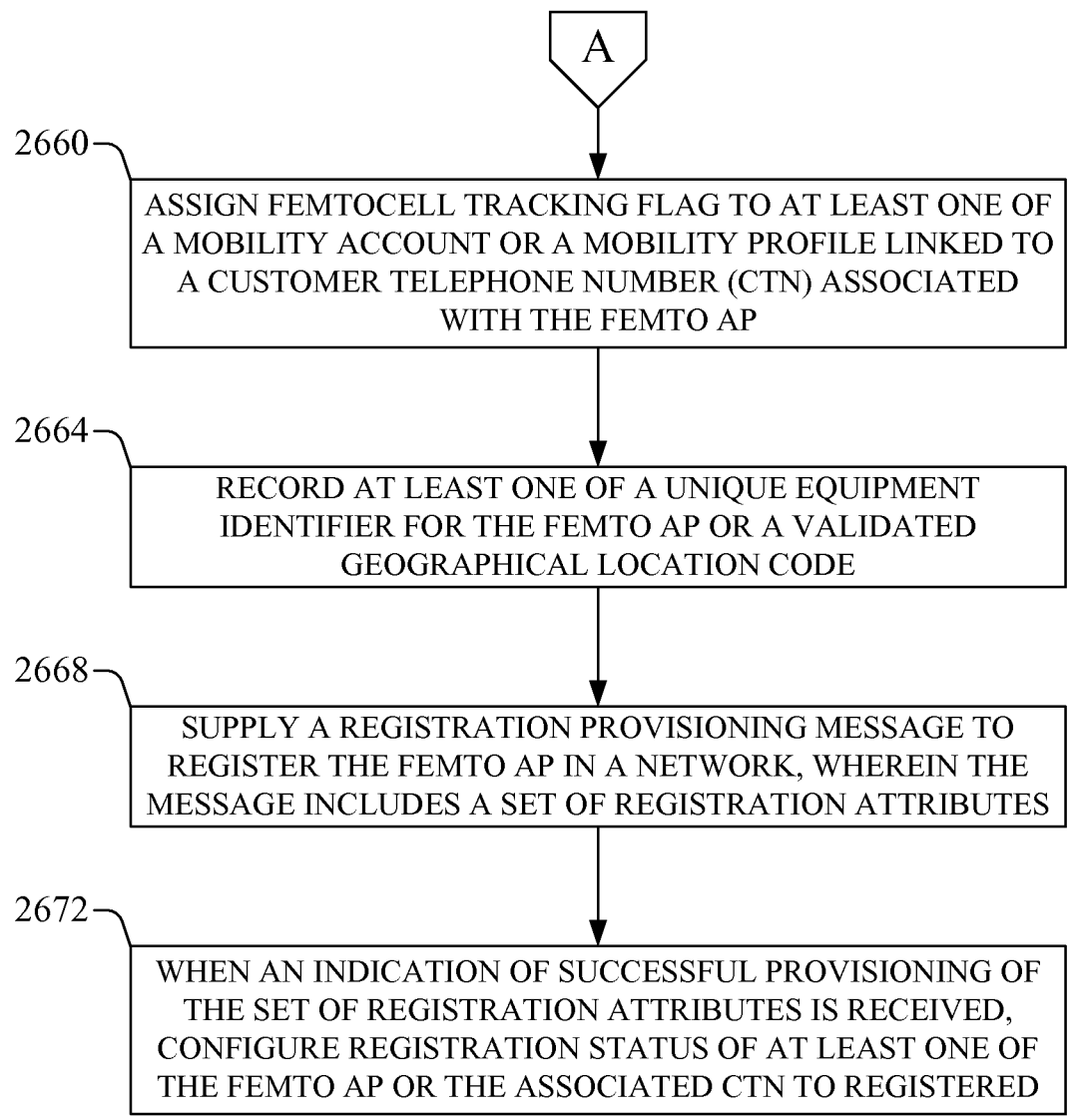

FIGS. 26A-26B display a flowchart of an example method 2600 for registering a femto access point in accordance with aspects disclosed in the subject innovation. The subject example method can be implemented through one or more components of an information technology system that provides backend services to a wireless communication network. For instance middleware component 440, and components or functional elements therein, can effect the subject example method 2600. At act 2604 an address for prospective operation of a femto AP is received. The address can be received through FOAM application layer 430. Reception of the address can lead to two branches of transactions or set of acts. A first set of acts is directed to validation of E911 service availability, and a second set of acts is directed to validation of mobility spectrum coverage. At act 2608, enhanced 911 (E911) service availability for the received address is validated. At act 2612 it is determined if the validation is successful. In the negative case, error handling is implemented at act 2616. In an aspect, exception manager 745 can enable such implementation. Conversely, in the affirmative case, an indicator to disclose E911 service is available is set at act 2620, and flow is directed to act 2652. At act 2624, mobility spectrum coverage for the received address is validated. Validation outcome is checked at act 2628. When validation is not successful, error handling is implemented. Conversely, a successful validation outcome leads to act 2636, in which an indicator is set to disclose spectrum coverage is valid. At act 2640, a geographical location code, e.g., a geocode, is confirmed for the received address; confirmation includes verification that the supplied address is present in a GIS database, typically associated with an E911 service provider, and a related geographical location code is available. At act 2644 it is ascertained whether confirmation is successful. Unsuccessful confirmation leads to act 2648 in which error handling is implemented. Successful confirmation directs flows to act 2652. Act 2652 is a validation act that verifies indicators for both spectrum coverage and E911 service are available, or logically recorded. When verification fails, error handling is implemented at act 2656. Successful validation directs flow to act 2660, through reference anchor "A."

At act 2660, a femtocell tracking flag is assigned to at least one of a mobility account or a mobility profile linked to a CTN associated with the femto AP. At act 2664, at least one of a unique equipment identifier (EID) for the femto AP or a validated geographical location code is recorded. At act 2668, a registration provisioning message is supplied to register the femto AP in a telecommunication network, or one or more components therein, the message includes a set of registration attributes. At act 2672, when an indication of successful provisioning of the set of registration attributes is received, Registration Status of at least one of the femto AP or the associated CTN is configured to Registered.

Figure 27A:
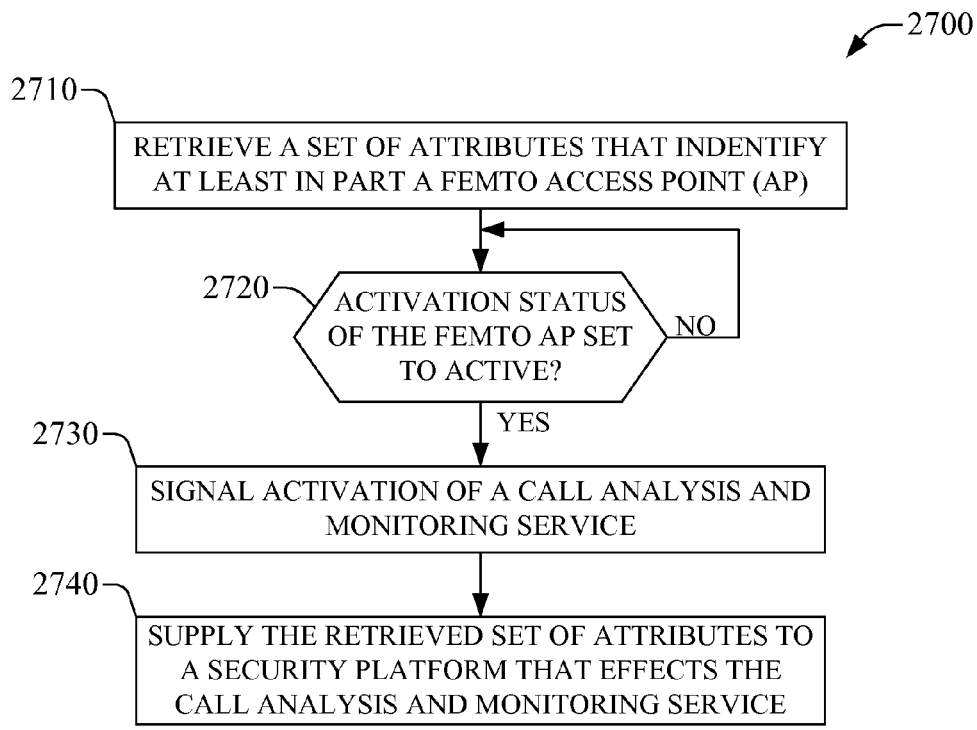
FIG. 27A is a flowchart of an example method for configuring security monitoring features that allow, at least in part, compliance with CALEA in accordance with aspects described herein.

FIG. 27A is a flowchart of an example method 2500 for configuring security monitoring features that allow, at least in part, compliance with CALEA in accordance with aspects described herein. At act 2710, a set of attributes that identify at least in part a femto AP are retrieved. At act 2720, it is probed if an Activation Status flag is set to Active. In the negative case, act 2720 is re-enacted at specific time intervals. At act 2730, activation of a call analysis and monitoring service is signaled. Signaling can be transported through HTPP protocol, e.g., via POST directive, or through other network-based transport protocols, included custom procedures. At act 2740, the retrieved set of attributes is supplied to a security platform that effects the call analysis and monitoring service.

Figure 27B:
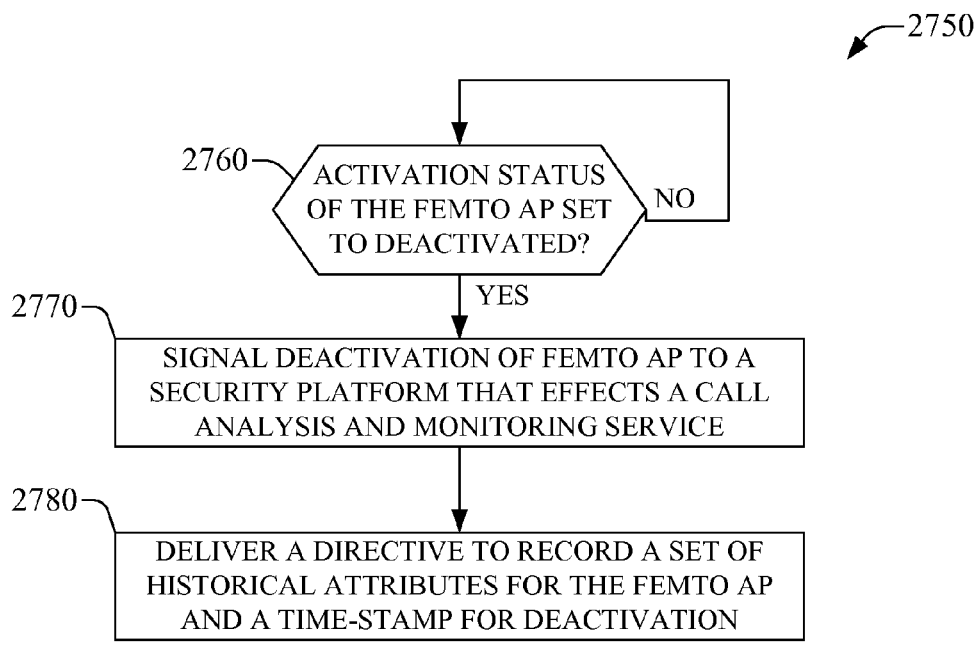
FIG. 27B is a flowchart of an example method for disconnecting call tracking features in accordance with aspects described herein.

FIG. 27B is a flowchart of an example method 2750 for disconnecting call tracking features in accordance with aspects described herein. At act 2760, it is determined if Activation Status of the femto AP is set to Deactivated. In the negative case, act 2760 is re-enacted at specific time intervals. At act 2770, deactivation of femto AP is signaled to a security platform that effects a call analysis and monitoring service. At act 2780, a directive is delivered to record a set of historical attributes for the femto AP and a time-stamp for deactivation.

Figure 28:
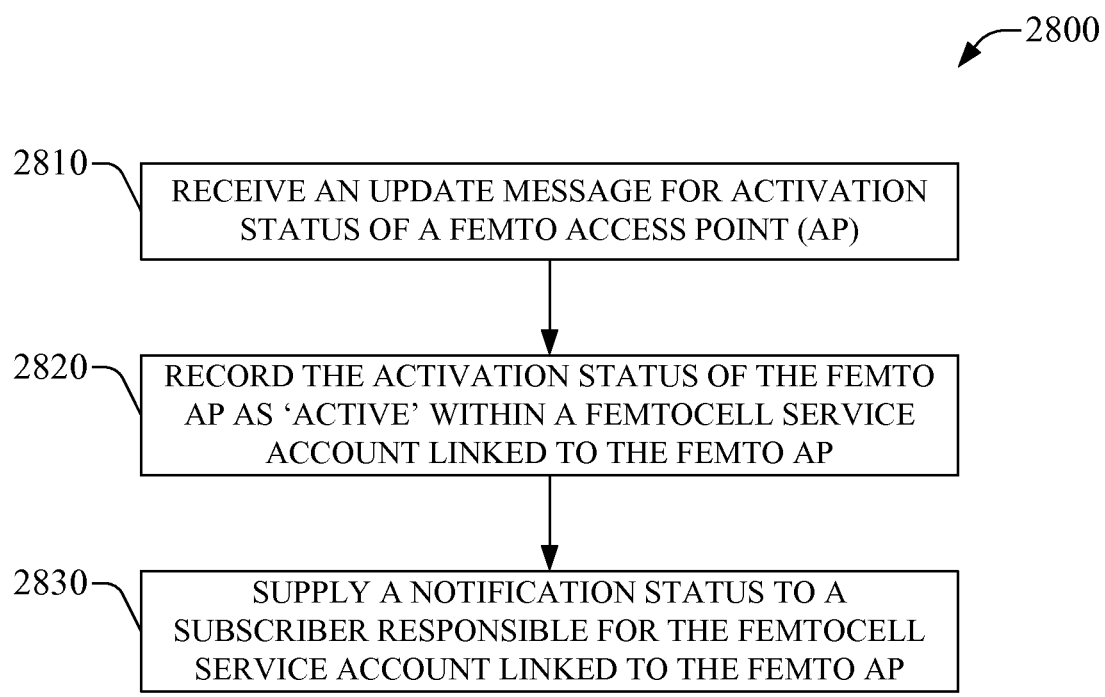
FIG. 28 is a flowchart of an example method for provisioning femtocell attributes in a femtocell account profile in accordance with aspects described herein.

FIG. 28 is a flowchart of an example method 2800 for provisioning femtocell attributes in a femtocell account profile in accordance with aspects described herein. At act 2810, an update message for Activation Status of a femto AP is received. At act 2820, that Activation Status of the femto AP is recorded as 'Active' within a femtocell service account linked to the femto AP, e.g., within an equipment profile 1032 or 1060. At act 2830, a notification status is supplied to a subscriber responsible for the femtocell service account linked to the femto AP. In an aspect, the subscriber is identified as mobility CTN owner in an account profile such as profile 464, and contacted through a messaging service address as recorded in the account profile.

Figure 29:
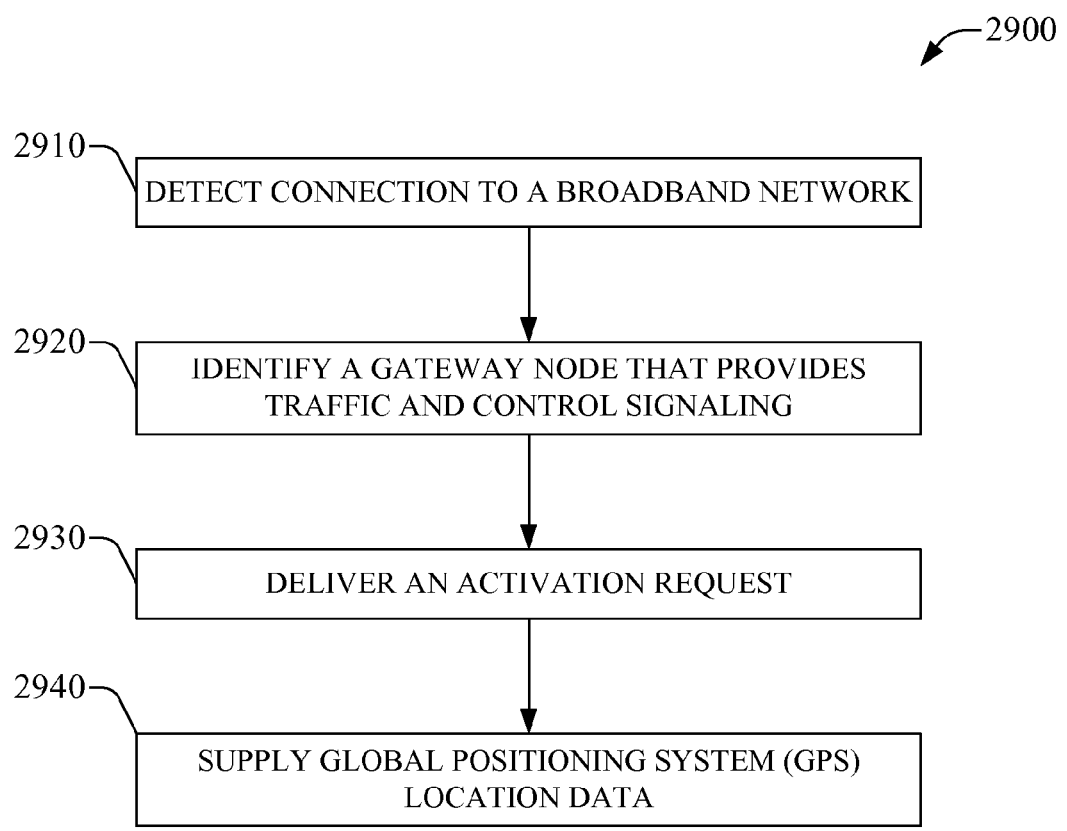
FIG. 29 presents a flowchart of an example method for signaling an activation procedure for a femtocell access point.

FIG. 29 presents a flowchart of an example method 2900 for signaling an activation procedure for a femtocell access point. The subject example method 2900 can be effected by a femto AP or one or more processors therein that confer functionality to the femto AP. At act 2910, connection to a broadband network is detected. Such detection can be effected through a discovery procedure enabled by an broadband network interface within the femto AP and one or more processors therein. At act 2920, a gateway node that provides traffic and control signaling for the femto AP is identified. Gateway node can be part of a femto network platform such as platform 1230. At act 2930, an activation request is delivered. The activation request can be transported in accordance with various protocols such as Transmission Control Protocol/Internet Protocol (TCP/IP). At act 2940, global positioning system (GPS) location data is supplied. The GPS location data can be generated at least in part by the femto AP and includes latitude and longitude of the location of the femto AP.

Figure 30:
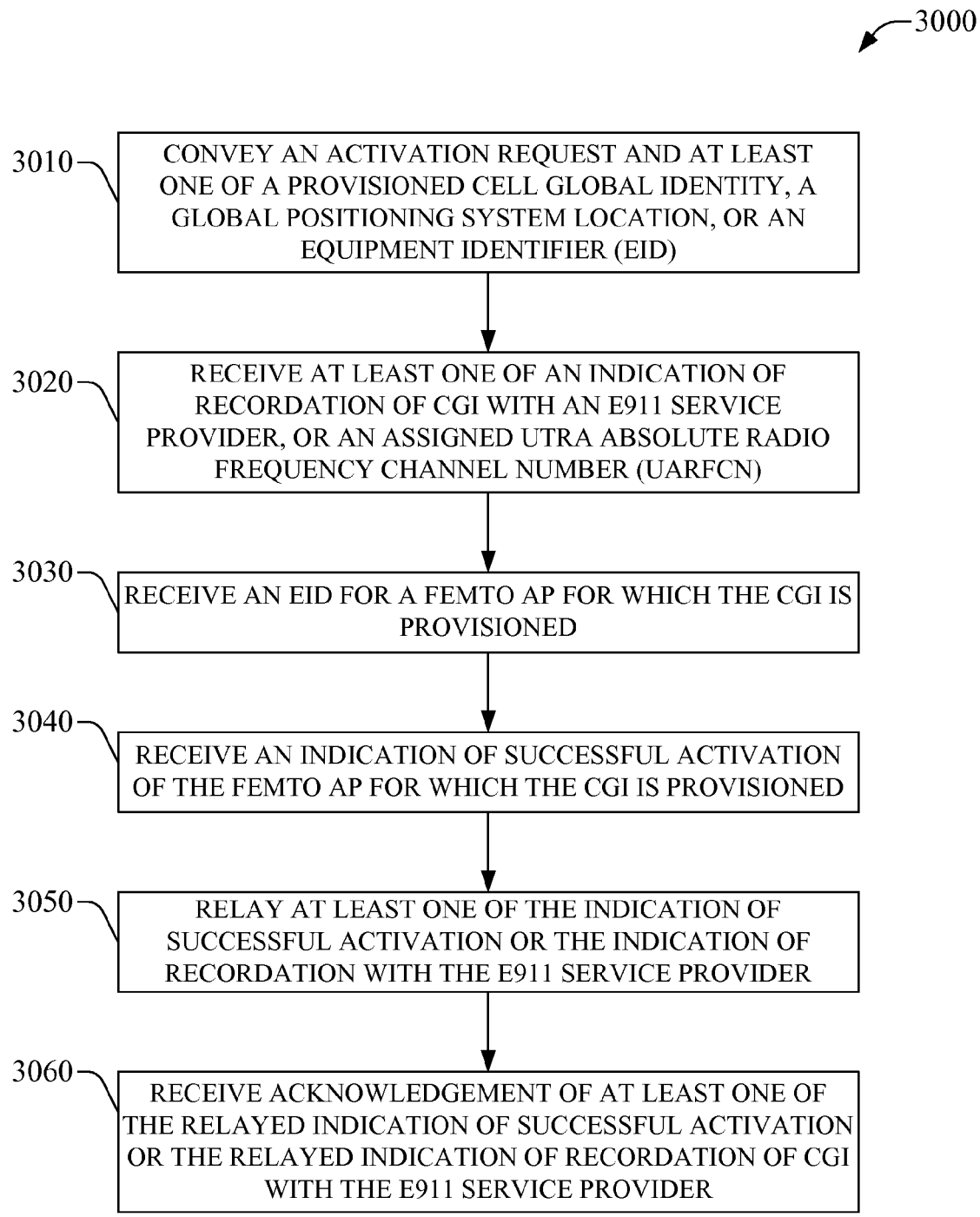
FIG. 30 displays a flowchart of an example method for activating a femtocell access point in accordance with aspects described herein.

FIG. 30 displays a flowchart of an example method 3000 for activating a femtocell access point in accordance with aspects described herein. At act 3010, an activation request and at least one of a provisioned cell global identity, a GPS location, or a unique equipment identifier (EID) are conveyed—GPS location and EID correspond to a femto AP for which activation is pursued. At act 3020, at least one of an indication of recordation of CGI with an E911 service provider, or an assigned UTRA absolute radio frequency channel number (UARFCN) is received. At act 3030, an EID for a femto AP for which the CGI is provisioned is received. At act 3040, an indication of successful activation is received for the femto AP for which the CGI is provisioned. At act 3050, at least one of the indication of successful activation or the indication of recordation with the E911 service provider is relayed. At act 3060, acknowledgement of the at least one of the relayed indication of successful activation or relayed indication of recordation of CGI with the E911 service provider is received.

Figure 31:
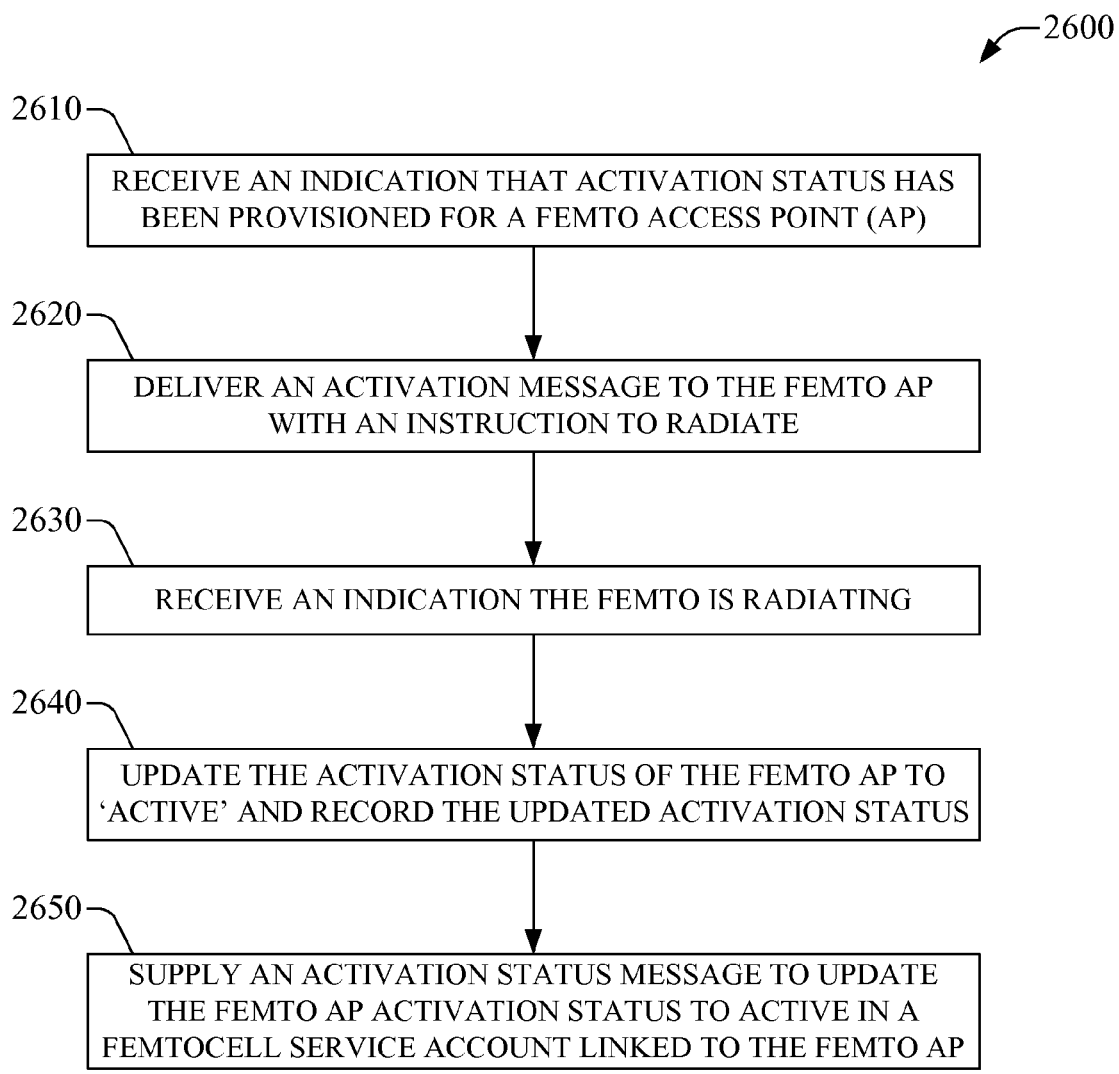
FIG. 31 is a flowchart of an example method for provisioning activation of a femto AP in accordance with aspects of the subject innovation.

FIG. 31 is a flowchart of an example method 3100 for provisioning activation of a femto AP in accordance with aspects of the subject innovation. One or more network components, e.g., gateway node(s) 1242 and server(s) 1234 can effect the subject example method 3100. At act 3110, an indication that Activation Status has been provisioned for a femto AP is received. At act 3120, an activation message to the femto AP with an instruction to radiate is delivered. At act 3130, an indication the femto AP is radiating is received. At act 3140, the Activation Status of the femto AP is updated to 'Active' and the updated Activation Status is recorded. Recordation occurs within a femtocell database in a memory that is part of a femto network platform. At act 3150, an activation status message is supplied to update the femto AP Activation Status to Active in a femtocell account database, within a femtocell service account linked to the femto AP. In an aspect, updated Activation Status is retained within an equipment profile that is part of an account profile associated with the femtocell service account.

Figure 32:
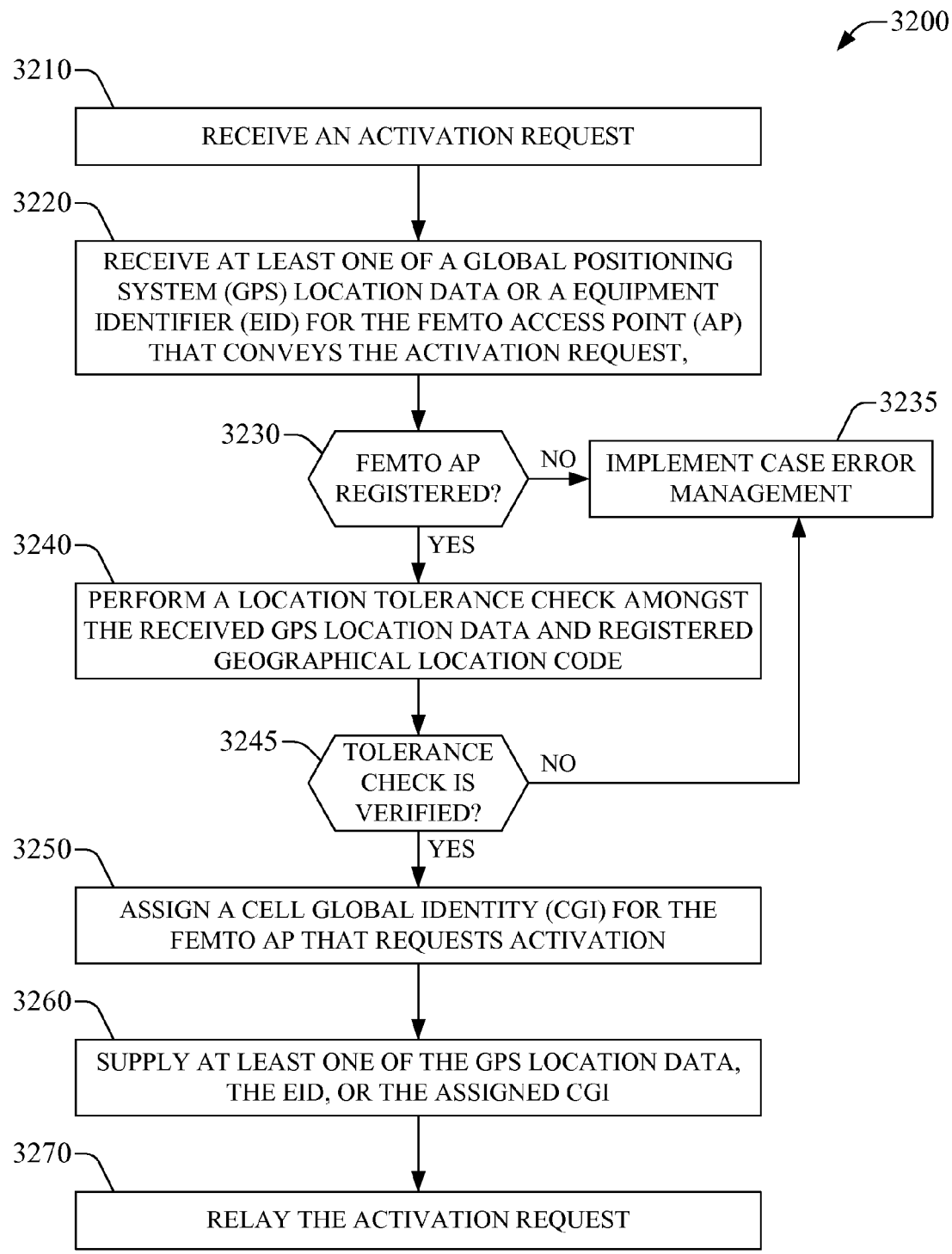
FIG. 32 is a flowchart of an example method for activating a femto AP in accordance with aspects described herein.

FIG. 32 is a flowchart of an example method 3200 for activating a femto AP in accordance with aspects described herein. One or more network components, e.g., gateway node(s) 1242 and server(s) 1234 can effect the subject example method 3200. At act 3210, an activation request is received. At act 3220, at least one of GPS location data or an EID for the femto AP that conveys the action request is received. At act 3220, it is determined if the femto AP is registered with a set of one or more systems or component(s) therein that provide backend services to a communication network that allows operation of the femto AP. When the outcome is negative, case error management is implemented. at act 3225. Conversely, a positive outcome leads to act 3230 in which a location tolerance check is performed amongst the received GPS location data and a registered geographical code such as a geocode. At act 3235, it is probed if the tolerance check is verified. A negative outcome directs flow to act 3225 in which case error management is implemented. Conversely, at act 3240, in the affirmative case, a CGI is assigned for the femto AP that requests activation. At act 3250, at least one of the GPS location data, the EID, or the assigned CGI is supplied. At act 3260, the activation request is relayed.

Figure 33:
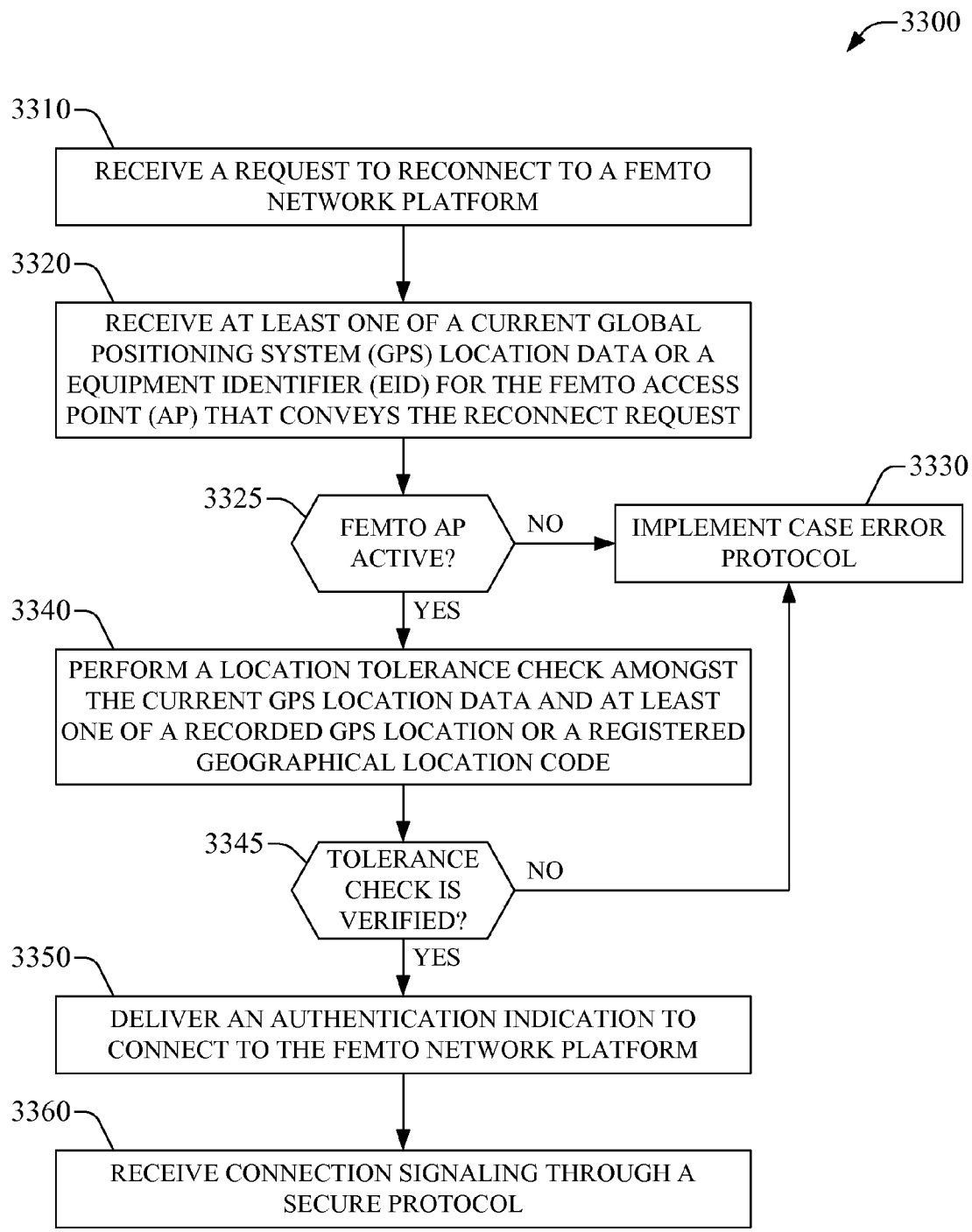
FIG. 33 is a flowchart of an example method for reconnecting a femto AP in accordance with aspects described herein.

FIG. 33 is a flowchart of an example method 3300 for reconnecting a femto AP in accordance with aspects described herein. Reconnection can be pursued when an operating femto AP is turned off and then turned on, or when a femto AP is relocated, e.g., address of the femto AP changes. One or more network components, e.g., gateway node(s) 1242 and server(s) 1234 can effect the subject example method 3300. In an aspect, one or more processors that provide functionality to the one or more network components also can implement the subject example method 3300. At act 3310, a request to reconnect to a femto network platform is received. At act 3320, at least one of current GPS location data or an EID for the femto AP that conveys the reconnect request is received. At act 3330, it is determined if the femto AP associated with the EID is active. Such determination can be implemented via an Activation Status flag within an equipment profiled linked to the EID. When the outcome is negative, case error management is implemented at act 3330. In an aspect, validation failure for a received EID can occur when femtocell equipment is swapped or upgraded. Implementation of case error management can include conducting an activation cycle for the femto AP linked to EID. Conversely, a positive outcome leads to act 3340 in which a location tolerance check is performed amongst the current GPS location data and at least one of a recorded GPS location or a geographical location code, e.g., a geocode, for the femto AP. At act 3345, it is probed if the tolerance check is verified. A negative outcome directs flow to act 3330, in which case error management is implemented. Location tolerance check failure can originate from relocation of customer premises equipment of an activated femto AP. Case error management can include shifting control to backend service component(s), and querying a equipment profile and related femto account profile, and extracting attribute fields that identify the femto AP associated with EID; the extracted attribute fields can include at least one of CTN, specific address, or notification service address such as email address. In addition, case error management control includes communication of error condition(s) to a subscriber. Conversely, in the affirmative case, an authentication indication to connect to the femto network platform is delivered at act 3350. At act 3360, connection signaling is received through a secure protocol such as for example Internet Protocol Security (IPsec).

Figure 34:
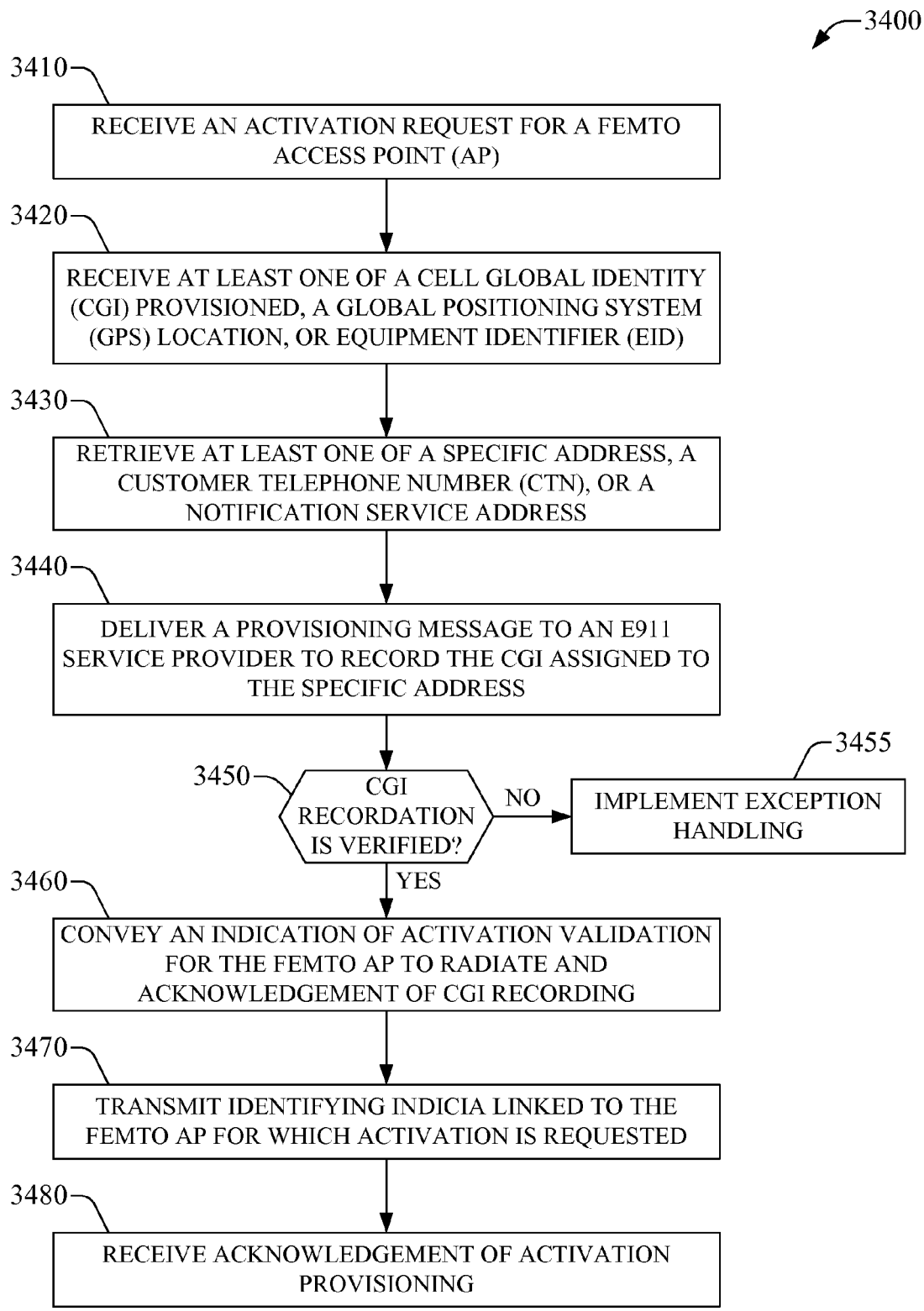
FIG. 34 is a flowchart of an example method for network activation provisioning in accordance with aspects of the subject innovation.

FIG. 34 is a flowchart of an example method 3400 for network activation provisioning in accordance with aspects of the subject innovation. Middleware component 440, or a server that confers functionality thereto, can effect the subject example method 3400. At act 3410, an activation request for a femto AP is received. At act 3420, at least one of a CGI, GPS location data, or EID is received. At act 3430, at least one of a specific address, a customer telephone number (CTN), or a notification service address, e.g., email address, are retrieved. These femtocell service account are extracted from a femtocell account database. At act 3440, a provisioning message is delivered to an E911 service provider to record the CGI assigned to the specific address. At act 3450, it is verified if the CGI has been recorded. In the negative case, exception handling is implemented at act 3455. Conversely, at act 3460, an indication of activation validation for the femto AP to radiate, and acknowledgement of CGI recording is transmitted. At act 3480, acknowledgement of activation provisioning is received.

Figure 35A:
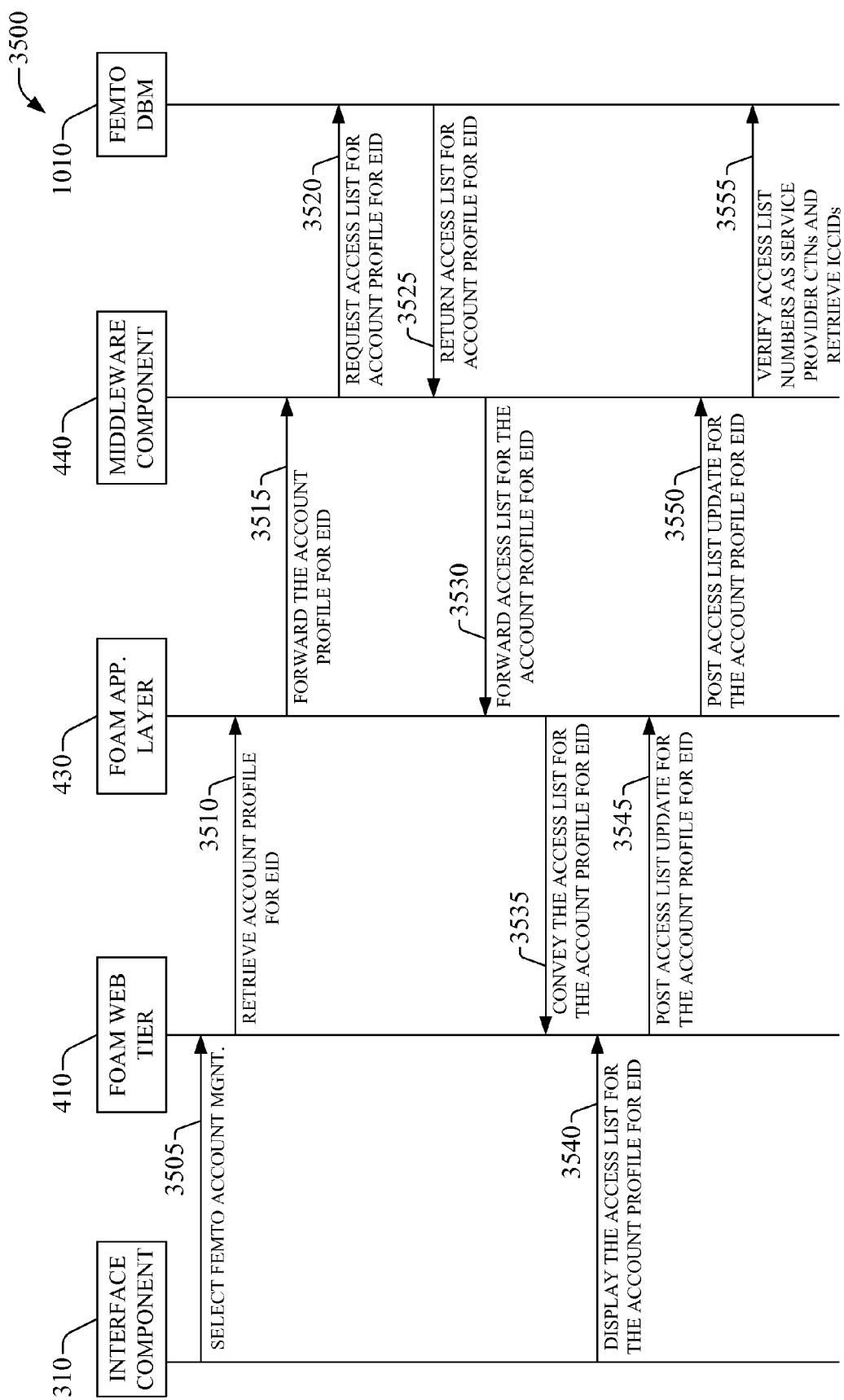
FIGS. 35A-35B illustrate an example interaction diagram or call flow of an example method for managing an access list according to aspects of the subject innovation.
Figure 35B:
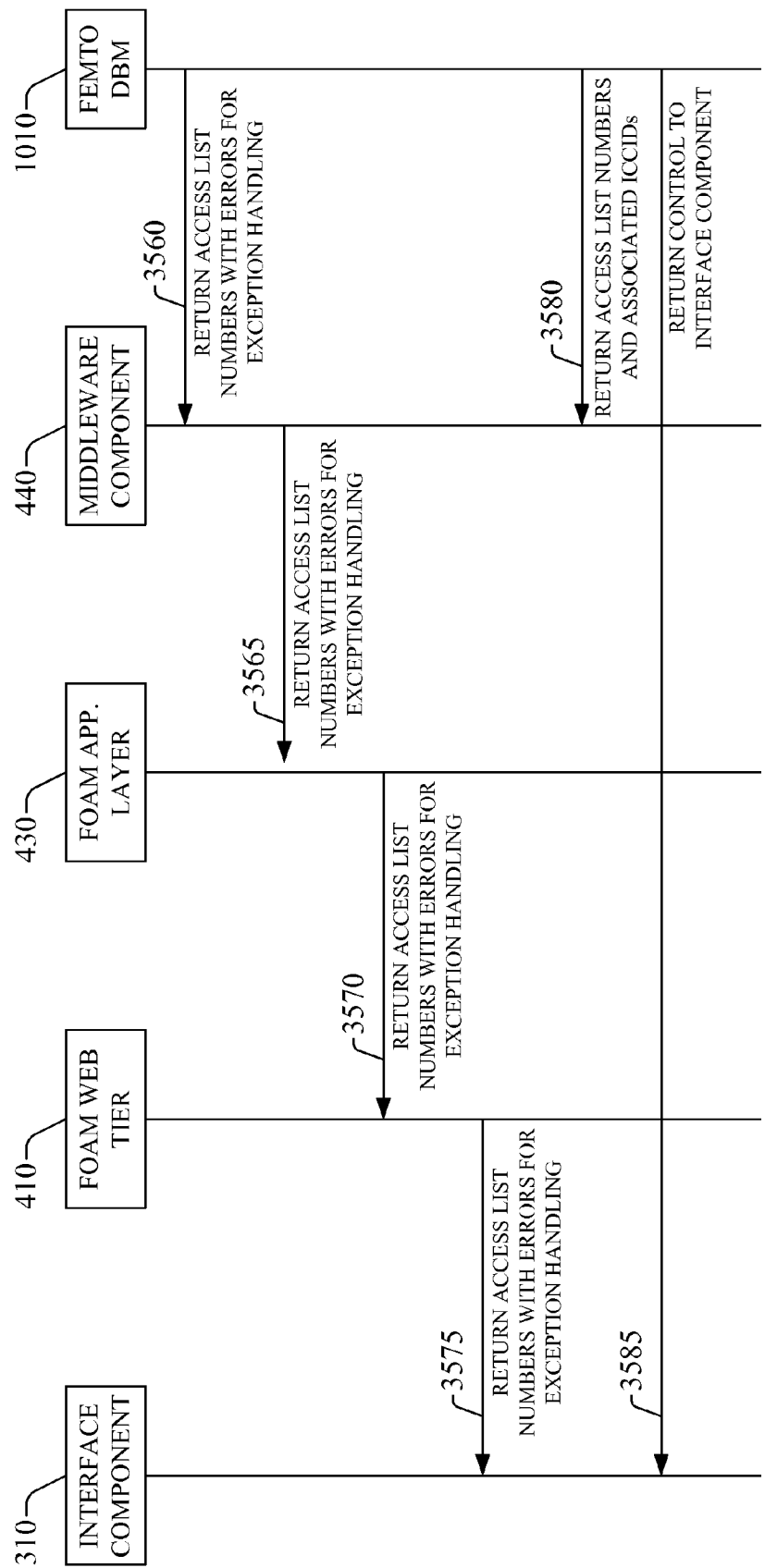

FIGS. 35A-35B illustrate an example interaction diagram or call flow 3500 for managing an access list according to aspects of the subject innovation. At 3505, interface component 310 selects femto account management option within femto web tier 410. Such selection can specify a particular femto AP, e.g., via an EID. At 3510, femto web tier 410 retrieves account profile for an identified EID. FOAM application layer 430 can enable, at least in part, such extraction. At 3515, FOAM application layer 430 forwards or conveys the account profile for the specified EID to middleware component 440, which at 3520 requests an access list associated with the account profile for the specified EID from femto database manager 1010. At 3525, femto database manager 1010 returns to middleware component 440 the requested access list associated with the account profile for EID. Middleware component 440, at act 3530, forwards or delivers the access list associated with the account profile for the EID to FOAM application layer 430, which relays the access list to FOAM web tier 410. At 3540, interface component 310 displays the access list associated with the account profile for EID. At 3545, FOAM web tier 410, through femto management interface 515, e.g., a graphic user interface (GUI) can allow a subscriber to enter a set of one or more mobile device identifiers such MSISDN numbers, IMSI numbers, IMEIs, TMSIs, P-TMSIs, MDN, MIN, a TIAESN, or a multi-bit identification number like MEID codes, or any suitable identifying codes or tokens; and posts an update for the access list associated with the account profile for the specified EID. In addition, FOAM web tier 410 can expose a GUI that allows entering a set of one or more service(s) priorities for each mobile device included in an updated access list. The update is conveyed to FOAM application layer 430, which relays the update to middleware component 440 at 3550. In aspect, received mobile device identifiers in the updated access can be converted to a predetermined format by the FOAM application layer prior to posting, or submitting, the access list update to middleware component 440. Middleware component 440 verifies that mobile device numbers in updated access list are service provider CTNs. Verification can be accomplished by querying femtocell account database 1030 through at least one of femtocell database manager (DBM) 1010. Alternatively or in addition, verification can be accomplished through querying a DBM that administers directory database 480. In addition, middleware component 440 can retrieve ICCIDs associated with the CTNs.

As illustrated in FIG. 35B, in response to verification, femto database manager 1010 can return access list numbers with errors for exception handling. Middleware component 440 can receive and relay such access list numbers to FOAM application layer 430 at 3565. FOAM application layer 430 can receive access list numbers with errors and convey such numbers to FOAM web tier 410, e.g., femto management interface 515 can receive and convey such numbers. In turn, FOAM web tier 410 can return access lists numbers with errors to interface component 310, e.g., a subscriber web browser executed in a computing device, for exception handling such as revision of updated number(s) within access list. Alternatively, for verified number(s) in an updated access list, at 3580, femto database manager 1010 can return the verified number(s) with associated ICCID(s). In addition, at 3585, femto database management 1010 can return control to interface component 310.

Figure 36A:
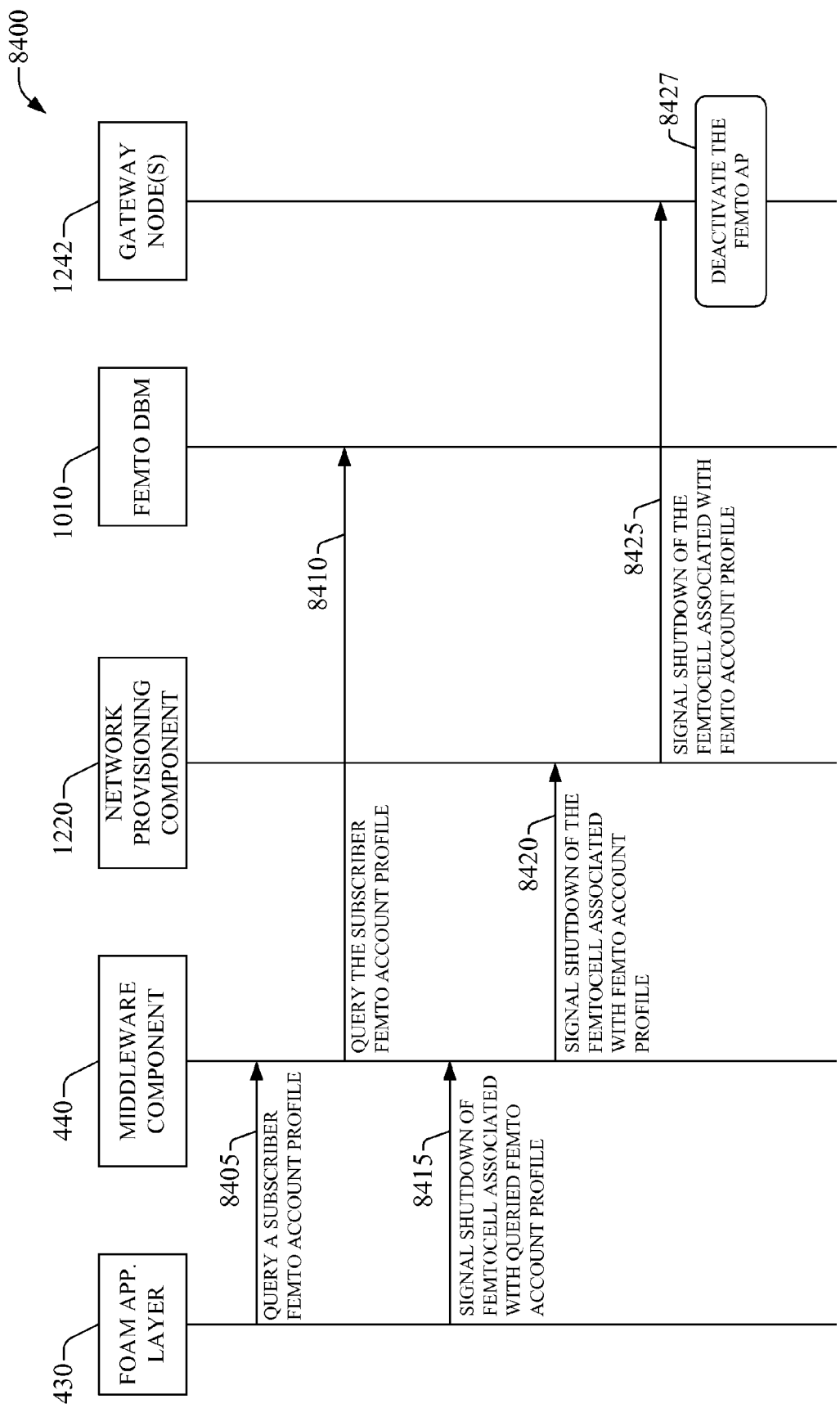
FIGS. 36A-36B present a call flow of an example method for disconnecting a femto AP through a customer care interface in accordance with aspects described herein.
Figure 36B:
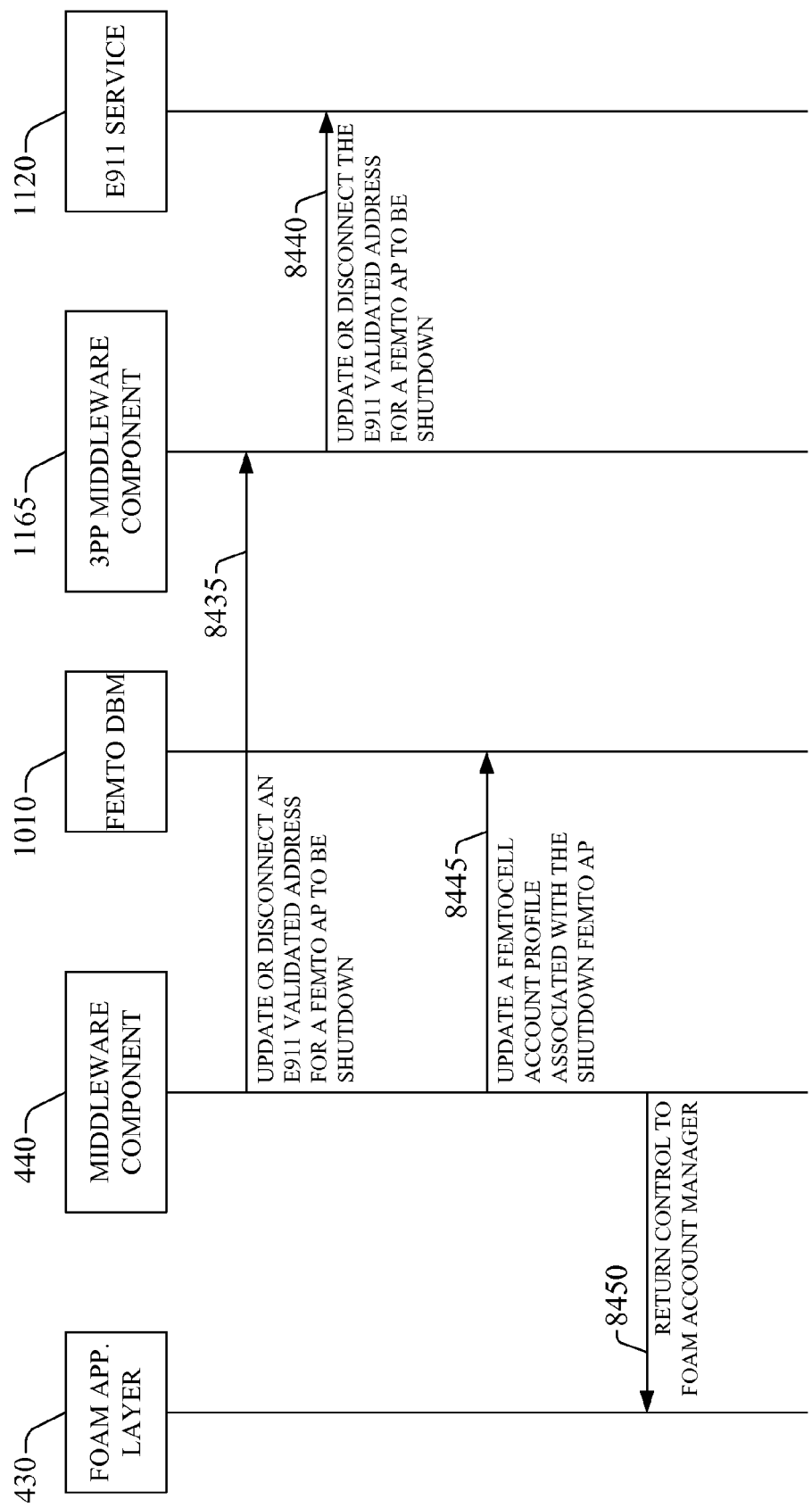

FIGS. 36A-36B present a call flow 3600 of an example method for disconnecting a femto AP through a customer care interface in accordance with aspects described herein. Upon login to a consumer manager component or business manager component, a session can be redirected to FOAM application layer 430, as described supra. At act 3605, FOAM application layer can query a subscriber femto account profile, e.g., 464, see FIG. 10A. T To at least that end, FOAM application layer 430 supplies the query to middleware component 440, which relays the query to femto DBM 1010. A response (not shown) to the query can be supplied to FOAM application layer 430 through middleware component 440; a response conveys a specific femtocell account profile in accordance with the executed query. At 3615, FOAM application layer 430 signals shutdown of femtocell access point associated with the queried femtocell account profile. At 3620, middleware component 440 relays the signaling to shutdown the femtocell AP associated with the queried femtocell account profile to network provisioning component 1220. At 3625, the signal to shutdown the femto AP is conveyed to gateway node(s) 1242, which logically deactivates the signaled femto AP at act 3627.

With respect to FIG. 36B, at 3635, middleware component 440 updates or disconnects an E911 validated address for a femto AP to be shutdown. To accomplish update or disconnection, middleware component delivers an indication to update or disconnect the femto AP to 3PP middleware component 1165, which relays the indication to E911 service 1120. Upon receiving an acknowledgement signal (not shown), middleware component 440 updates the queried femtocell account profile associated with the shutdown femto AP 3645; records are updated in femtocell account database administered through femto DBM 1010. The updated femtocell profile can be logically deleted within femto DBM 1010. At 3650, middleware component 440 returns control to FOAM account manager.

Figure 37A:
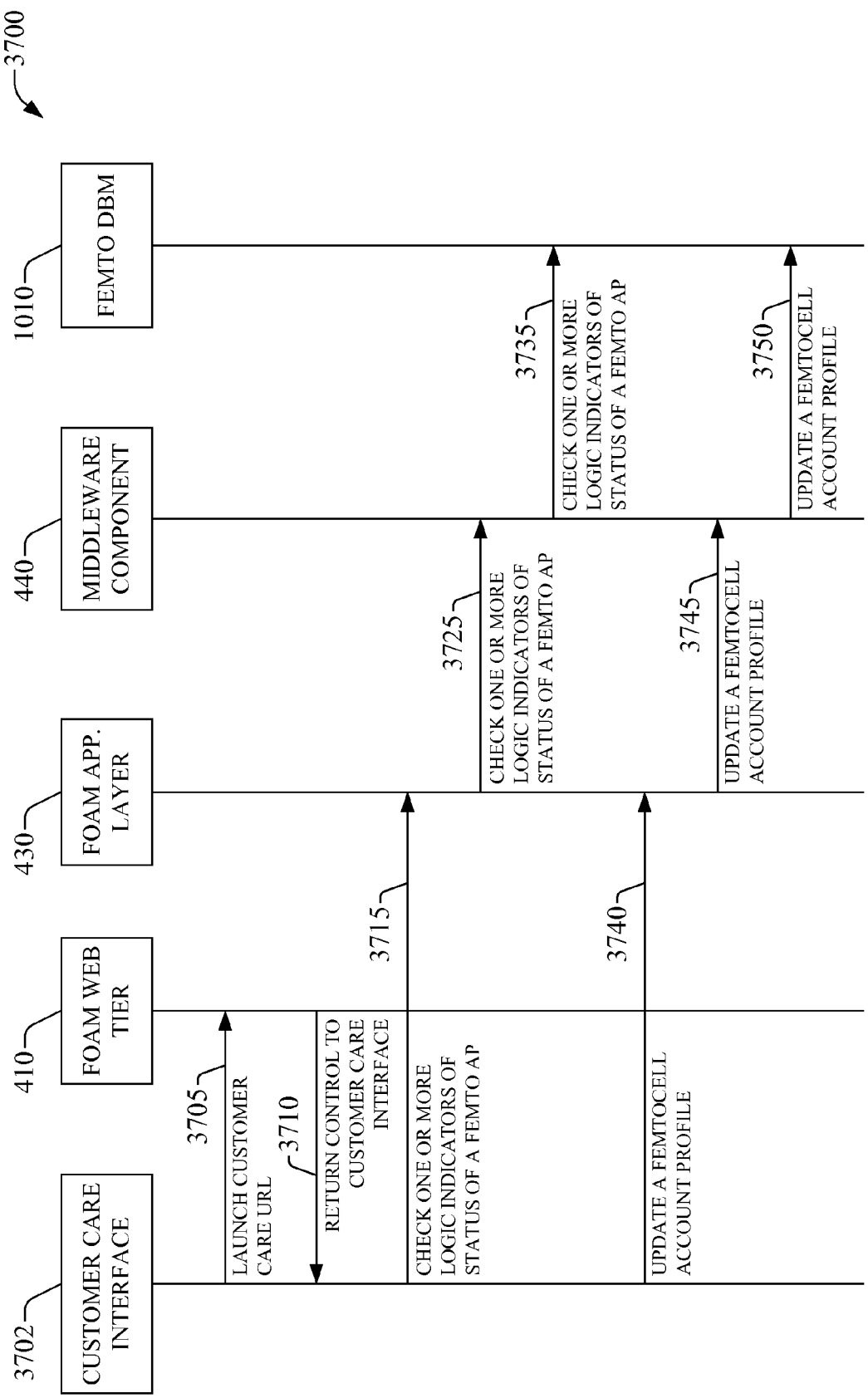
FIGS. 37A-37B present a call flow of an example method for implementing maintaining a femtocell access point through a customer care interface in accordance with aspects described herein.
Figure 37B:
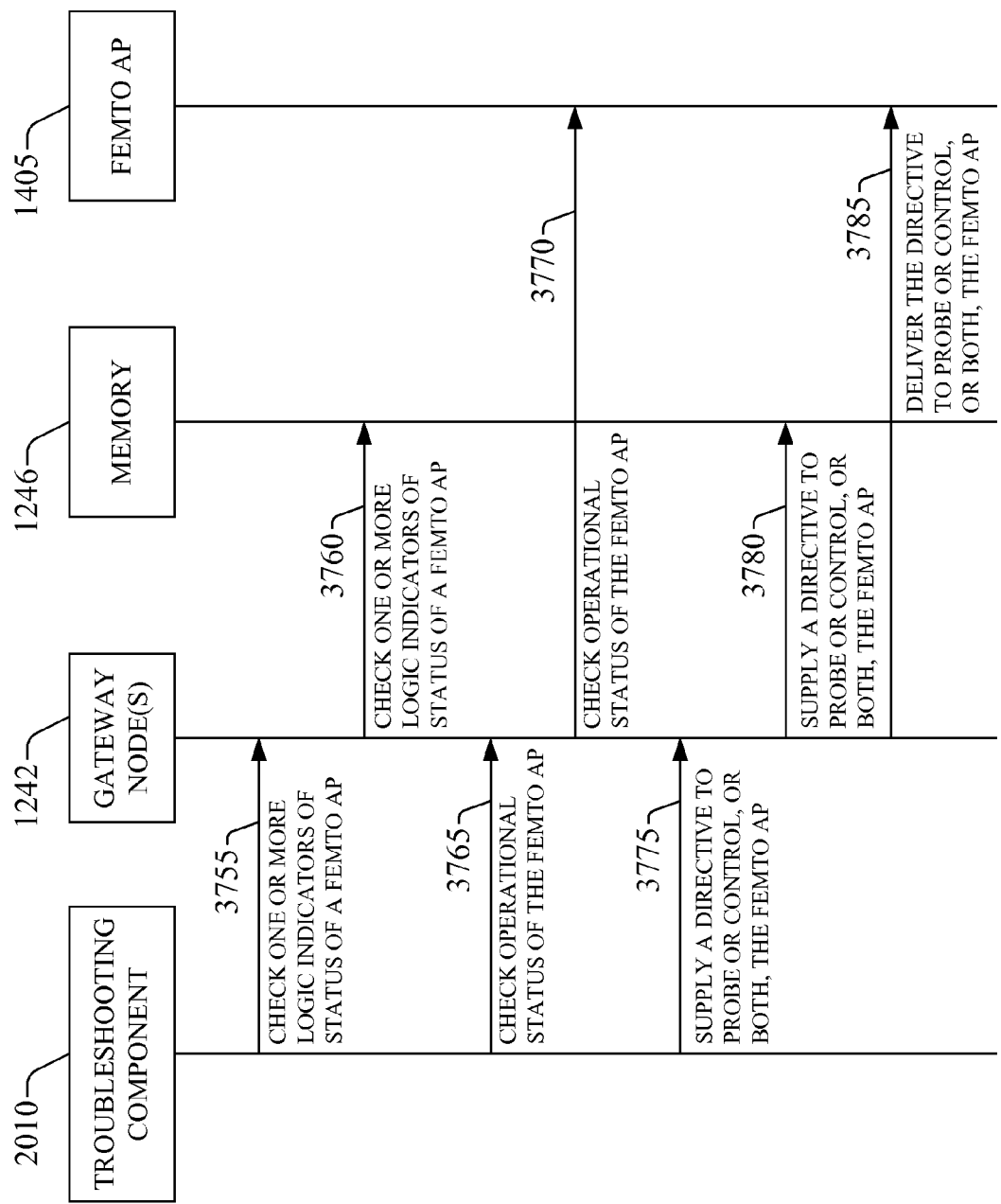

FIGS. 37A-37B present a call flow 3700 of an example method for implementing maintaining a femtocell access point through a customer care interface in accordance with aspects described herein. At 3705, customer care interface 3702 launches a customer care URL, which can be available to customer care representatives upon login to account management service 220. In an aspect, customer care representatives can login to a dedicated business account manager 428. At act 3705, FOAM web tier 410 returns control to customer care interface 440, and exposes a set of interfaces in FOAM application layer 430 to manipulate aspects of femtocell service account associated with one or more femto APs. At act 3715, customer care interface checks one or more logic indicators of status of the one or more femto APs. At act 3725, FOAM application layer 430 checks the one or more logic indicators of status of a femto AP. In an aspect, the checking act is enabled, at least in part, by middleware component 440. At act 3730, middleware component 440 checks the one or more logic indicators of status of the one or more femto APs. A response (not shown), is received at middleware component 440 and relayed to FOAM application layer 430 and supplied to customer care interface 3702. Collected status information for the one or more femto APs can be conveyed to a subscriber via customer care interface 3702.

In a disparate transaction, customer care interface 3702 can update a femtocell account profile at act 3740. Update can include changes in address or an indication of equipment update, which can be selected to occur with preservation of existing access list(s), e.g., white list(s), or other parameters that characterize femtocell equipment, such as Nickname. At act 3745, FOAM application layer relays the update directive(s) to middleware component 440, which implements the directive to effect the update at act 3750. An indication (not shown) of successful or faulty update can be supplied to customer care interface 3702. Femto database manager (DBM) 1010 can supply such indication response. In an aspect, the indication can be provided as a USDD message, a SMS communication, email message, or the like. In addition, the indication can include a log file that records the update and assigns a time-stamp thereto.

With respect to FIG. 37B, at act 3755, troubleshooting component 2010 conveys an indication to check one or more logic indicators of a femto AP to gateway node(s) 1242. At act 3760, gateway node(s) check the one or more logic indicators of status of a femto AP in memory 1246. A response (not shown) is relayed to troubleshooting component 2010. At act 3765, troubleshooting component 2010 delivers an indication to check operational status of the femto AP to gateway node(s) 1242. At 3770, gateway node(s) 1242 check operational status of the femto AP directly probing the femto AP, e.g., femto AP 1405. A response (not shown) is relayed to troubleshooting component 2010. At act 3775, troubleshooting component 2010 supplies a directive to the femto AP, via a gateway node, e.g., 1242, or other femto network component(s), for at least one of probing or controlling operation thereof. Gateway node(s) 1242 received the directive for at least one of probing or controlling the femto AP, and relays it to memory 1246 at 3780. A database manager (not shown) within memory 1246 can determine whether the directive is a valid directive or the originator of the directive, e.g., an owner of a troubleshooting session effected by troubleshooting component 2010 has access privileges to control femto AP 1405. In an aspect, such integrity act can be bypassed for a specific owner the establishes a troubleshooting session as administrator. The database manager can provide a response (not shown) to gateway node(s), which at 3785 can deliver the directive to probe or control the femto AP, e.g., femto AP 1405.

Figure 38A:
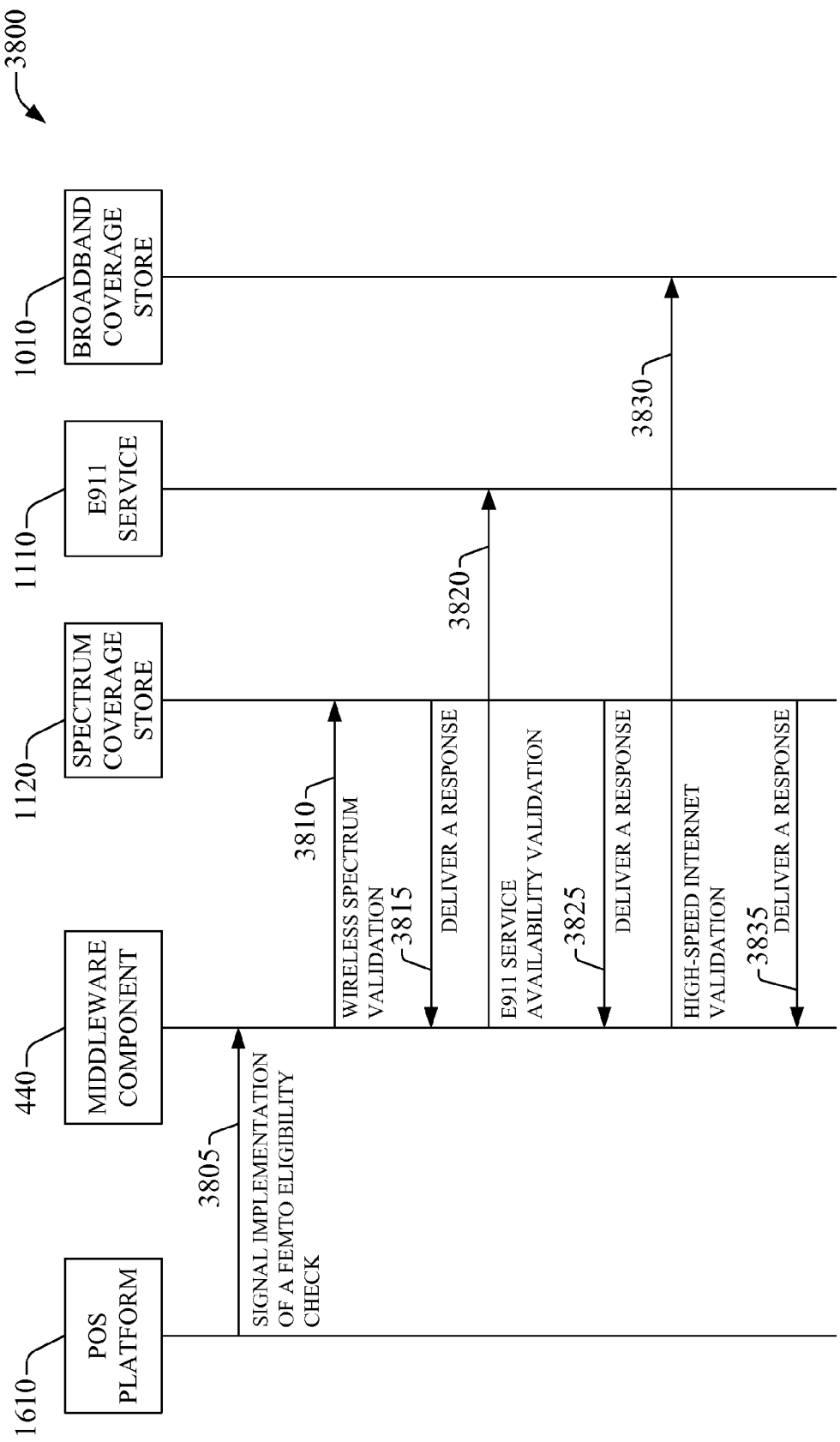
FIGS. 38A-38B illustrate an example call flow of an example method for conducting eligibility checks associated with purchase of femtocell equipment in accordance with aspects described herein.
Figure 38B:
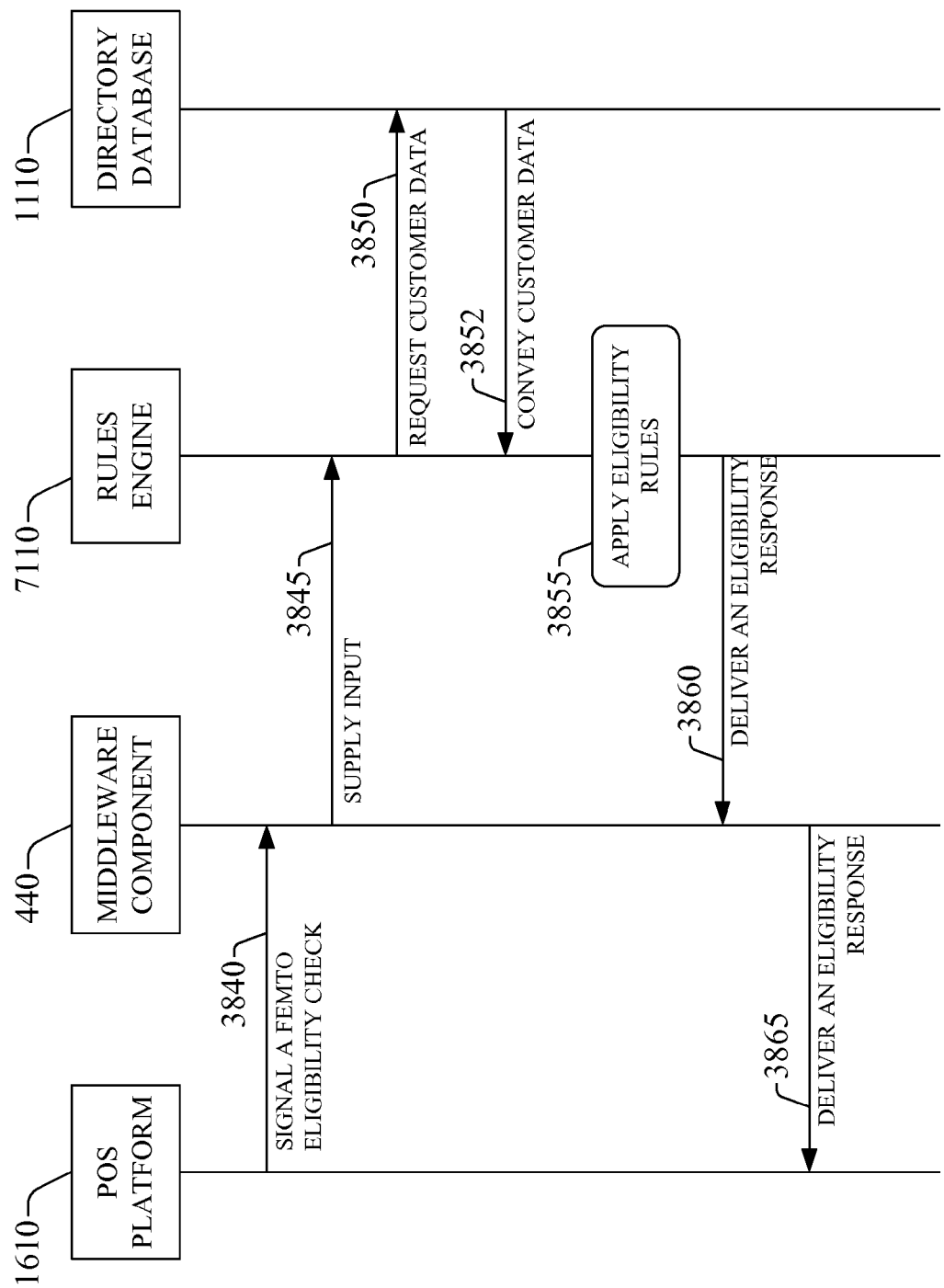

FIGS. 38A-38B illustrate an example call flow 3800 of an example method for conducting eligibility checks associated with purchase of femtocell equipment in accordance with aspects described herein. At 3805, POS signals implementation of an eligibility check. At 3810, middleware component 440 receives such signaling and effects a wireless spectrum validation check through at least in part spectrum coverage store 1120. The wireless spectrum validation can be based at least in part on an address for prospective operation of femtocell equipment. At 3815, spectrum coverage store 1120 returns a response. At 3820, middleware component 440 effects validation of E911 service availability. To at least that end, middleware component 440 delivers an availability validation request to E911 service 1110, which returns a response at act 3825. At 3830, middleware component 440 delivers a validation request to confirm high-speed internet service availability for the address of prospective operation of femtocell equipment. At 3835, broadband coverage store 1650 conveys a response to the validation check. With respect to FIG. 38B, to provide a response for femtocell service eligibility, POS platform 1610 signals a femtocell eligibility check at 3840. Middleware receives the signaling and, at act 1120, supplies input to rules engine 1710, which extracts customer data from directory database 1110 by delivering a request for data and receiving data in response to the request: At act 3850, a request for customer data delivered and at act 3852 a response thereto is received. At act 3855, rules engine applies eligibility rules, and delivers a femtocell eligibility response at 3860. At 3865, middleware component 440 relays the eligibility response to POS platform 1610.

Figure 39A:
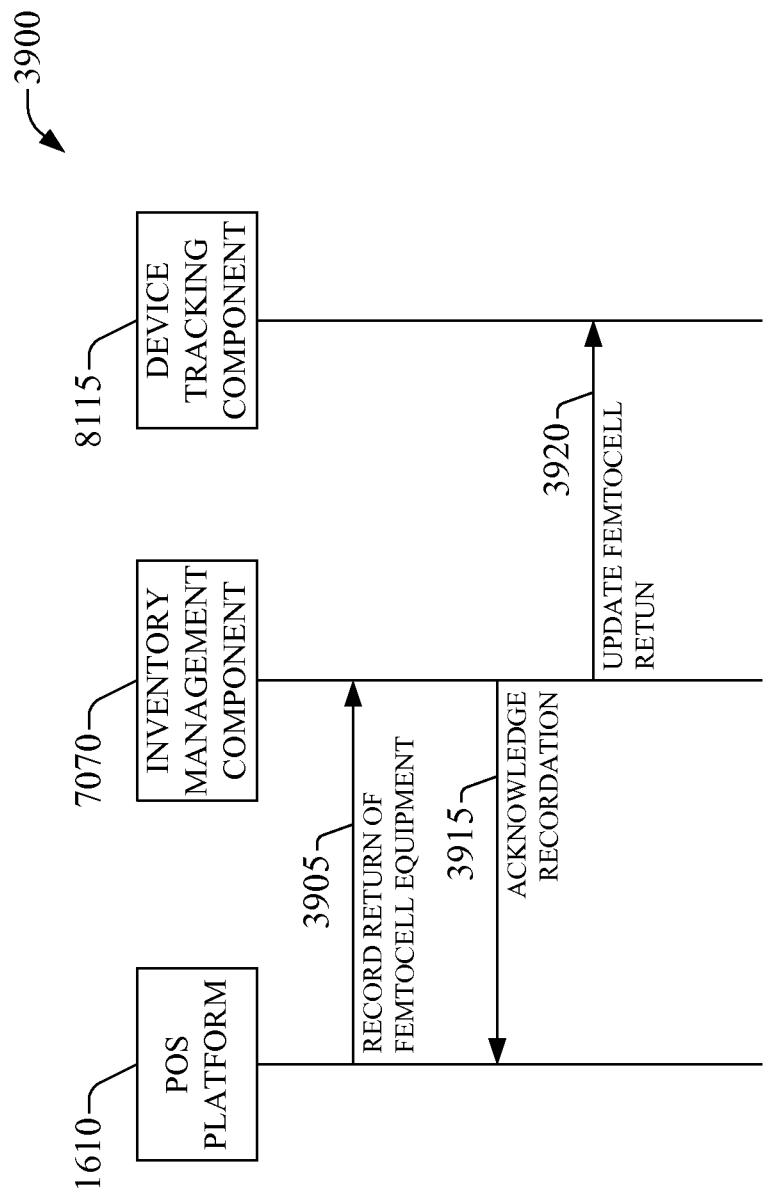
FIGS. 39A-39C illustrates an example call flow of an example method for femtocell returns in accordance with aspects of the subject innovation.
Figure 39B:
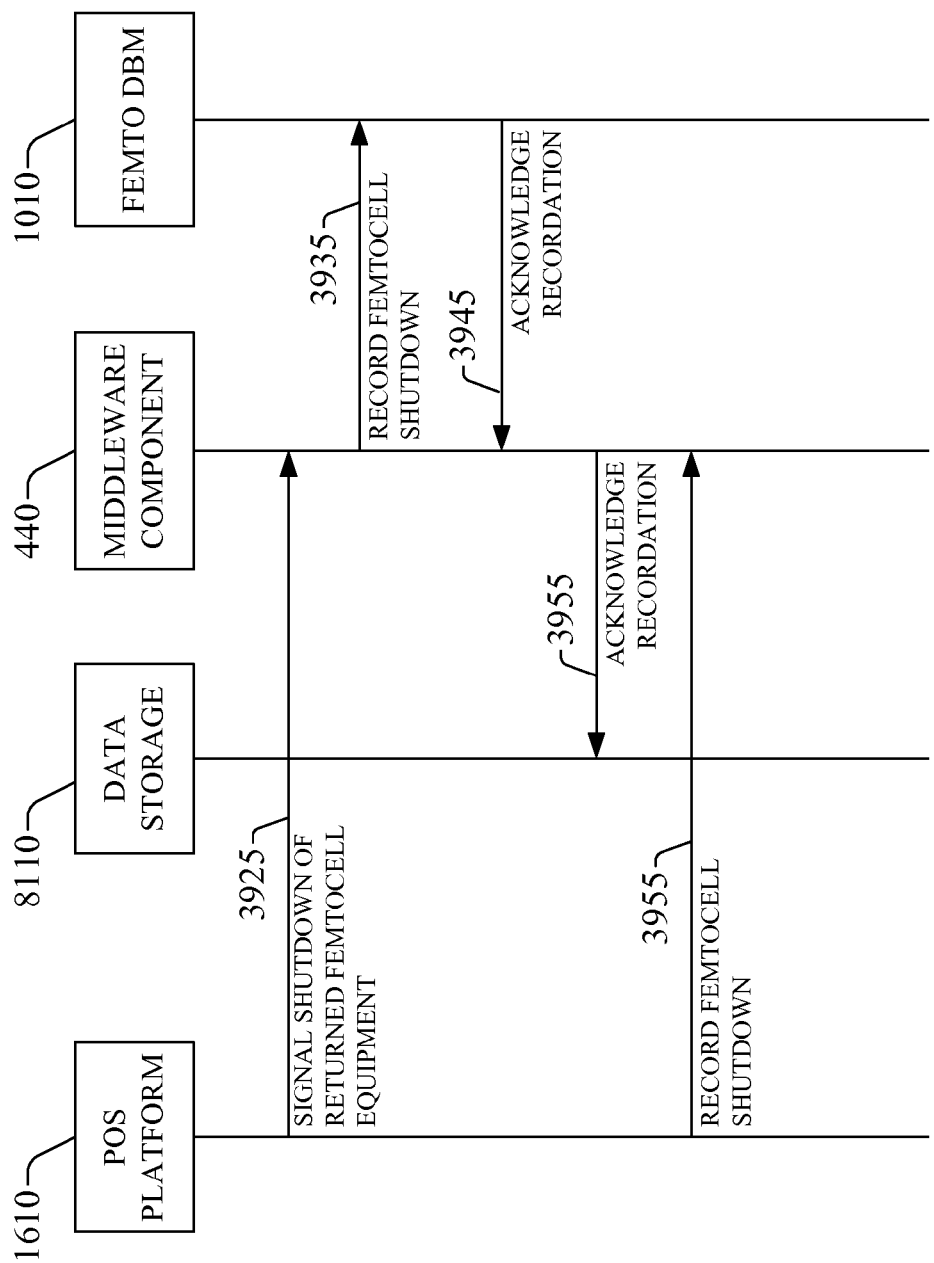
Figure 39C:
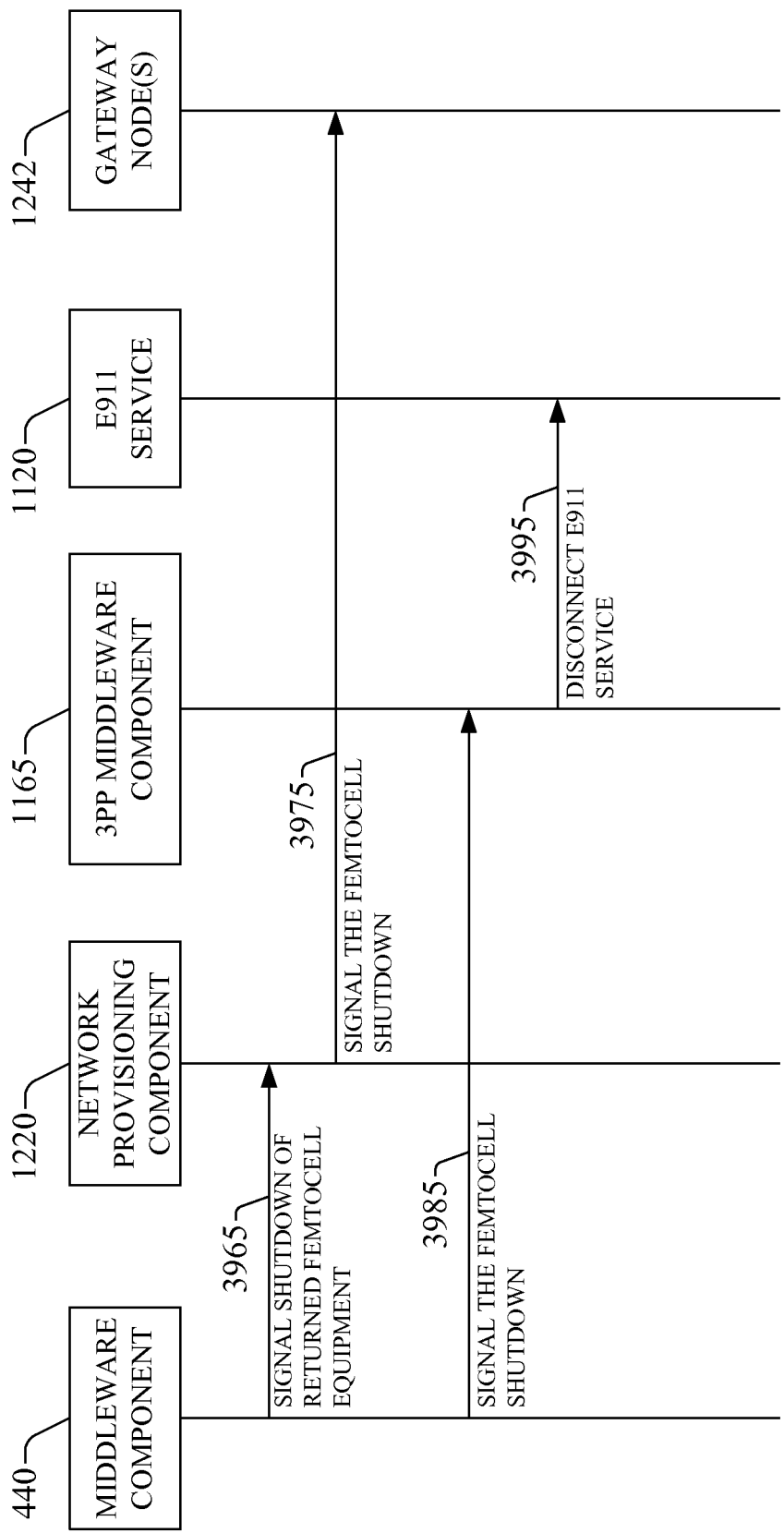

FIGS. 39A-39C illustrates an example call flow 3900 of an example method for femtocell returns in accordance with aspects of the subject innovation. With respect to FIG. 39A, at 3905, POS platform 1610 records return of femtocell equipment, e.g., a femto AP, with inventory management component 1670. At 3915, inventory management acknowledges recordation. Alternatively, inventory management component 1670 can deliver an error message in response to an improperly received recordation of femtocell equipment return, e.g., an EID for a returned femto AP is invalid. At 3920, inventory management component 1670 updates a record of the femtocell equipment return with a device tracking component 1815. In connection with FIG. 39B, in response to femtocell equipment return, at act 3925, POS platform 1610 signals shutdown of the femtocell equipment to middleware component 440. In an aspect, such signaling is directed to update status flags in an equipment profile associated with the returned equipment. At 3935, middleware component 440 conveys an indication to record femtocell shutdown within a femtocell account profile linked to the returned femto AP. The indication is received by femto database manager (DBM) 1010, which acknowledges recordation at 3945. Alternative, femto DBM 1010 can deliver an error signal when recordation fails; for instance, an equipment profile linked to the returned equipment is unavailable. Middleware component 440 relays the recordation acknowledgement to data storage 1810, e.g., a data warehouse within inventory management component 1670. At 3955, POS platform 1610 records femtocell equipment shutdown within data storage 1120.

With respect to FIG. 39C, the subject example method includes disconnection of E911 service as a result of femtocell equipment return. At 3965, middleware component 440 can relay a received indication to shutdown femtocell equipment. Such indication is conveyed to network provisioning component 1120, which can transmit the indication to shutdown the returned femtocell equipment, identified via a unique EID, to gateway node(s) 1242. Based upon a registered EID, gateway node(s) can update status of returned femtocell equipment within a dedicated database in memory 1246. In addition, in a disparate transaction, at act 3985, middleware component 440 can signal shutdown of the returned equipment to 3PP middleware component 1165, which can deliver a directive to E911 service 1120 to disconnect E911 provisioned service associated with a recorded address and CGI for the returned equipment. It should be appreciated that other services also can be updated in response to femtocell equipment return. For instance, a security analysis and tracking service, e.g., provided via security platform 1440 can be terminated. (See FIG. 22B.)

Figure 40:
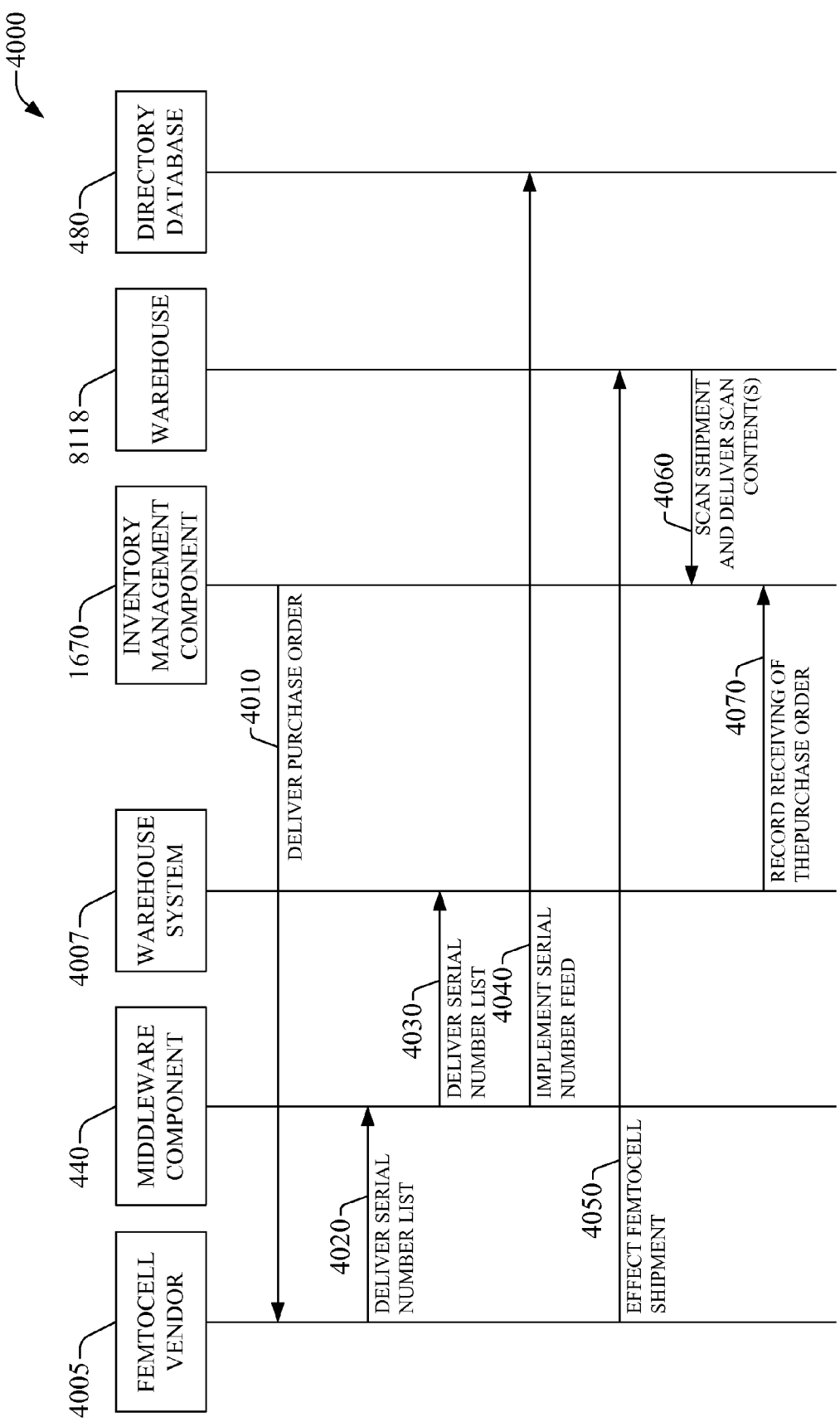
FIG. 40 is an example call-flow that illustrates an example method for femtocell inventory management in accordance with aspects of the subject innovation.

FIG. 40 is an example call flow 4000 that illustrates an example method for femtocell inventory management in accordance with aspects of the subject innovation. At 4010, an inventory management component 1670 delivers a purchase order for femtocell equipment, e.g., femto APs or parts, to a femtocell vendor. At 4020, femtocell vendor delivers a serial number list, such as an allotment serial number (ASN), to middleware component 440, which at 4030 delivers or relays the serial number list to warehouse system 4007. Warehouse system 4007 can be part of an operations control system for warehouse 1820 administered by a service provider that supplies the purchase order in act 4010. At 4040, middleware component 440 can implement a serial number feed, which can supply one or more serial numbers to directory database 480 as part of purchase(s) of femtocell equipment by one or more mobility subscribers. At 4050, femtocell vendor ships femtocell equipment identified in the purchase order supplied at 4010. Shipment is effected to warehouse 1820, which scan the received equipment and transmits content(s) of the scan to inventory management component 1670. At act 4070, warehouse system 4007 records receiving of the purchase order. It should be appreciated that, in additional or alternative example method(s), transactions or acts 4050 through 4060 can occur prior to act 4040.

Figure 41:
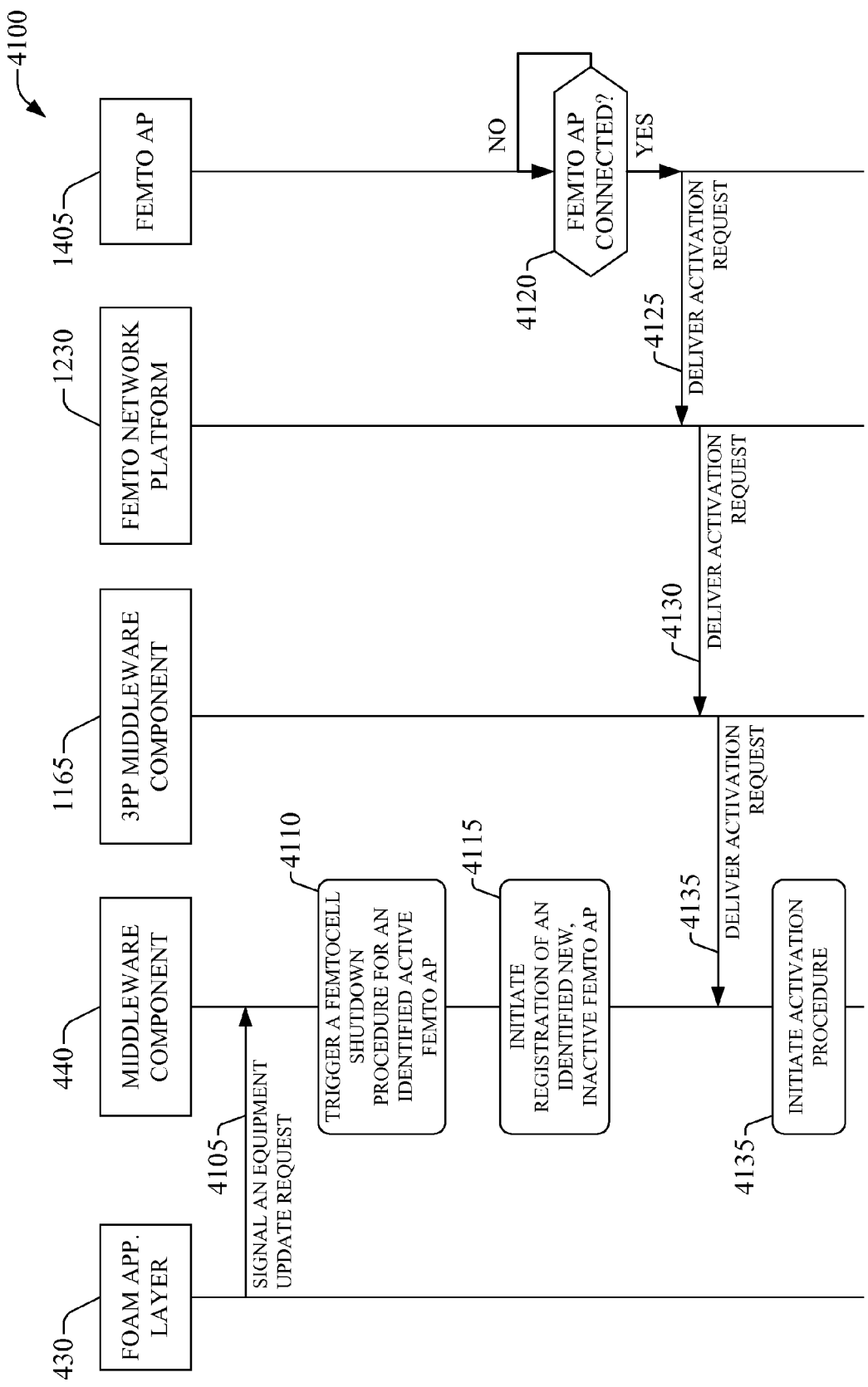
FIG. 41 is an example call flow of an example method for updating or swapping, or updating, femtocell equipment.

FIG. 41 is an example call flow of an example method 4100 for updating or swapping, or updating, femtocell equipment. At 4105 FOAM application layer 430 signal an equipment update request. In an aspect, FOAM application layer 430 received the request to update femtocell equipment from FOAM web tier 410 subsequent to successful secured login of a subscriber. As described above, login can occur through a consumer manager 428 or a business manager 428 based at least in part on credentials of the subscriber (see FIG. 4). FOAM application layer 430 supplies identification information, e.g., EID, for an active femto AP that is requested to be updated, and a new, inactive femto AP. In addition, the equipment request can convey an indication that at least one of address, access list(s), or other femtocell profile attributes are to be retained as part of the femto update. Such identification and information can be supplied through FOAM web tier 410. At 4110, middleware component triggers a femtocell shutdown procedure, as describer herein, for the identified active femto AP. Shutdown of the identified femto AP, e.g., old AP, is enacted as described in the subject innovation, which can include at least one of disconnection from service(s) provided to the femto AP; expiration of femtocell attributes retained in at least one of femtocell account database 460 or directory database 480; disconnection of security tracking services and associated recordation of old femtocell attributes linked to the femto AP that is update.

At 4115, middleware component 440 initiates registration of the identified new, inactive femto AP. Upon successful registration, a subscriber can be notified, e.g., via messaging platform 1420, as described herein. In an aspect, validation checks such as wireless coverage validation and E911 service availability can be bypassed when it is indicated that the address of the new femto AP is the same address as the old femto AP. Such an indication can be received with the request supplied at 4105. When new femto AP is connected, which can occur at substantially any time subsequent to successful registration, middleware component receives an activation request at 4135; the activation request can be received from 3PP middleware component 1165 at act 4130, which receives the request from femto network platform 1230, which in turn received the activation request at 4125. Activation proceeds as described in the subject innovation.

Figure 42:
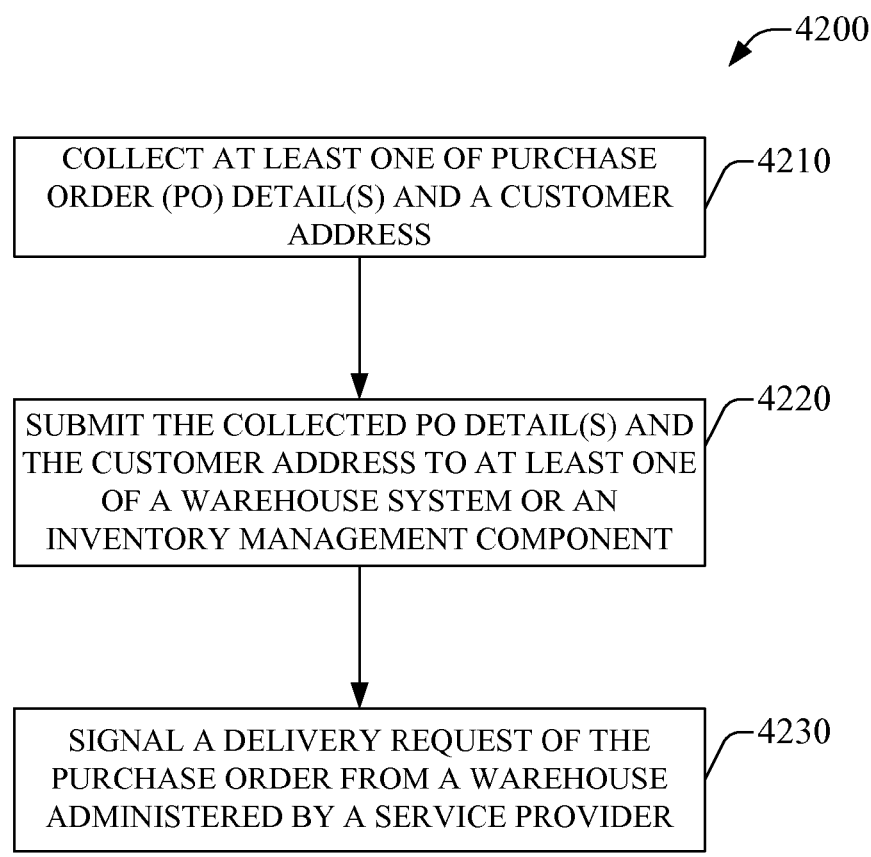
FIG. 42 is an example flowchart of a direct fulfillment method in accordance with aspects described herein.

FIG. 42 is an example flowchart of a direct fulfillment method in accordance with aspects described herein. At act 4210, at least one purchase order (PO) detail(s) and a customer address is collected. Such collection can be effected through a FOAM application layer via a webpage supplied through FOAM web tier. At act 4220, the at least one of the collected details and the customer address are submitted to a warehouse system or an inventor management component. At act 4230, a request is signaled for delivery of the purchase order from a warehouse administered by a service provider.

Figure 43:
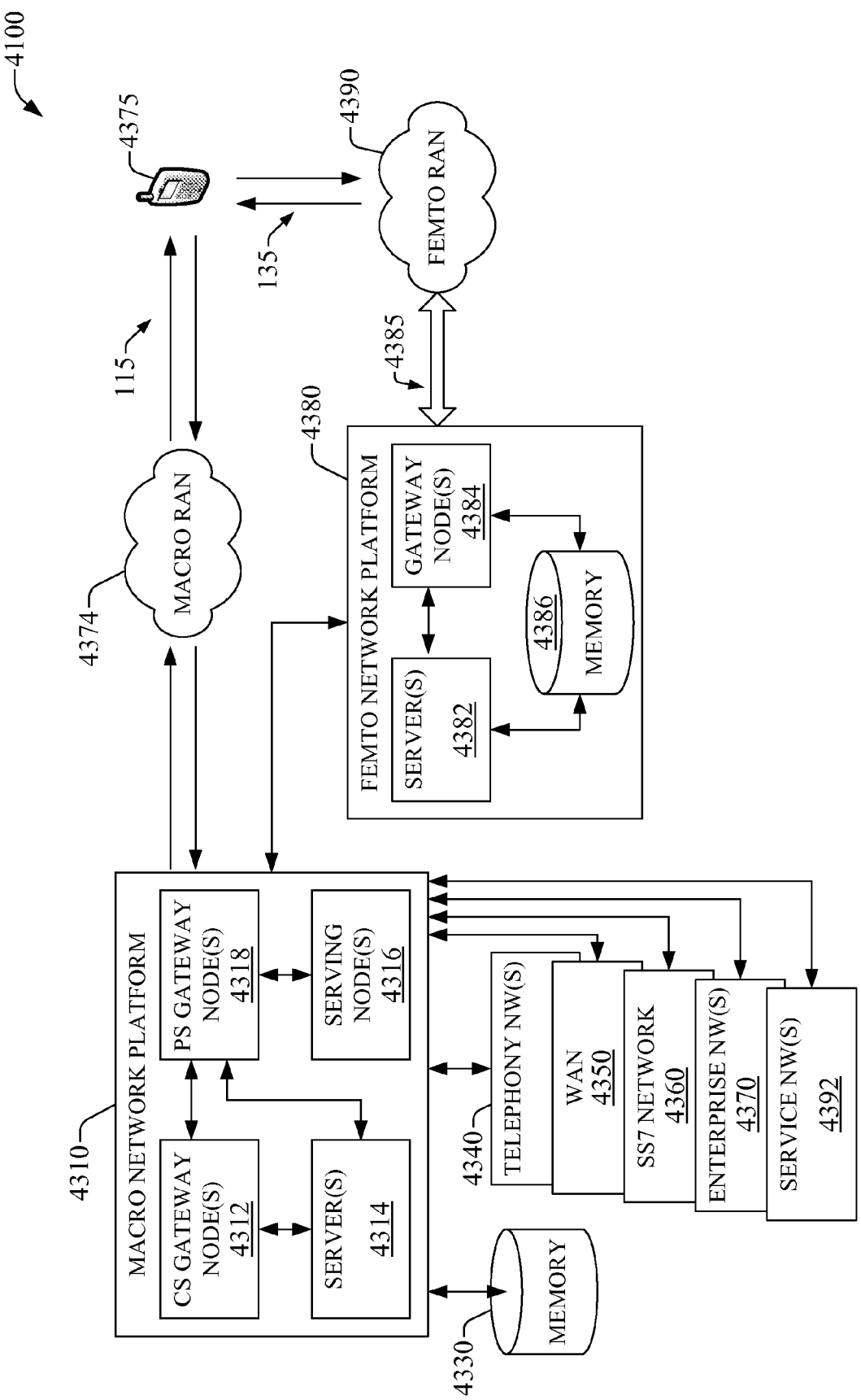
FIG. 43 is a block diagram of an example wireless network environment that includes macro and femto network platforms and can implement and exploit aspects or features described herein.

To provide further context for various aspects of the subject specification, FIG. 43 illustrates an example wireless network environment 4300 that includes femto and macro network platforms and that can enable or exploit aspects or features of the subject innovation described herein, and utilize femto APs that exploit aspects of the subject innovation in accordance with various aspects described herein.

With respect to FIG. 43, wireless communication environment 4300 includes two wireless network platforms: (i) A macro network platform 4310 which serves, or facilitates communication with user equipment 4375 (e.g., mobile 120$_A$) via a macro radio access network (RAN) 4374. It should be appreciated that in cellular wireless technologies (e.g., 3GPP UMTS, HSPA, 3GPP LTE, 3GPP UMTS, 3GPP2 UMB), macro network platform 4310 is embodied in a Core Network. (ii) A femto network platform 4380, which can provide communication with UE 4375 through a femto RAN 4390, which is linked to the femto network platform 4380 via backhaul pipe(s) 4385 (e.g., backhaul link(s) 153). It should be appreciated that macro network platform 4310 typically hands off UE 4375 to femto network platform 4310 once UE 4375 attaches, e.g., through macro-to-femto handover as described herein, to femto RAN 4390, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 4374 can comprise various coverage cells like cells 105, while femto RAN 4390 can comprise multiple femtocell access points such as femto AP 130. Deployment density in femto RAN 4390 is substantially higher than in macro RAN 4374.

Generally, both macro and femto network platforms 4310 and 4380 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 4310 includes CS gateway node(s) 4312 which can interface CS traffic received from legacy networks like telephony network(s) 4340 (e.g., public switched telephone network (PSTN), or public land mobile network (PLMN)) or a signaling system No. 7 (SS7) network 4360. Circuit switched gateway 4312 can authorize and authenticate traffic (e.g., voice) arising from such networks. Additionally, CS gateway 4312 can access mobility, or roaming, data generated through SS7 network 4360; for instance, mobility data stored in a VLR, which can reside in memory 4330. Moreover, CS gateway node(s) 4312 interfaces CS-based traffic and signaling and gateway node(s) 4318. As an example, in a 3GPP UMTS network, PS gateway node(s) 4318 can be embodied in gateway GPRS support node(s) (GGSN).

In addition to receiving and processing CS-switched traffic and signaling, PS gateway node(s) 4318 can authorize and authenticate PS-based data sessions with served (e.g., through macro RAN) wireless devices. Data sessions can include traffic exchange with networks external to the macro network platform 4310, like wide area network(s) (WANs) 4350, enterprise networks (NW(s)) 4370 (e.g., enhanced 911), or service NW(s) 4392 like IP multimedia subsystem; it should be appreciated that local area network(s) (LANs), which may be a part of enterprise NW(s), can also be interfaced with macro network platform 4310 through PS gateway node(s) 4318. Packet-switched gateway node(s) 4318 generates packet data contexts when a data session is established. To that end, in an aspect, PS gateway node(s) 4318 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 4314. It is to be noted that in 3GPP UMTS network(s), PS gateway node(s) 4318 (e.g., GGSN) and tunnel interface (e.g., TTG) comprise a packet data gateway (PDG).

Macro network platform 4310 also includes serving node(s) 4316 that convey the various packetized flows of information, or data streams, received through PS gateway node(s) 4318. As an example, in a 3GPP UMTS network, serving node(s) can be embodied in serving GPRS support node(s) (SGSN).

As indicated above, server(s) 4314 in macro network platform 4310 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 4310. Data streams can be conveyed to PS gateway node(s) 4318 for authorization/authentication and initiation of a data session, and to serving node(s) 4316 for communication thereafter. Server(s) 4314 also can effect security (e.g., implement one or more firewalls) of macro network platform 4310 to ensure network's operation and data integrity in addition to authorization and authentication procedures that CS gateway node(s) 4312 and PS gateway node(s) 4318 can enact. Moreover, server(s) 4314 can provision services from external network(s), e.g., WAN 4350, or Global Positioning System (GPS) or GNSS network(s), which can be a part of enterprise NW(s) 4380. It is to be noted that server(s) 4314 can include at least one of a memory, one or more processors configured to confer at least in part the functionality of macro network platform 4310, and a bus which can include a memory bus, a system bus, an address bus or one or more reference link(s). To that end, the one or more processor can execute code instructions (not shown) stored in memory 4330, for example.

In example wireless environment 4300, memory 4330 stores information related to operation of macro network platform 4310. Information can include business data associated with subscribers; market plans and strategies, e.g., promotional campaigns, business partnerships; operational data for mobile devices served through macro network platform; service and privacy policies; end-user service logs for law enforcement; and so forth. Memory 4330 can also store information from at least one of telephony network(s) (NW(s)) 4340, WAN 4350, SS7 network 4360, enterprise NW(s) 4370, or service NW(s) 4392.

Regarding femto network platform 4380, it includes a femto gateway node(s) 4384, which have substantially the same functionality as PS gateway node(s) 4318. Additionally, femto gateway node(s) 4384 can also include substantially all functionality of serving node(s) 4316. Disparate gateway node(s) 4384 can control or operate disparate sets of deployed femto APs, which can be a part of femto RAN 4390. In an aspect of the subject innovation, femto gateway node(s) 4384 can operate in substantially the same manner as gateway node(s) 242.

Memory 4386 can retain additional information relevant to operation of the various components of femto network platform 4380. For example operational information that can be stored in memory 4386 can comprise, but is not limited to, subscriber intelligence; contracted services; maintenance and service records; femtocell configuration (e.g., devices served through femto RAN 4390; authorized subscribers associated with one or more deployed femto APs); service policies and specifications; privacy policies; add-on features; so forth.

Server(s) 4382 have substantially the same functionality as described in connection with server(s) 4314. In an aspect, server(s) 4382 can execute multiple application(s) that provide service (e.g., voice and data) to wireless devices served through femto RAN 4390. Server(s) 4382 can also provide security features to femto network platform. In addition, server(s) 4382 can manage (e.g., schedule, queue, format . . . ) substantially all packetized flows (e.g., IP-based, frame relay-based, ATM-based) it generates in addition to data received from macro network platform 4310. Furthermore, server(s) 4382 can effect provisioning of femtocell service, and effect operations and maintenance. It is to be noted that server(s) 4382 can include at least one of a memory, one or more processors configured to provide at least in part the functionality of femto network platform 4380, and a bus which can include a memory bus, a system bus, an address bus or one or more reference link(s). To that end, the one or more processors can execute code instructions (not shown) stored in memory 4386, for example.

It is noted that femto network platform 4380 and macro network platform 4310 can be functionally connected through one or more reference link(s) or reference interface(s). In addition, femto network platform 4380 can be functionally coupled directly (not illustrated) to one or more of external network(s) 4340-3080. Reference link(s) or interface(s) can functionally link at least one of gateway node(s) 4384 or server(s) 4382 to the one or more external networks 4340-4392.

It should be appreciated that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

As it employed in the subject specification, the term "processor" can refer to substantially any computing processing unit or device comprising, but not limited to comprise, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "repository," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; femto cell configuration (e.g., devices served by a femto AP; access control lists, or white lists) or service policies and specifications; privacy policies; add-on features, geographical location tolerances, and so forth. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, aspects or features of the subject innovation described herein also can be implemented through program modules stored in a memory and executed by a processor, or other combination of hardware and software. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    at least one memory that stores computer-executable instructions; and
    at least one processor, communicatively coupled to the at least one memory, that facilitates execution of the computer-executable instructions to at least:
        facilitate creation of a femtocell service account associated with a femtocell equipment,
        link the femtocell service account with a mobility account that is associated with a mobility service provided to a mobile device via a macro cell network, including application of a tag to the mobility account with tracking data indicative of a femtocell service being registered for the mobility account, and
        facilitate management of the femtocell service account based in part on an authentication of credential data received to access the mobility account.

2. The system of claim 1, wherein the at least one processor further facilitates the execution of the computer-executable instructions to facilitate configuration of an access list that includes data associated with a set of mobile devices that are authorized to exploit the femtocell service through the femtocell equipment.

3. The system of claim 2, wherein the configuration of the access list includes assignment of a service priority to the set of mobile devices.

4. The system of claim 1, wherein the at least one processor further facilitates the execution of the computer-executable instructions to redirect a communication session from a network site associated with the mobility account to at least one femtocell online account management network site associated with the femtocell service account to facilitate the management of the femtocell service account.

5. The system of claim 1, wherein the at least one processor further facilitates the execution of the computer-executable instructions to activate the femtocell service associated with the femtocell equipment, based on receipt of an input via a femtocell online account management interface.

6. The system of claim 5, wherein the input is a first input, and wherein the at least one processor further facilitates the execution of the computer-executable instructions to disconnect the femtocell service, based on receipt of a second input via the femtocell online account management interface.

7. The system of claim 1, wherein the at least one processor further facilitates the execution of the computer-executable instructions to perform a location tolerance check that includes a comparison of a distance between a first location at which the femtocell equipment is deployed and a second location that is recorded during registration, with a predefined tolerance threshold.

8. The system of claim 7, wherein the at least one processor further facilitates the execution of the computer-executable instructions to facilitate a transmission of an error signal, in response to the distance exceeding the predefined tolerance threshold.

9. A method, comprising:
    facilitating, by a system comprising a processor, creation of a femtocell service account associated with a femtocell equipment;
    linking, by the system, the femtocell service account with a mobility account that is associated with a mobility service provided to a communication device via a macro cell network, wherein the linking includes assigning, to the mobility account, a tracking function to the femto service account indicative of a femtocell service being registered for the mobility account; and
    configuring, by the system, the femtocell service account based in part on an authentication of credential data received to access the mobility account.

10. The method of claim 9, wherein the configuring includes disconnecting the femtocell service associated with the femtocell equipment.

11. The method of claim 10, wherein the disconnecting includes deactivating an emergency service.

12. The method of claim 10, wherein the disconnecting includes expiring a set of configuration attributes retained in the femtocell service account and the tracking feature assigned to the mobility account.

13. The method of claim 9, wherein the configuring includes populating an access list that includes data associated with a set of mobile devices that are authorized to exploit the femtocell service through the femtocell equipment.

14. The method of claim 13, wherein the configuring further includes assigning a service priority to a mobile device of the set of mobile devices.

15. The method of claim 9, wherein the configuring includes adjusting a billing rate plan for the femtocell service associated with the femtocell equipment.

16. The method of claim 9, wherein the femtocell service account is a first femtocell service account, the femtocell equipment is a first femtocell equipment, and wherein the method further includes:

facilitating, by the system, creation of a second femtocell service account that is associated with a second femtocell equipment and that is linked to the first femtocell service account.

17. The method of claim 9, wherein the configuring includes modifying an address associated with the femtocell equipment.

18. The method of claim 9, wherein the configuring includes activating the femtocell service associated with the femtocell equipment.

19. A non-transitory computer-readable storage medium comprising computer-executable instructions that, in response to execution, cause a system comprising a processor to perform operations, comprising:

creating a femtocell service account associated with a femtocell equipment;

linking the femtocell service account with a mobility account that is associated with a mobility service provided to a user equipment via a macro cell network, wherein the linking includes assigning, to the mobility account, a tracking parameter indicative of a femtocell service being registered for the mobility account; and facilitating management of the femtocell service account based in part on authenticating credential data received to access the mobility account.

20. The non-transitory computer-readable storage medium of claim 19, wherein the operations further comprise:

receiving the credential data to access the mobility account via a network-based interface; and directing a communication session to a femto online account management network site via a network site associated with the mobility account, in response to the authenticating.

* * * * *